United States Patent
Huang et al.

(10) Patent No.: US 10,237,105 B2
(45) Date of Patent: Mar. 19, 2019

(54) MULTIPLEXING UPLINK TRANSMISSIONS WITH TRANSMIT DIVERSITY WITH SINGLE CARRIER WAVEFORM

(71) Applicant: QUALCOMM Incorporated, San Diego, CA (US)

(72) Inventors: Yi Huang, San Diego, CA (US); Wei Zeng, Cupertino, CA (US); Hao Xu, Beijing (CN); Wanshi Chen, San Diego, CA (US); Peter Gaal, San Diego, CA (US); Renqiu Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/850,821

(22) Filed: Dec. 21, 2017

(65) Prior Publication Data
US 2018/0198660 A1    Jul. 12, 2018

Related U.S. Application Data

(60) Provisional application No. 62/443,788, filed on Jan. 8, 2017.

(51) Int. Cl.
*H04W 52/14* (2009.01)
*H04L 27/26* (2006.01)
(Continued)

(52) U.S. Cl.
CPC .......... *H04L 27/2627* (2013.01); *H04J 11/00* (2013.01); *H04J 13/00* (2013.01);
(Continued)

(58) Field of Classification Search
CPC .. H04W 52/146; H04W 52/14; H04L 27/2627
See application file for complete search history.

(56) References Cited

U.S. PATENT DOCUMENTS

2012/0082192 A1* 4/2012 Pelletier .............. H04B 7/0678
375/219
2012/0307928 A1   12/2012 Jia et al.
(Continued)

OTHER PUBLICATIONS

Qualcomm Incorporated: "UL Channelization in Long UL Duration", 3GPP Draft; R1-1612074, 3rd Generation Partnership Project (3GPP), Mobile Competence Centre: 650, Route Des Lucioles; F-06921 Sophia-Antipolis Cedex ; France, vol. RAN WG1, No. Reno, U.S.A; 20161114-20161118, Nov. 13, 2016 (Nov. 13, 2016), XP051176034, pp. 1-5, Retrieved from the Internet: URL:http://www.3gpp.org/ftp/Meetings - 3GPP - Sync/Rani/Docs/ [retrieved on Nov. 13, 2016].

(Continued)

*Primary Examiner* — Wei Zhao
(74) *Attorney, Agent, or Firm* — Linda G. Gunderson; Holland & Hart

(57) ABSTRACT

Methods, systems, and devices for wireless communication are described that support multiplexing uplink transmissions with transmit diversity with a single carrier waveform. Two or more UEs may be configured to use space time block codes (STBC) for transmissions using multiple uplink antennas. A first UE may be configured to use a first STBC for a first uplink transmission. An orthogonal cover code (OCC), such as a Walsh code, may be applied to the first STBC to generate a second STBC, and a second UE may use the second STBC for a second uplink transmission. The first UE and the second UE may concurrently transmit the first uplink transmission and the second uplink transmission. The first STBC and the second STBC may be applied across multiple OFDM symbols, or may be applied within an OFDM symbol on a modulated symbol level.

30 Claims, 28 Drawing Sheets

(51) Int. Cl.
*H04J 13/00* (2011.01)
*H04L 1/06* (2006.01)
*H04L 5/00* (2006.01)
*H04J 11/00* (2006.01)
*H04B 7/06* (2006.01)
*H04L 5/14* (2006.01)
*H04L 1/00* (2006.01)

(52) U.S. Cl.
CPC .......... *H04J 13/004* (2013.01); *H04L 1/0618* (2013.01); *H04L 1/0625* (2013.01); *H04L 5/0016* (2013.01); *H04L 5/0037* (2013.01); *H04L 5/0083* (2013.01); *H04L 5/0091* (2013.01); *H04B 7/0667* (2013.01); *H04J 2211/006* (2013.01); *H04L 5/0007* (2013.01); *H04L 5/0044* (2013.01); *H04L 5/0062* (2013.01); *H04L 5/1469* (2013.01); *H04L 27/2636* (2013.01); *H04L 2001/0092* (2013.01)

(56) References Cited

U.S. PATENT DOCUMENTS

2013/0170435 A1* 7/2013 Dinan .................. H04L 45/50
370/328
2014/0204842 A1* 7/2014 Kim .................. H04W 52/146
370/328
2016/0248549 A1 8/2016 Novak et al.

OTHER PUBLICATIONS

International Search Report and Written Opinion—PCT/US2017/068331—ISA/EPO—Apr. 6, 2018.
Mitsubishi Electric: "Comparison of Transmit Diversity Schemes for PUCCH Format 3", 3GPP Draft; R1-120779, 3rd Generation Partnership Project (3GPP), Mobile Competence Centre; 650, Route Des Lucioles: F-06921 Sophia-Antipolis Cedex: France, vol. RAN WG1, No. Dresden, Germany; 20120206-20120210, Jan. 31, 2012, XP050563130, [retrieved on Jan. 31, 2012], 7 pages.

* cited by examiner

US 10,237,105 B2

MULTIPLEXING UPLINK TRANSMISSIONS WITH TRANSMIT DIVERSITY WITH SINGLE CARRIER WAVEFORM

CROSS REFERENCES

The present Application for Patent claims priority to U.S. Provisional Patent Application No. 62/443,788 by Huang, et al., titled "Multiplexing Uplink Transmissions With Transmit Diversity With Single Carrier Waveform," filed Jan. 8, 2017, assigned to the assignee hereof.

BACKGROUND

The following relates generally to wireless communication, and more specifically to multiplexing uplink transmissions with transmit diversity with single carrier waveform.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices, that may be otherwise known as user equipment (UE).

In a LTE or LTE-Advanced (LTE-A) network, a set of one or more base stations may define an eNodeB (eNB). In other examples (e.g., in a next generation new radio (NR) or 5G network), a wireless multiple access communication system may include a number of smart radio heads (RHs) in communication with a number of access node controllers (ANCs), where a set of one or more RHs, in communication with an ANC, defines a base station (e.g., an eNB or gNB). A base station may communicate with a set of UEs on downlink (DL) channels (e.g., for transmissions from a base station to a UE) and uplink (UL) channels (e.g., for transmissions from a UE to a base station).

A base station in some LTE or NR deployments may transmit downlink transmissions to one or more UEs, and the one or more UEs may transmit uplink transmissions back to the base station. In some cases, downlink transmissions may be transmitted using OFDM transmissions in which multiple carriers are used to transmit concurrent OFDM resource elements (REs), and uplink transmissions may be transmitted using a single-carrier waveform such as single-carrier frequency division multiplexing (SC-FDM) or discrete-Fourier-transform (DFT) spread OFDM (DFT-s-OFDM) transmissions. In some cases it may be desirable for multiple UEs to concurrently transmit uplink communications back to the base station. Additionally, in some cases a UE may use multiple transmit antennas for uplink transmissions to provide transmit diversity.

SUMMARY

The described techniques relate to improved methods, systems, devices, or apparatuses that support multiplexing uplink transmissions with transmit diversity with single carrier waveform. Generally, the described techniques provide for configuring two or more UEs to use space time block codes (STBC) for transmissions using multiple uplink antennas. The usage of STBCs may provide transmissions from the multiple antennas that maintain a single-carrier property. In some cases, a first UE may be configured to use a first STBC for a first uplink transmission. An orthogonal cover code (OCC), such as a Walsh code, may be applied to the first STBC to generate a second STBC, and a second UE may use the second STBC for a second uplink transmission. The first UE and the second UE may concurrently transmit the first uplink transmission and the second uplink transmission, and the use of the first STBC and the second STBC may provide that the concurrent uplink transmissions maintain a single-carrier property. In some examples, the first STBC and the second STBC may be applied across multiple OFDM symbols. In other examples, the first STBC and the second STBC may be applied within an OFDM symbol on a modulated symbol level.

A method of wireless communication is described. The method may include identifying, at a second UE, a first STBC to be used for a first uplink transmission of a first UE, applying, at the second UE, an OCC to the first STBC to generate a second STBC to be used for a second uplink transmission of the second UE, applying the second STBC to at least a portion of an OFDM symbol to be transmitted in the second uplink transmission, and transmitting the second uplink transmission concurrently with the first uplink transmission.

An apparatus for wireless communication is described. The apparatus may include means for identifying, at a second UE, a first STBC to be used for a first uplink transmission of a first UE, means for applying, at the second UE, an OCC to the first STBC to generate a second STBC to be used for a second uplink transmission of the second UE, means for applying the second STBC to at least a portion of an OFDM symbol to be transmitted in the second uplink transmission, and means for transmitting the second uplink transmission concurrently with the first uplink transmission.

Another apparatus for wireless communication is described. The apparatus may include a processor, memory in electronic communication with the processor, and instructions stored in the memory. The instructions may be operable to cause the processor to identify, at a second UE, a first STBC to be used for a first uplink transmission of a first UE, apply, at the second UE, an OCC to the first STBC to generate a second STBC to be used for a second uplink transmission of the second UE, apply the second STBC to at least a portion of an OFDM symbol to be transmitted in the second uplink transmission, and transmit the second uplink transmission concurrently with the first uplink transmission.

A non-transitory computer readable medium for wireless communication is described. The non-transitory computer-readable medium may include instructions operable to cause a processor to identify, at a second UE, a first STBC to be used for a first uplink transmission of a first UE, apply, at the second UE, an OCC to the first STBC to generate a second STBC to be used for a second uplink transmission of the second UE, apply the second STBC to at least a portion of an OFDM symbol to be transmitted in the second uplink transmission, and transmit the second uplink transmission concurrently with the first uplink transmission.

In some examples of the method, apparatus, and non-transitory computer-readable medium described above, the first STBC may be applied to a first OFDM symbol and a second OFDM symbol that may be to be transmitted in the first uplink transmission, and wherein the second STBC may be applied across a third OFDM symbol and a fourth OFDM symbol to be transmitted in the second uplink transmission. In some cases, the second STBC may be applied to an input data stream before or after a discrete Fourier transform (DFT) is applied to the input data stream.

In some examples of the method, apparatus, and non-transitory computer-readable medium described above, the first STBC may be applied to a first portion of a first OFDM symbol and a second portion of the first OFDM symbol to be transmitted in the first uplink transmission, and wherein the second STBC may be applied across a first portion of a second OFDM symbol and a second portion of the second OFDM symbol, the second OFDM symbol to be transmitted in the second uplink transmission concurrently with the first OFDM symbol.

Some examples of the method, apparatus, and non-transitory computer-readable medium described above may further include processes, features, means, or instructions for identifying an uplink common burst portion of a self-contained TTI. Some examples of the method, apparatus, and non-transitory computer-readable medium described above may further include processes, features, means, or instructions for identifying a first portion of the uplink common burst portion for reference signal transmissions and a second portion of the uplink common burst portion for control channel or shared channel data transmissions, and the first STBC may be applied to the first uplink transmission of the first UE in the second portion of the uplink common burst portion and the second STBC may be applied to the second uplink transmission of the second UE in the second portion of the uplink common burst portion.

In some examples of the method, apparatus, and non-transitory computer-readable medium described above, the first portion of the uplink common burst portion occupies a first OFDM symbol of the uplink common burst portion and the second portion of the uplink common burst portion occupies a second OFDM symbol of the uplink common burst portion, wherein the first STBC may be applied to a first half of the second OFDM symbol and a second half of the second OFDM symbol to be transmitted by the first UE, and the second STBC may be applied to a concurrent transmission of the second UE across the first half of the second OFDM symbol and the second half of the second OFDM symbol.

In some examples of the method, apparatus, and non-transitory computer-readable medium described above, the first portion of the uplink common burst portion occupies a first shortened OFDM symbol of the uplink common burst portion and the second portion of the uplink common burst portion occupies a second shortened OFDM symbol of the uplink common burst portion. The second shortened OFDM symbol may include a set of modulation symbols, the first STBC may be applied to a first subset of the set of modulation symbols to be transmitted by the first UE and a second subset of the set of modulation symbols to be transmitted by the first UE, and the OCC may be applied to the first STBC across the first subset of the set of modulation symbols and the second subset of the set of modulation symbols to obtain the second STBC. In some examples of the method, apparatus, and non-transitory computer-readable medium described above, the applying the second STBC comprises applying the second STBC to a concurrent transmission of the second UE across the first subset of the set of modulation symbols and the second subset of the set of modulation symbols.

Some examples of the method, apparatus, and non-transitory computer-readable medium described above may further include processes, features, means, or instructions for identifying, at the second UE, an amount of data to be transmitted in the second uplink transmission. Some examples of the method, apparatus, and non-transitory computer-readable medium described above may further include processes, features, means, or instructions for identifying that the OCC may be to be applied to the first STBC at a modulation symbol level within a single OFDM symbol or at an OFDM symbol level across multiple OFDM symbols based at least in part on the amount of data to be transmitted in the second uplink transmission.

Some examples of the method, apparatus, and non-transitory computer-readable medium described above may further include processes, features, means, or instructions for identifying that the amount of data to be transmitted may be below a first threshold value and applying the OCC to the first STBC across two or more OFDM symbols when the data spans two or more OFDM symbols. Some examples of the method, apparatus, and non-transitory computer-readable medium described above may further include processes, features, means, or instructions for applying the OCC to the first STBC at the modulation symbol level within a single OFDM symbol when the data may be to be transmitted in the single OFDM symbol.

Some examples of the method, apparatus, and non-transitory computer-readable medium described above may further include processes, features, means, or instructions for identifying that the amount of data to be transmitted corresponds to a predetermined small payload value, and applying the OCC to the first STBC at the modulation symbol level within a single OFDM symbol.

Some examples of the method, apparatus, and non-transitory computer-readable medium described above may further include processes, features, means, or instructions for identifying that the amount of data to be transmitted corresponds to a predetermined medium payload value, and applying the OCC to the first STBC at the OFDM symbol level across two or more OFDM symbols.

Some examples of the method, apparatus, and non-transitory computer-readable medium described above may further include processes, features, means, or instructions for identifying that the amount of data to be transmitted corresponds to a predetermined large payload value, and determining that the second uplink transmission may be to be transmitted non-concurrently with the first uplink transmission.

A method of wireless communication is described. The method may include identifying a first UE and a second UE that are to transmit concurrent uplink transmissions, configuring the first UE to use a first STBC for a first uplink transmission, configuring the second UE to use a second STBC for a second uplink transmission, the second STBC generated by applying an OCC to the first STBC, receiving the first uplink transmission and the second uplink transmission, decoding the received first uplink transmission and second uplink transmission according to the OCC to produce a first STBC coded portion of the first uplink transmission from the first UE and a second STBC coded portion of the second uplink transmission from the second UE, and space-timing block decoding the first STBC coded portion and the second STBC coded portion of the second uplink transmission.

An apparatus for wireless communication is described. The apparatus may include means for identifying a first UE and a second UE that are to transmit concurrent uplink transmissions, means for configuring the first UE to use a first STBC for a first uplink transmission, means for configuring the second UE to use a second STBC for a second uplink transmission, the second STBC generated by applying an OCC to the first STBC, means for receiving the first uplink transmission and the second uplink transmission, means for decoding the received first uplink transmission and second uplink transmission according to the OCC to produce a first STBC coded portion of the first uplink transmission from the first UE and a second STBC coded portion of the second uplink transmission from the second UE, and means for space-timing block decoding the first STBC coded portion and the second STBC coded portion of the second uplink transmission.

Another apparatus for wireless communication is described. The apparatus may include a processor, memory in electronic communication with the processor, and instructions stored in the memory. The instructions may be operable to cause the processor to identify a first UE and a second UE that are to transmit concurrent uplink transmissions, configure the first UE to use a first STBC for a first uplink transmission, configure the second UE to use a second STBC for a second uplink transmission, the second STBC generated by applying an OCC to the first STBC, receive the first uplink transmission and the second uplink transmission, decode the received first uplink transmission and second uplink transmission according to the OCC to produce a first STBC coded portion of the first uplink transmission from the first UE and a second STBC coded portion of the second uplink transmission from the second UE, and space-time block decoding the first STBC coded portion and the second STBC coded portion of the second uplink transmission.

A non-transitory computer readable medium for wireless communication is described. The non-transitory computer-readable medium may include instructions operable to cause a processor to identify a first UE and a second UE that are to transmit concurrent uplink transmissions, configure the first UE to use a first STBC for a first uplink transmission, configure the second UE to use a second STBC for a second uplink transmission, the second STBC generated by applying an OCC to the first STBC, receive the first uplink transmission and the second uplink transmission, decode the received first uplink transmission and second uplink transmission according to the OCC to produce a first STBC coded portion of the first uplink transmission from the first UE and a second STBC coded portion of the second uplink transmission from the second UE, and space-time block decoding the first STBC coded portion and the second STBC coded portion of the second uplink transmission.

In some examples of the method, apparatus, and non-transitory computer-readable medium described above, the configuring the first UE further comprises configuring the first UE to apply the first STBC across a first OFDM symbol and a second OFDM symbol to be transmitted in the first uplink transmission, and the configuring the second UE further comprises configuring the second UE to apply the second STBC across a third OFDM symbol and a fourth OFDM symbol to be transmitted in the second uplink transmission concurrently with the first transmission.

In some examples of the method, apparatus, and non-transitory computer-readable medium described above, the configuring the first UE further comprises configuring the first UE to apply the first STBC to a first portion of a first OFDM symbol and a second portion of the first OFDM symbol to be transmitted in the first uplink transmission, and the configuring the second UE further comprises configuring the second UE to apply the second STBC across a first portion of a second OFDM symbol and a second portion of the second OFDM symbol, the second OFDM symbol to be transmitted in the second uplink transmission concurrently with the first OFDM symbol.

Some examples of the method, apparatus, and non-transitory computer-readable medium described above may further include processes, features, means, or instructions for configuring an uplink common burst portion of a self-contained TTI. Some examples of the method, apparatus, and non-transitory computer-readable medium described above may further include processes, features, means, or instructions for configuring a first portion of the uplink common burst portion for reference signal transmissions and a second portion of the uplink common burst portion for control channel or shared channel data transmissions, and wherein the first STBC may be applied to the first uplink transmission of the first UE in the second portion of the uplink common burst portion and the second STBC may be applied to the second uplink transmission of the second UE in the second portion of the uplink common burst portion.

In some examples of the method, apparatus, and non-transitory computer-readable medium described above, the first portion of the uplink common burst portion occupies a first OFDM symbol of the uplink common burst portion and the second portion of the uplink common burst portion occupies a second OFDM symbol of the uplink common burst portion, the first STBC may be applied to a first half of the second OFDM symbol and a second half of the second OFDM symbol to be transmitted by the first UE, and the configuring the second UE further comprises configuring the second UE to apply the second STBC to a concurrent transmission of the second UE across the first half of the second OFDM symbol and the second half of the second OFDM symbol.

In some examples of the method, apparatus, and non-transitory computer-readable medium described above, the first portion of the uplink common burst portion occupies a first shortened OFDM symbol of the uplink common burst portion and the second portion of the uplink common burst portion occupies a second shortened OFDM symbol of the uplink common burst portion, the second shortened OFDM symbol comprises a set of modulation symbols, the first STBC may be applied to a first subset of the set of modulation symbols to be transmitted by the first UE and a second subset of the set of modulation symbols to be transmitted by the first UE, and the second STBC may be obtained by applying the OCC to the first STBC across the first subset of the set of modulation symbols and the second subset of the set of modulation symbols.

Some examples of the method, apparatus, and non-transitory computer-readable medium described above may further include processes, features, means, or instructions for identifying an amount of data to be transmitted in the first uplink transmission and the second uplink transmission. Some examples of the method, apparatus, and non-transitory computer-readable medium described above may further include processes, features, means, or instructions for identifying that the OCC may be to be applied to the first STBC at a modulation symbol level within a single OFDM symbol or at an OFDM symbol level across multiple OFDM symbols based at least in part on the amount of data to be transmitted in the second uplink transmission.

Some examples of the method, apparatus, and non-transitory computer-readable medium described above may further include processes, features, means, or instructions for identifying that the amount of data to be transmitted in each of the first uplink transmission and the second uplink transmission may be below a first threshold value, and applying the OCC to the first STBC across two or more OFDM symbols when the data spans two or more OFDM symbols. Some examples of the method, apparatus, and non-transitory computer-readable medium described above may further include processes, features, means, or instructions for applying the OCC to the first STBC at the modulation symbol level within a single OFDM symbol when the data may be transmitted in the single OFDM symbol.

Some examples of the method, apparatus, and non-transitory computer-readable medium described above may further include processes, features, means, or instructions for identifying that the amount of data to be transmitted corresponds to a predetermined small payload value, and applying the OCC to the first STBC at the modulation symbol level within a single OFDM symbol.

Some examples of the method, apparatus, and non-transitory computer-readable medium described above may further include processes, features, means, or instructions for identifying that the amount of data to be transmitted corresponds to a predetermined medium payload value, and applying the OCC to the first STBC at the OFDM symbol level across two or more OFDM symbols.

Some examples of the method, apparatus, and non-transitory computer-readable medium described above may further include processes, features, means, or instructions for identifying that the amount of data to be transmitted corresponds to a predetermined large payload value, and determining that the second uplink transmission may be to be transmitted non-concurrently with the first uplink transmission.

DETAILED DESCRIPTION

Figure 1:
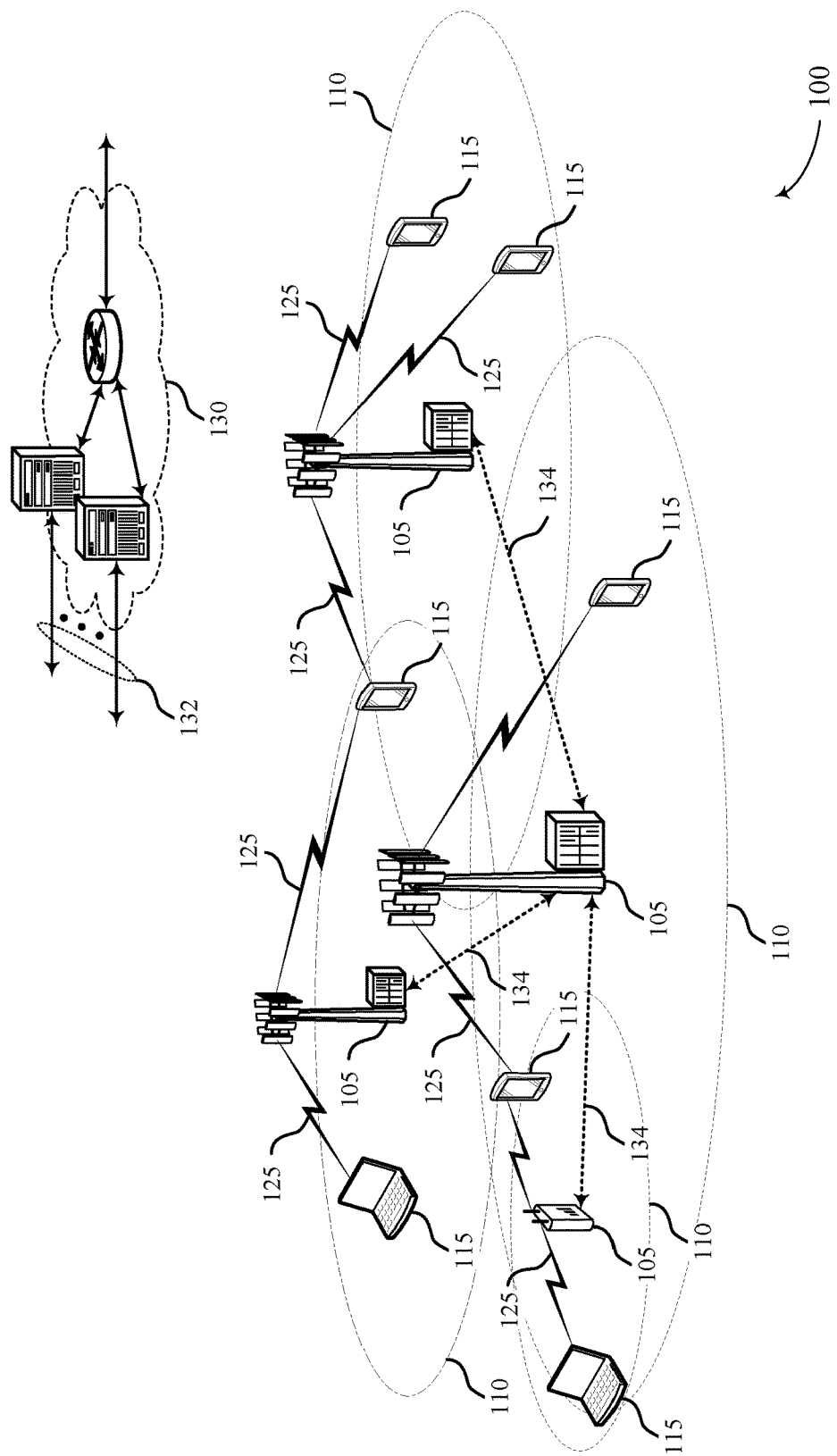
FIG. 1 illustrates an example of a system for wireless communication that supports multiplexing uplink transmissions with transmit diversity with a single carrier waveform in accordance with aspects of the present disclosure.

Improved methods, systems, devices, or apparatuses of various examples may be used to support multiplexing concurrent uplink transmissions of multiple UEs that may each use multiple transmit antennas, while maintaining a single-carrier waveform in wireless communications systems. Various techniques as disclosed herein may provide for configuring two or more UEs to use space time block codes (STBC) for transmissions using multiple uplink antennas. The usage of STBCs may provide transmissions from the multiple antennas that maintain a single-carrier property. In one aspect, a first UE may be configured to use a first STBC for a first uplink transmission. An orthogonal cover code (OCC), such as a Walsh code, may be applied to the first STBC to generate a second STBC, and a second UE may use the second STBC for a second uplink transmission. The first UE and the second UE may concurrently transmit the first uplink transmission and the second uplink transmission, and the use of the first STBC and the second STBC may provide that the concurrent uplink transmissions maintain a single-carrier property. The STBC may be applied to an input data stream before or after a DFT is performed on the input data stream.

In one aspect, the first STBC and the second STBC may be applied across multiple OFDM symbols. For example, the first STBC may be applied by the first UE to a first OFDM symbol and a second OFDM symbol that are to be transmitted by the first UE, and the second STBC may be applied by the second UE across a third OFDM symbol and a fourth OFDM symbol to be transmitted by the second UE, the third OFDM symbol transmitted concurrently with the first OFDM symbol and the fourth OFDM symbol transmitted concurrently with the second OFDM symbol.

In other examples, the first STBC and the second STBC may be applied within an OFDM symbol on a modulated symbol level. For example, the first STBC may be applied to a first portion of a first OFDM symbol and a second portion of the first OFDM symbol to be transmitted by the first UE, and the second STBC may be applied by the second UE to a first portion of a second OFDM symbol and a second portion of the second OFDM symbol, the second OFDM symbol to be transmitted concurrently with the first OFDM symbol. The first portion of each of the first and second OFDM symbols may be, for example, an initial six modulation symbols of the respective OFDM symbol, and the second portion of each of the first and second OFDM symbols may be a subsequent six modulation symbols of the respective OFDM symbol.

In one aspect, the uplink transmissions may be a portion of a self-contained transmission time interval (TTI). For example, the uplink transmissions may be part of an uplink common burst that is located at an end of a self-contained TTI, and a UE may identify a first portion of the uplink common burst portion for reference signal transmissions and a second portion of the uplink common burst portion for control channel or shared channel data transmissions, and the first and second UEs may apply first and second STBCs, respectively, to transmissions in the second portion of the uplink common burst. In one aspect, the reference signal transmissions in the first portion of the uplink common burst may be demodulation reference signal (DMRS) transmissions. In some cases, the first UE and the second UE may transmit respective DMRS transmissions using different combs or interlaces within the first portion of the uplink common burst. In other cases, the first UE may transmit a first DMRS in the first portion of the uplink common burst using a first cyclic shift (e.g., a Zadoff-Chu sequence with a first shift) and the second UE may transmit a second DMRS in the first portion of the uplink common burst using a second cyclic shift (e.g., a Zadoff-Chu sequence with a second shift). In one aspect, only a single UE may transmit a DMRS in the first portion of the uplink common burst, and a DMRS for each transmit antenna of the UE may be transmitted using a different comb or interlace, or using a different cyclic shift.

In one aspect, an amount of data to be transmitted may be identified, and the OCC may be applied to the first STBC at a modulation symbol level within a single OFDM symbol or at an OFDM symbol level across multiple OFDM symbols based at least in part on the amount of data to be transmitted. For example, for relatively small amounts of data, OCC may be applied to the first STBC at the modulation symbol level within a single OFDM symbol, for relatively larger amounts of data OCC may be applied at an OFDM symbol level across multiple OFDM symbols, and for even larger amounts of data multiple UEs may not be multiplexed and a UE may apply STBC for multiple antenna transmissions without applying an OCC relative to another UE.

Such techniques may provide for relatively efficient and flexible usage of wireless resources, and may help to enhance the efficiency of a wireless network. The present disclosure describes various techniques with reference to next generation networks (e.g., 5G or NR networks) that are being designed to support features such as high bandwidth operations, more dynamic subframe/slot types, and self-contained subframe/slot types (in which HARQ feedback for a subframe/slot may be transmitted before the end of the subframe/slot). However, such techniques may be used for any system in which uplink or downlink transmissions may be transmitted using multiple transmit antennas at a transmitter, multiple transmitters are desired to be multiplexed, and single-carrier properties are to be used for the transmissions.

Aspects of the disclosure are initially described in the context of a wireless communications system. Various examples of multiplexing uplink transmissions of multiple UEs that each use multiple transmit antennas are then described. Aspects of the disclosure are further illustrated by and described with reference to apparatus diagrams, system diagrams, and flowcharts that relate to multiplexing uplink transmissions with transmit diversity with a single carrier waveform.

FIG. 1 illustrates an example of a wireless communications system 100 in accordance with various aspects of the present disclosure. The wireless communications system 100 includes base stations 105, UEs 115, and a core network 130. In one aspect, the wireless communications system 100 may be a LTE (or LTE-Advanced) network, or a New Radio (NR) network. In one aspect, wireless communications system 100 may support enhanced broadband communications, ultra-reliable (i.e., mission critical) communications, low latency communications, and communications with low-cost and low-complexity devices. In one aspect, wireless communications system 100 may support enhanced broadband communications, ultra-reliable (i.e., mission critical) communications, low latency communications, and communications with low-cost and low-complexity devices. Uplink transmissions from multiple UEs 115 may be multiplexed and maintain a single-carrier property for the uplink transmission waveforms across the multiple UEs 115 and multiple transmit antennas at each multiplexed UE 115, according to techniques as discussed herein.

Base stations 105 may wirelessly communicate with UEs 115 via one or more base station antennas. Each base station 105 may provide communication coverage for a respective geographic coverage area 110. Communication links 125 shown in wireless communications system 100 may include uplink (UL) transmissions from a UE 115 to a base station 105, or downlink (DL) transmissions, from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In one aspect, the control information transmitted during a TTI of a downlink channel may be distributed between different control regions in a cascaded manner (e.g., between a common control region and one or more UE-specific control regions). Control information and data may be multiplexed in an uplink channel, for example, by code division multiplexing transmissions of multiple UEs 115 using STBC for different transmit antennas with OCCs applied to the STBC across UEs 115, according to various techniques such as discussed herein.

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, or the like.

In one aspect, a UE 115 may also be able to communicate directly with other UEs (e.g., using a peer-to-peer (P2P) or device-to-device (D2D) protocol). One or more of a group of UEs 115 utilizing D2D communications may be within the coverage area 110 of a cell. Other UEs 115 in such a group may be outside the coverage area 110 of a cell, or otherwise unable to receive transmissions from a base station 105. In one aspect, groups of UEs 115 communicating via D2D communications may utilize a one-to-many (1:M) system in which each UE 115 transmits to every other UE 115 in the group. In one aspect, a base station 105 facilitates the scheduling of resources for D2D communications. In other cases, D2D communications are carried out independent of a base station 105.

Some UEs 115, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In one aspect, an MTC device may operate using half-duplex (one-way) communications at a reduced peak rate. MTC devices may also be configured to enter a power saving "deep sleep" mode when not engaging in active communications. In one aspect, MTC or IoT devices may be designed to support mission critical functions and wireless communications system may be configured to provide ultra-reliable communications for these functions.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In one aspect, base stations 105 may be macro cells, small cells, hot spots, or the like. Base stations 105 may also be referred to as eNodeBs (eNBs) 105.

Wireless communications system 100 may operate in an ultra-high frequency (UHF) frequency region using frequency bands from 700 MHz to 2600 MHz (2.6 GHz), although in some cases WLAN networks may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In one aspect, wireless communications system 100 may also utilize extremely high frequency (EHF) portions of the spectrum (e.g., from 30 GHz to 300 GHz). This region may also be known as the millimeter band, since the wavelengths range from approximately one millimeter to one centimeter in length.

Multiple-input multiple-output (MIMO) wireless systems use a transmission scheme between a transmitter (e.g. a base station) and a receiver (e.g. a UE), where both transmitter and receiver are equipped with multiple antennas. Some portions of wireless communications system 100 may use beamforming. For example, base station 105 may have an antenna array with a number of rows and columns of antenna ports that the base station 105 may use for beamforming in its communication with UE 115. Signals may be transmitted multiple times in different directions (e.g., each transmission may be beamformed differently). A mmW receiver (e.g., a UE 115) may try multiple beams (e.g., antenna subarrays) while receiving the synchronization signals.

In one aspect, the antennas of a base station 105 or UE 115 may be located within one or more antenna arrays, that may support beamforming or MIMO operation. One or more base station antennas or antenna arrays may be collocated at an antenna assembly, such as an antenna tower. In some cases, antennas or antenna arrays associated with a base station 105 may be located in diverse geographic locations. A base station 105 may multiple use antennas or antenna arrays to conduct beamforming operations for directional communications with a UE 115.

In one aspect, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use Hybrid ARQ (HARD) to provide retransmission at the MAC layer to improve link efficiency. In the control plane, the Radio Resource Control (RRC) protocol layer may provide establishment, configuration, and maintenance of an RRC connection between a UE 115 and a network device 105-c, network device 105-b, or core network 130 supporting radio bearers for user plane data. At the Physical (PHY) layer, transport channels may be mapped to physical channels.

Time intervals in LTE or NR may be expressed in multiples of a basic time unit (that may be a sampling period of $T_s=1/30,720,000$ seconds). Time resources may be organized according to radio frames of length of 10 ms ($T_f=307200T_s$), that may be identified by a system frame number (SFN) ranging from 0 to 1023. Each frame may include ten 1 ms subframes numbered from 0 to 9. A subframe may be further divided into two 0.5 ms slots, each of which contains 6 or 7 OFDM symbol periods (depending on the length of the cyclic prefix prepended to each symbol). Excluding the cyclic prefix, each symbol contains 2048 sample periods. In some cases the subframe may be the smallest scheduling unit, also known as a TTI. In other cases, a TTI may be shorter than a subframe or may be dynamically selected (e.g., in short TTI bursts or in selected component carriers using short TTIs).

A resource element may consist of one OFDM symbol period and one subcarrier (e.g., a 15 KHz frequency range). A resource block may contain 12 consecutive subcarriers in the frequency domain and, for a normal cyclic prefix in each OFDM symbol, 7 consecutive OFDM symbols in the time domain (1 slot), or 84 resource elements. The number of bits carried by each resource element may depend on the modulation scheme (the configuration of modulation symbols (e.g., QPSK modulation symbols, 16 QAM modulation symbols, 64QAM, etc.) that may be selected during each OFDM symbol period). Thus, the more resource blocks that a UE receives and the higher the modulation scheme, the higher the data rate may be.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

In one aspect, wireless communications system 100 may utilize enhanced component carriers (eCCs). An eCC may be characterized by one or more features including: wider bandwidth, shorter symbol duration, shorter transmission time interval (TTIs), and modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). An eCC characterized by wide bandwidth may include one or more segments that may be utilized by UEs 115 that are not capable of monitoring the whole bandwidth or prefer to use a limited bandwidth (e.g., to conserve power).

In one aspect, an eCC may utilize a different OFDM symbol duration than other CCs, that may include use of a reduced OFDM symbol duration as compared with OFDM symbol durations of the other CCs. A shorter symbol duration may be associated with increased subcarrier spacing. A TTI in an eCC may consist of one or multiple symbols. In some cases, the TTI duration (that is, the number of symbols in a TTI) may be variable. A device, such as a UE 115 or base station 105, utilizing eCCs may transmit wideband signals (e.g., 20, 40, 60, 80 Mhz, etc.) at reduced OFDM symbol durations (e.g., 16.67 microseconds). A TTI in eCC may consist of one or multiple OFDM symbols.

In one aspect, wireless system 100 may utilize both licensed and unlicensed radio frequency spectrum bands. For example, wireless system 100 may employ LTE License Assisted Access (LTE-LAA) or LTE Unlicensed (LTE U) radio access technology or NR technology in an unlicensed band such as the 5 Ghz Industrial, Scientific, and Medical (ISM) band. When operating in unlicensed radio frequency spectrum bands, wireless devices such as base stations 105 and UEs 115 may employ listen-before-talk (LBT) procedures to ensure the channel is clear before transmitting data. In some cases, operations in unlicensed bands may be based on a carrier aggregation (CA) configuration in conjunction with component carriers (CCs) operating in a licensed band. Operations in unlicensed spectrum may include downlink transmissions, uplink transmissions, or both. Duplexing in unlicensed spectrum may be based on frequency division duplexing (FDD), time division duplexing (TDD) or a combination of both.

Figure 2:
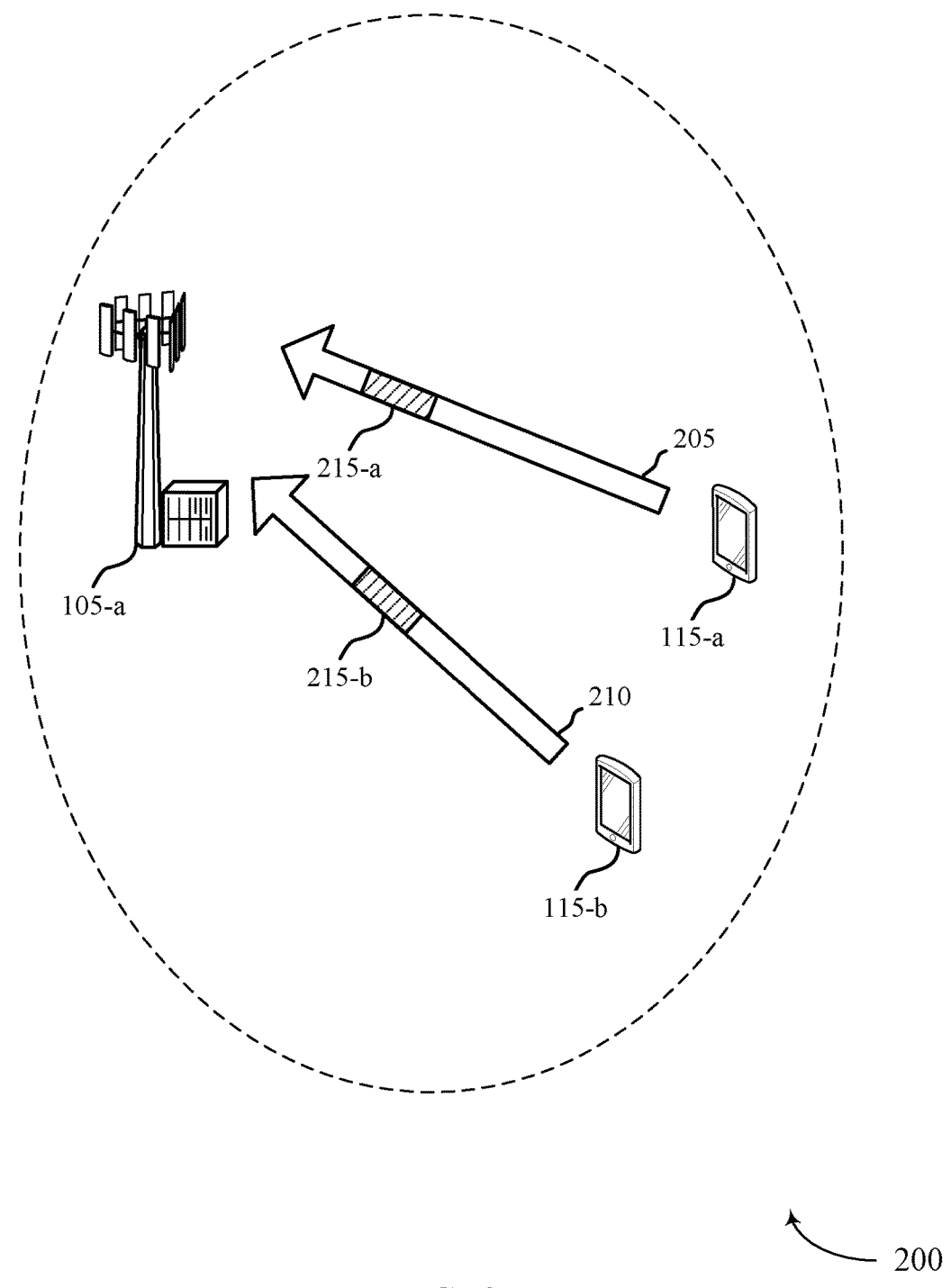
FIG. 2 illustrates an example of a wireless communications system that supports multiplexing uplink transmissions with transmit diversity with a single carrier waveform in accordance with aspects of the present disclosure.

FIG. 2 illustrates an example of a wireless communications system 200 for multiplexing uplink transmissions with transmit diversity with a single carrier waveform. Wireless communications system 200 includes base station 105-a, a first UE 115-a, and a second UE 115-b, that may be examples of aspects of a base station 105 or UE 115 as described above with reference to FIG. 1. In the example of FIG. 2, the wireless communications system 200 may operate according to a radio access technology (RAT) such as a 5G or NR RAT, although techniques described herein may be applied to any RAT and to systems that may concurrently use two or more different RATs.

Base station 105-a may communicate with first UE 115-a, and may receive uplink transmissions over carrier 205. Base station 105-a may communicate with second UE 115-b, and may receive uplink transmissions over carrier 210. In some examples, base station 105-a may allocate resources for communication with UEs over carrier 205 and carrier 210, and in some cases may configure the UEs 115 to multiplex uplink transmissions. For example, base station 105-a may allocate subframe 215 for multiplexed uplink communications communication, with first UE 115-a transmitting a first uplink transmission in subframe 215-a and the second UE 115-b transmitting a second uplink transmission in subframe 215-b that is synchronized with subframe 215-a. As discussed above, each of the first UE 115-a and the second UE 115-b may transmit using two or more transmit antennas, that may provide transmit diversity and enhance communications between the UEs 115 and base station 105-a.

As discussed above, UEs 115 may use a single carrier waveform for uplink transmissions, and STBC may be used to maintain the single carrier waveform per transmit antenna at each UE 115. In one aspect, the first UE 115-a may use a first STBC for transmissions in subframe 215-a, and the second UE 115-b may use a second STBC for transmissions in subframe 215-b. Space-time block coding (STBC) is an encoding scheme utilized in wireless communications in which a data stream and one or more copies of a data stream are transmitted across two or more antennas. In STBC, a data stream is encoded in information blocks, which are then divided among the transmit antennas (in space) and transmitted across time. STBC is based on Alamouti's code, developed by Siavash Alamouti in 1998. Alamouti's code was designed for a two-transmit antenna system and has the coding matrix:

$$C_1 = \begin{bmatrix} c_0 & c_1 \\ -c_1^* & c_0^* \end{bmatrix},$$

where * denotes the complex conjugate.

In one aspect, the second STBC may be generated by applying an OCC, such as a Walsh code, to the first STBC. The first UE 115-a and the second UE 115-b may concurrently transmit in subframe 215, and the use of the first STBC and the second STBC may provide that the concurrent uplink transmissions maintain a single-carrier property.

In some examples, the first STBC and the second STBC may be applied across multiple OFDM symbols. For example, the first STBC may be applied by the first UE 115-a to a first OFDM symbol and a second OFDM symbol that are to be transmitted by the first UE 115-a, and the second STBC may be applied by the second UE 115-b across a third OFDM symbol and a fourth OFDM symbol to be transmitted by the second UE 115-b, the third OFDM symbol transmitted concurrently with the first OFDM symbol and the fourth OFDM symbol transmitted concurrently with the second OFDM symbol.

In other examples, the first STBC and the second STBC may be applied within an OFDM symbol on a modulated symbol level. For example, the first STBC may be applied to first and second subsets of modulation symbols of a first OFDM symbol, and the second STBC may be applied by the second UE to first and second subsets of modulation symbols of a second OFDM symbol. The first subset of modulation symbols of each of the first and second OFDM symbols may be, for example, an initial six modulation symbols of the respective OFDM symbol, and the second subset of modulation symbols of each of the first and second OFDM symbols may be a subsequent six modulation symbols of the respective OFDM symbol. Similarly as discussed above, an OCC may be applied to the first STBC to obtain the second STBC.

Figure 3:
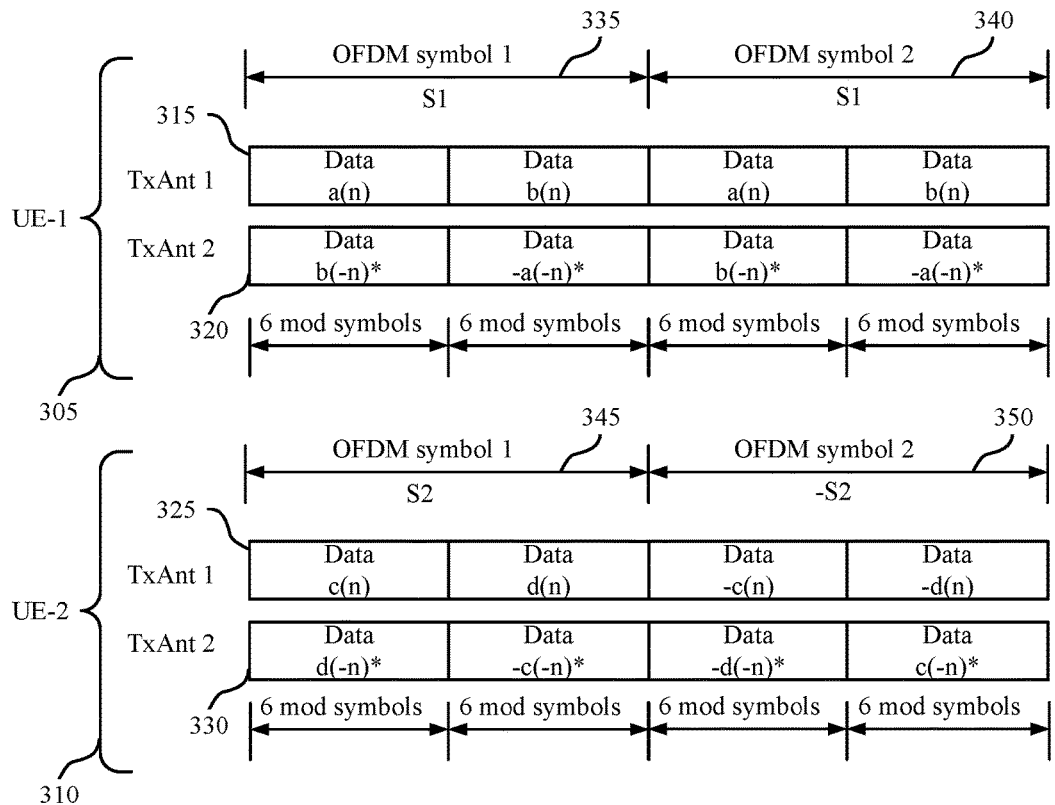
FIG. 3 illustrates an example of orthogonal STBCs applied across multiple OFDM symbols that support multiplexing uplink transmissions with transmit diversity with a single carrier waveform in accordance with aspects of the present disclosure.

FIG. 3 illustrates an example 300 of orthogonal STBCs applied across multiple OFDM symbols for multiplexing uplink transmissions with transmit diversity with a single carrier waveform. The orthogonal STBCs applied across multiple OFDM symbols may be used, for example, in multiplexed communications between a first UE 305 and a second UE 310 and a base station such as discussed above with respect to FIGS. 1 and 2.

In the example 300 of FIG. 3, first UE 305 may have two transmit antennas that may be used for uplink transmissions, with a first transmit antenna transmitting first transmission 315 and a second transmit antenna transmitting a second transmission 320, the first transmission 315 and the second transmission 320 combining to form a first uplink transmission of the first UE 305. In this example, a STBC is applied to the first uplink transmission across a first OFDM symbol 335 and a second OFDM symbol 340. The first UE 305 may have multiple modulation symbols of data to transmit, represented by a(n) and b(n), respectively, in which a(n) denotes multiple modulation symbols where n is the modulation symbol index. In the example FIG. 3, a(n) includes 6 modulation symbols, n=0, 1, 2, . . . , 5. The same applies to b(n). A first STBC may be applied across symbols and across transmit antennas, to transmit on each antenna:

Tx Antenna 1: a(n), b(n), a(n), b(n)
Tx Antenna 2: b(−n)*, −a(−n)*, b(−n)*, −a(−n)*

Similarly, second UE 310 may have two transmit antennas that may be used for uplink transmissions, with a first transmit antenna transmitting first transmission 325 and a second transmit antenna transmitting a second transmission 330, the first transmission 325 and the second transmission 330 combining to form a second uplink transmission of the second UE 310. In this example, a second STBC is applied to the second uplink transmission across first OFDM symbol 345 and second OFDM symbol 350. The second UE 310 may have two symbols of data to transmit, having modulation symbols represented by c(n) and d(n), respectively. The second STBC may be generated by applying a Walsh code, for example, to the first STBC. The first STBC may have a Walsh code [1,1], represented by [S1, S1] in FIG. 3, applied to the first OFDM symbol 335 and the second ODFM symbol 340 of the first UE 305. A Walsh code [1, −1], may be applied to the first STBC, represented by [S2, −S2] in FIG. 3, applied to the first OFDM symbol 345 and the second ODFM symbol 350 of the second UE 310, to provide a second STBC across symbols and across transmit antennas, to transmit on each antenna of the second UE 310:

Tx Antenna 1: c(n), d(n), −c(n), −d(n)
Tx Antenna 2: d(−n)*, −c(−n)*, −d(−n)*, c(−n)*

A base station receiving the concurrent transmissions may apply the Walsh code on the received signal to obtain the first and second uplink transmissions, and may apply the respective STBCs to each uplink transmission to obtain the transmissions of each antenna. In such a manner, the concurrent uplink transmissions from both the first UE 305 and the second UE 310 may have single carrier properties through the application of the STBCs following a discrete Fourier transform (DFT) of an input stream, that may provide a peak-to-average power ratio (PAPR) that is reduced relative to a PAPR of a multi-carrier OFDM transmission. Thus, single-carrier (e.g., SC-FDM) waveforms may provide benefits on the uplink by increasing the transmit power efficiency and reducing the power amplifier cost at UEs, that may allow for reduced hardware costs and reduced complexity at the UEs.

Figure 4A:
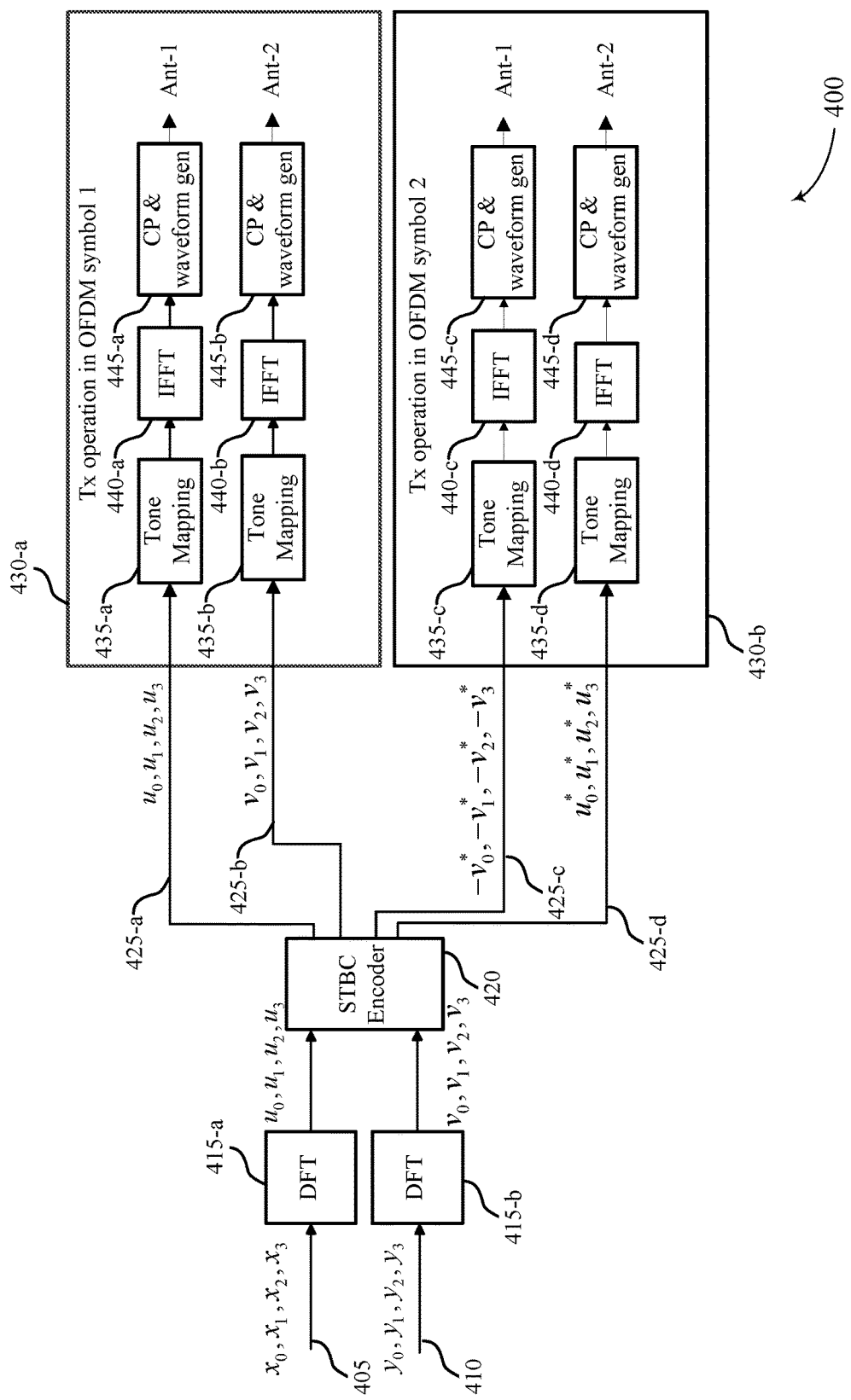
FIG. 4A illustrates an example of across-symbol STBC encoding of transmissions that support multiplexing uplink transmissions with transmit diversity with a single carrier waveform in accordance with aspects of the present disclosure.

FIG. 4A illustrates an example 400 of across-symbol STBC encoding of transmissions for multiplexing uplink transmissions with transmit diversity with a single carrier waveform. The encoding and transmission of example 400 may be performed at UEs that are to transmit uplink transmissions to a base station, such as UEs and base stations as discussed above with respect to FIGS. 1 and 2.

In the example of FIG. 4A, a first input stream 405 associated with a first ODFM symbol is provided to a first DFT component 415-a. In this example, the first input stream 405 includes [$x_0$, $x_1$, $x_2$, $x_3$] and the first DFT component 415-a outputs [$u_0$, $u_1$, $u_2$, $u_3$]. Similarly, a second input stream 410 associated with a second OFDM symbol is provided to a second DFT component 415-b. In this example, the second input stream 410 includes [$y_0$, $y_1$, $y_2$, $y_3$] and the first DFT component 415-a outputs [$v_0$, $v_1$, $v_2$, $v_3$].

The DFT 415 outputs are provided to a STBC encoder 420, that may apply STBC to the DFT outputs as discussed above. In this example, the first STBC is applied to the input streams, although the STBC encoder 420 may apply other STBCs to the DFT outputs, such as a second STBC that is generated by applying a Walsh code to a first STBC. In this example, STBC encoder 420 receives each DFT output and outputs four streams. A first stream 425-a and a second stream 425-b may be provided for transmission on first and second transmit antennas in a first transmit operation 430-a for the first OFDM symbol, and a second stream 425-c and a third stream 425-d may be provided for transmission on first and second transmit antennas in a second transmit operation 430-b for the second OFDM symbol. In the example of FIG. 4A, the STBC encoder 420 outputs first stream 425-a as [$u_0$, $u_1$, $u_2$, $u_3$], second stream 425-b as [$v_0$, $v_1$, $v_2$, $v_3$], third stream 425-c as [$-v_0^*$, $-v_1^*$, $-v_2^*$, $-v_3^*$], and fourth stream 425-d as [$u_0^*$, $u_1^*$, $u_2^*$, $u_3^*$]. Each stream 425 is processed at the respective transmit operation 430 through tone mapping 435, inverse fast Fourier transformation (IFFT) 440, cyclic prefix (CP) addition and waveform generation 445, and output to the respective transmit antenna. Components 415 through 445 may be portions of a transmit chain at a UE. Other components may also be part of a transmit chain, such as amplifiers, digital-to-analog converters, band-specific filters, etc. In such a manner, a UE may transmit an uplink transmission over two transmit antennas that has a single-carrier waveform property. A receiver, such as a receiver at a base station, may receive the uplink transmission at a receive chain and decode the STBC encoded transmission (e.g., via receive antenna(s), band specific filters, amplifiers, analog-to-digital converters, cyclic prefix removal, FFT, STBC decoding, demapping, etc.), and perform receive processing on the transmission.

Figure 4B:
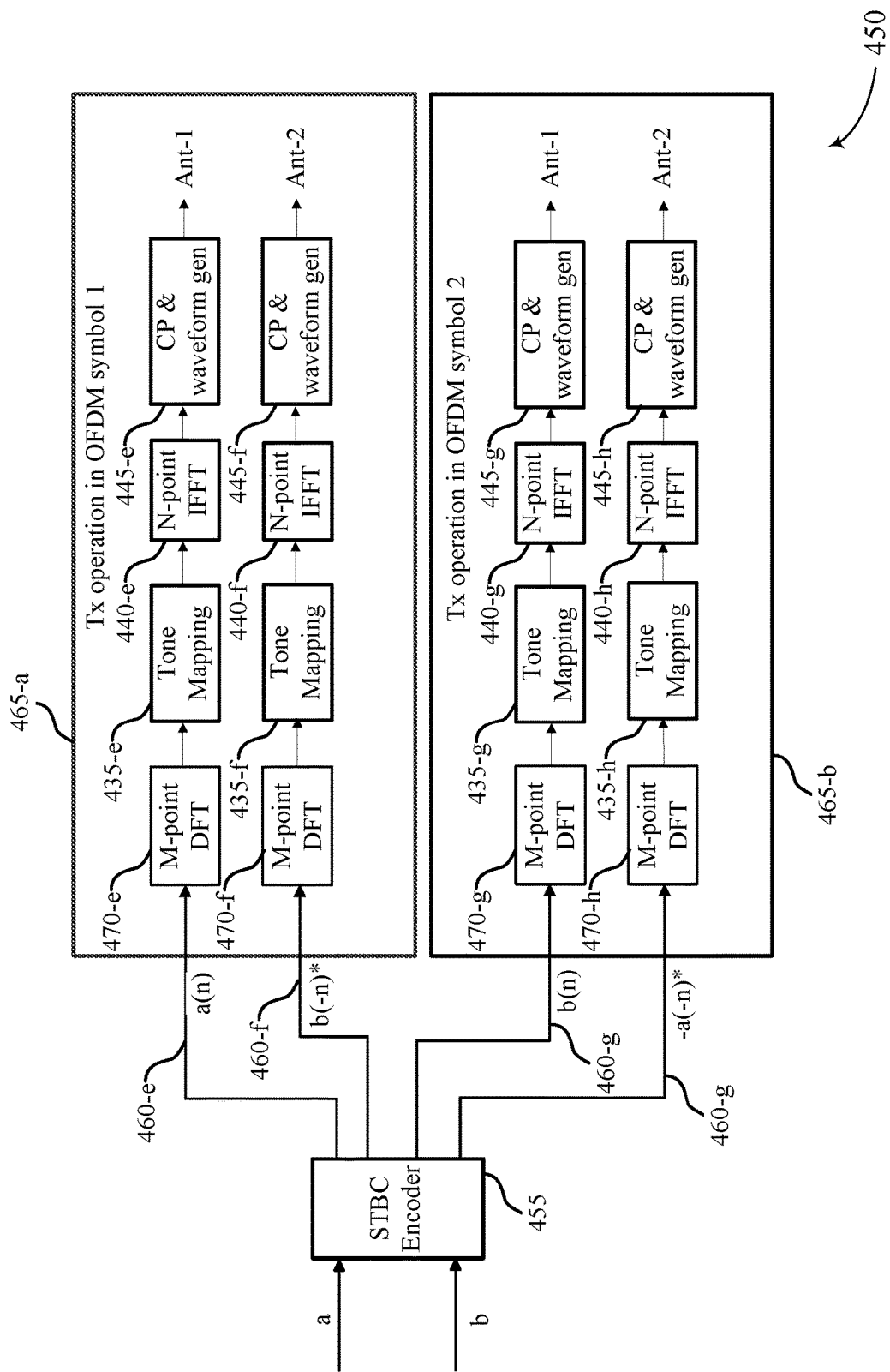
FIG. 4B illustrates an example of across-symbol STBC encoding of transmissions with STBC encoding performed prior to DFT, for multiplexing uplink transmissions in accordance with aspects of the present disclosure.

FIG. 4B illustrates an example 450 of across-symbol STBC encoding of transmissions with STBC encoding performed prior to DFT, for multiplexing uplink transmissions. The encoding and transmission of example 450 may be performed at UEs that are to transmit uplink transmissions to a base station, such as UEs and base stations as discussed above with respect to FIGS. 1 and 2.

In the example of FIG. 4B, two input streams, a and b, are provided to STBC encoder 455, which outputs four data streams 460 for a(n), b(−n)*, b(n), and −a(−n)*. The outputs of the STBC encoder 455 are provided a transmit operation for a first OFDM symbol 465-a and a transmit operation for a second OFDM symbol 465-b. In the example of FIG. 4B, each stream 460 is processed at the respective transmit operation 465 through an M-point DFT 470, tone mapping 435, an N-point IFFT 440, cyclic prefix (CP) addition and waveform generation 445, and output to the respective transmit antenna. Components for each transmit operation 465 may be portions of a transmit chain at a UE. Other components may also be part of a transmit chain, such as amplifiers, digital-to-analog converters, band-specific filters, etc. In such a manner, a UE may transmit an uplink transmission over two transmit antennas that has a single-carrier waveform property. A receiver, such as a receiver at a base station, may receive the uplink transmission at a receive chain and decode the STBC encoded transmission (e.g., via receive antenna(s), band specific filters, amplifiers, analog-to-digital converters, cyclic prefix removal, FFT, STBC decoding, demapping, etc.), and perform receive processing on the transmission.

Figure 5:
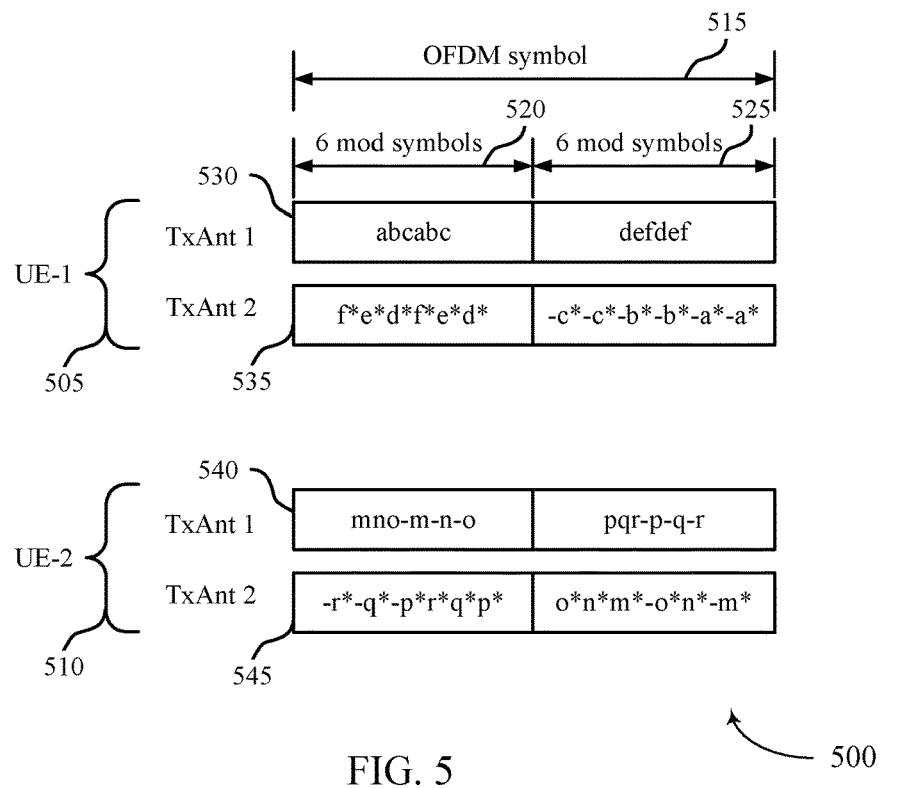
FIG. 5 illustrates an example of orthogonal STBCs applied within an OFDM symbol that support multiplexing uplink transmissions with transmit diversity with a single carrier waveform in accordance with aspects of the present disclosure.

As discussed above, in some cases, STBC may be applied within an OFDM symbol rather than across OFDM symbols. FIG. 5 illustrates an example 500 of orthogonal STBCs applied within an OFDM symbol for multiplexing uplink transmissions with transmit diversity with a single carrier waveform. The orthogonal STBCs applied within an OFDM symbol may be used, for example, in multiplexed communications between a first UE 505 and a second UE 510 and a base station such as discussed above with respect to FIGS. 1 and 2.

In the example 500 of FIG. 5, first UE 505 may have two transmit antennas that may be used for uplink transmissions, with a first transmit antenna transmitting first transmission 530 and a second transmit antenna transmitting a second transmission 535, the first transmission 530 and the second transmission 535 combining to form a first uplink transmission of the first UE 505. In this example, a STBC is applied to the first uplink transmission within one OFDM symbol 515, across a first subset 520 of modulation symbols and a second subset 525 of modulation symbols (e.g., an initial 6 modulation symbols and a last 6 modulation symbols of OFDM symbol 515). Each of the first UE 505 and the second UE 510 may have six modulation symbols to transmit within the available 12 modulation symbols of this example. The first UE 505 may have 6 modulation symbols represented by [a, b, c, d, e, f] and the second UE 510 may have 6 modulation symbols represented by [m, n, o, p, q, r]. A first STBC may be applied across the first subset 520 of symbols and the second subset 525 of symbols through repeating modulation symbols and STBC coding, to transmit on each antenna:

Tx Antenna 1: [a, b, c, a, b, c], [d, e, f, d, e, f]
Tx Antenna 2: [f*, e*, d*, f*, e*, d*], [−c*, −c*, −b*, −b*, −a*, −a*].

Similarly, second UE 510 may have two transmit antennas that may be used for uplink transmissions, with a first transmit antenna transmitting first transmission 540 and a second transmit antenna transmitting a second transmission 545, the first transmission 540 and the second transmission 545 combining to form a second uplink transmission of the second UE 510. In this example, a second STBC is applied to the second uplink transmission within the OFDM symbol 515 across first subset 520 and second subset 525. The second STBC may be generated by applying a Walsh code, for example, to the first STBC, to provide a second STBC across modulation symbols and across transmit antennas, to transmit on each antenna of the second UE 510:

Tx Antenna 1: [m n, o, −m, −n, −o], [p, q, r, −p, −q, −r]
Tx Antenna 2: [−r*, −q*, −p*, r*, q*, p*], [o*, n*, m*, −o*, −n*, −m*].

A base station receiving the concurrent transmissions may apply the Walsh code on the received signal to obtain the first and second uplink transmissions, and may apply the respective STBCs to each uplink transmission to obtain the transmissions of each antenna. In such a manner, the concurrent uplink transmissions from both the first UE 305 and the second UE 310 may have single carrier properties through the application of the STBCs.

Figure 6:
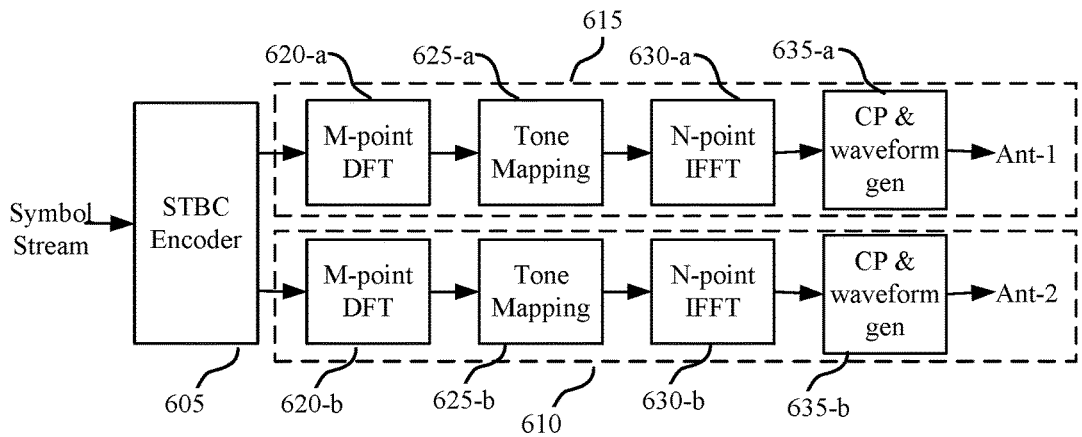
FIG. 6 illustrates an example of within-symbol STBC encoding of transmissions that support multiplexing uplink transmissions with transmit diversity with a single carrier waveform in accordance with aspects of the present disclosure.

FIG. 6 illustrates an example 600 of within-symbol STBC encoding of transmissions for multiplexing uplink transmissions with transmit diversity with a single carrier waveform. The encoding and transmission of example 600 may be performed at UEs that are to transmit uplink transmissions to a base station, such as UEs and base stations as discussed above with respect to FIGS. 1 and 2.

In the example of FIG. 6, an input symbol stream is provided to STBC encoder 605, that may apply STBC encoding in a manner such as discussed above with respect to FIG. 5. In this example, the first STBC may be applied to modulation symbols as discussed above, and outputs data streams for transmission on first and second transmit antennas in a first transmit operation 610, and a second transmit operation 615. Each stream from the STBC encoder 605 may be processed at the respective transmit operation 610, 615 through an M-point DFT 620, tone mapping 625, an N-point IFFT 630, CP addition and waveform generation 635, and output to the respective transmit antenna. Components 605 through 635 may be portions of a transmit chain at a UE. Other components may also be part of a transmit chain, such as amplifiers, digital-to-analog converters, band-specific filters, etc. In such a manner, a UE may transmit an uplink transmission over two transmit antennas that has a single-carrier waveform property. A receiver, such as a receiver at a base station, may receive the uplink transmission at a receive chain and decode the STBC encoded transmission (e.g., via receive antenna(s), band specific filters, amplifiers, analog-to-digital converters, cyclic prefix removal, FFT, STBC decoding, demapping, etc.), and perform receive processing on the transmission.

In some examples, techniques for performing STBC may be identified based at least in part on a number of OFDM symbols to which the STBC is to be applied. When applying STBC at the OFDM symbol-level, the techniques such as discussed above with respect to FIGS. 3, 4A, and 4B may be used directly when applied to an even number of OFDM symbols, by applying STBC across consecutive pairs of OFDM symbols that are to be transmitted. If a payload to be transmitted (e.g., a PUCCH payload) occupies an odd number of OFDM symbols, one of four options may be selected to apply STBC, according to some examples. A first option may include, for example, physically splitting each payload OFDM symbol into two half-symbols with scaled numerology (e.g., reducing the duration by half and doubling tone spacing), and applying STBC over the physically split half-symbols.

A second option may include, for example, virtually splitting each payload OFDM symbol into two half-symbols, and applying STBC over the virtually split half-symbols, such as in FIGS. 5 and 6. In such examples, 12 modulated symbols may be divided into two halves (e.g., subsets of modulated symbols 520 and 525 in FIG. 5), each having 6 modulated symbols. The difference between the virtual splitting of the second option and the physical splitting of the first option discussed above is that physical splitting applies scaled numerology (double subcarrier spacing), a break of the regular cyclic prefix (CP) for one regular OFDM symbol into two short CPs, and assignment of a short CP to each physically split half symbol, while the virtual splitting of the second option does not need such changes to numerology and CP.

A third option may include, for example, physically splitting only one payload OFDM symbol (leaving no ODFM symbols or an even number of OFDM symbols) into two half-symbols with scaled numerology, and applying STBC over the two physically split half-symbols. The remaining OFDM symbols may have across OFDM symbol STBC applied as discussed above with respect to FIGS. 3, 4A, and 4B.

A fourth option may include virtually splitting only one payload OFDM symbol into two half-symbols with scaled numerology, and applying STBC over the two virtually split half-symbols. The remaining OFDM symbols may have across OFDM symbol STBC applied as discussed above with respect to FIGS. 3, 4A, and 4B.

Figure 7:
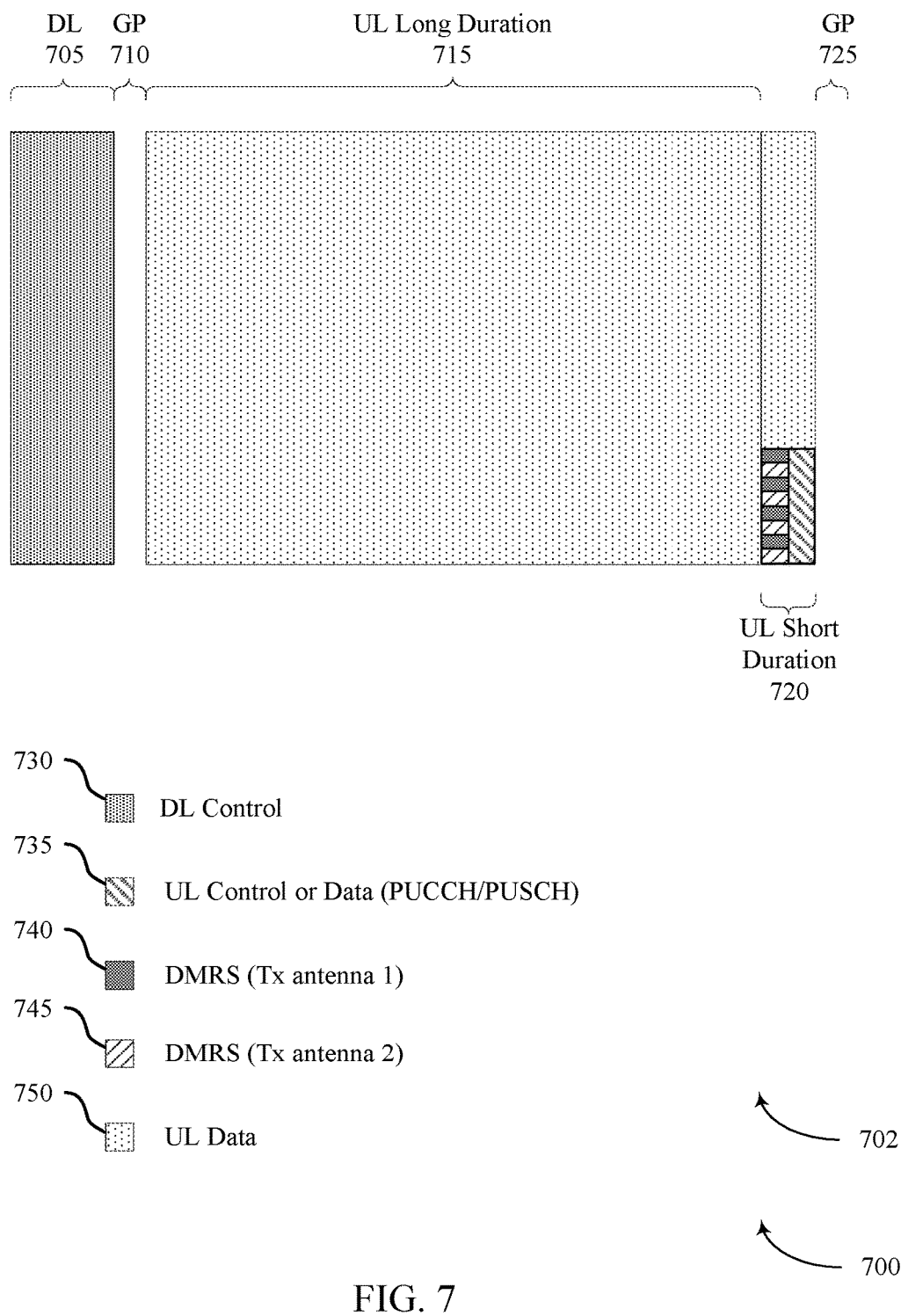
FIG. 7 illustrates an example of a self-contained transmission time interval (TTI) that supports multiplexing uplink transmissions with transmit diversity with a single carrier waveform in accordance with aspects of the present disclosure.

FIG. 7 illustrates an example of a self-contained tti 700 for multiplexing uplink transmissions with transmit diversity with a single carrier waveform. The self-contained TTI 700 may be used, for example, in communications between a UE and a base station such as discussed above with respect to FIGS. 1 and 2.

As mentioned above, in some examples a self-contained TDD subframe structure may be used for communications between a UE and a base station. In the example of FIG. 7, an UL-centric subframe 702, may include a downlink portion 705, located at the beginning of the UL-centric subframe 702, followed by a guard period (GP) 710 during which circuitry may be switched from receive mode to transmit mode, followed by uplink transmissions that may include an uplink long duration portion 715 and an uplink short duration 720 or uplink common burst. A second GP 725 may follow the uplink short duration 720 to provide for switching of transmit/receive circuitry from a transmit mode back to receive mode in preparation for the initial DL transmissions of a following subframe. Within DL portion 705, DL control information 730 may occupy all or a portion of the entire transmission bandwidth, and may be multiplexed with other DL data resources in some cases, in order to use the entire transmission bandwidth.

Within the uplink long duration portion 715 and an uplink short duration 720 uplink data 750 may be transmitted. In one aspect, the uplink short duration 720 may include a single OFDM symbol, that may be physically split into two half symbols in which the OFDM symbol duration is reduced in half and tone spacing is doubled, that may generate a first half-symbol and a second half-symbol. Within the uplink short duration, uplink control or data 735 may be transmitted in the second half-symbol, and a UE may transmit a demodulation reference signal (DMRS) in the first half-symbol. In the example of FIG. 7, a single UE may transmit in the uplink short duration 720, and a first DMRS 740 may be transmitted for a first transmit antenna, and a second DMRS 745 may be transmitted for a second transmit antenna. In this example, the first DMRS 740 and second DMRS 745 may be transmitted using different combs or interlaces within a first half-symbol of the uplink short duration 720. In one aspect, the uplink control or data 735 (e.g., PUCCH or PUSCH) may be transmitted in the second half-symbol using STBC before DFT, as discussed above. In such examples, the half-symbol may be partitioned into two quarter-symbols and STBC performed at the modulation symbol level for each quarter-symbol.

Figure 8:
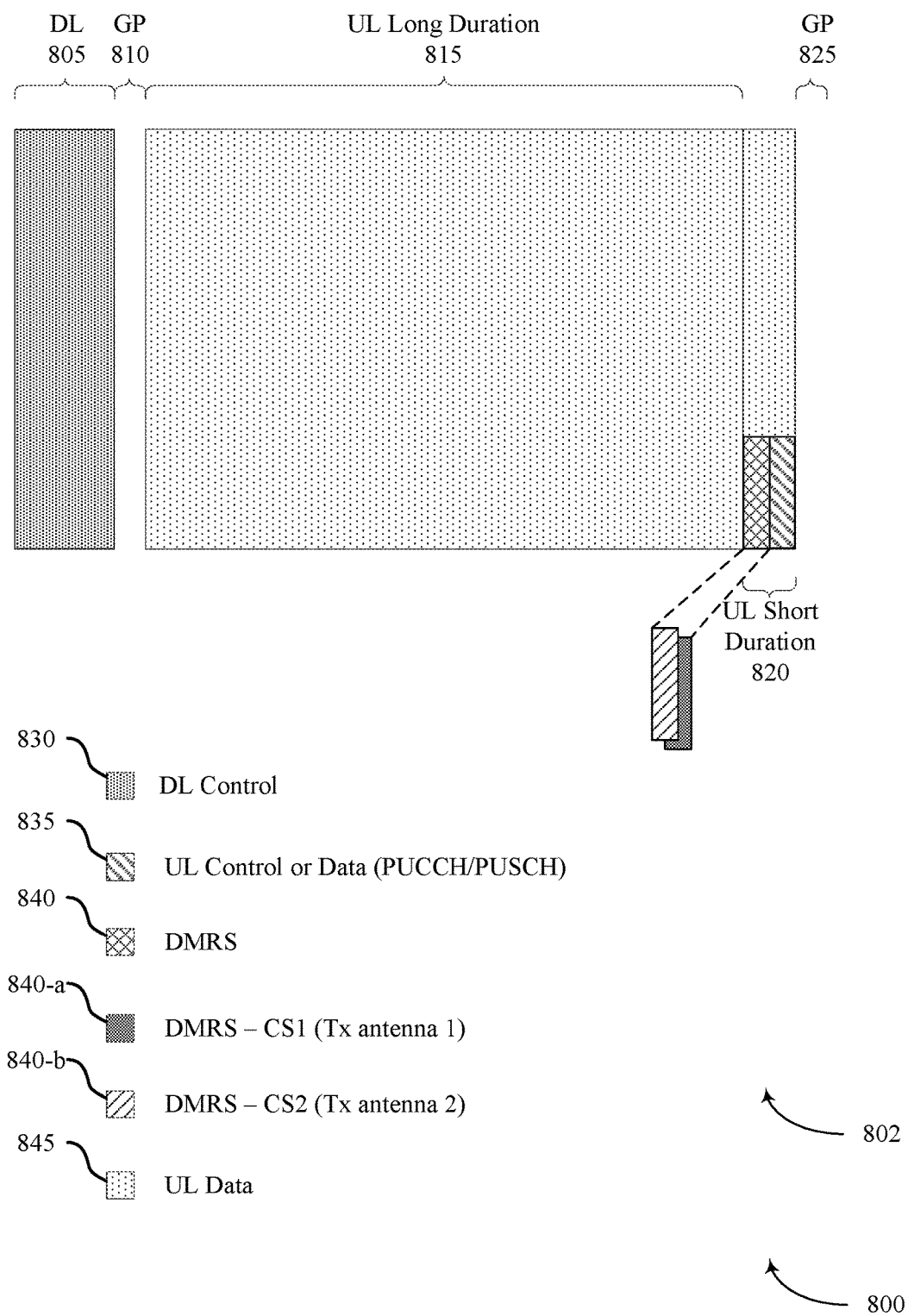
FIG. 8 illustrates an example of a self-contained transmission time interval (TTI) that supports multiplexing uplink transmissions with transmit diversity with a single carrier waveform in accordance with aspects of the present disclosure.

FIG. 8 illustrates an example of a self-contained TTI 800 for multiplexing uplink transmissions with transmit diversity with a single carrier waveform. The self-contained TTI 800 may be used, for example, in communications between a UE and a base station such as discussed above with respect to FIGS. 1 and 2.

As mentioned above, in some examples a self-contained TDD subframe structure may be used for communications between a UE and a base station. In the example of FIG. 8, an UL-centric subframe 802, may include a downlink portion 805, located at the beginning of the UL-centric subframe 802, followed by GP 810, followed by uplink transmissions that may include an uplink long duration portion 815 and an uplink short duration 820 or uplink common burst. A second GP 825 may follow the uplink short duration 820. Within DL portion 805, DL control information 830 may occupy all or a portion of the entire transmission bandwidth, and may be multiplexed with other DL data resources in some cases, in order to use the entire transmission bandwidth.

Within the uplink long duration portion 815 and an uplink short duration 820 uplink data 845 may be transmitted. In one aspect, as discussed above, the uplink short duration 820 may include a single OFDM symbol, that may be physically split into two half symbols in which the OFDM symbol duration is reduced in half and tone spacing is doubled, that may generate a first half-symbol and a second half-symbol. Within the uplink short duration, uplink control or data 835 may be transmitted in the second half-symbol, and a UE may transmit a DMRS 840 in the first half-symbol. In the example of FIG. 8, a single UE may transmit in the uplink short duration 820, and a first DMRS 840-a may be transmitted for a first transmit antenna using a first cyclic shift (CS), such as a Zadoff-Chu sequence with a first shift, and a second DMRS 840-b may be transmitted for a second transmit antenna using a second CS, such as the Zadoff-Chu sequence with a second shift. In this example, the first DMRS 840-a and second DMRS 840-b may be transmitted using the same time and frequency resources, using different CSs, within the first half-symbol of the uplink short duration 820. In some examples, the uplink control or data 835 (e.g., PUCCH or PUSCH) may be transmitted in the second half-symbol using STBC before DFT, as discussed above, in which the half-symbol may be partitioned into two quarter-symbols and STBC performed at the modulation symbol level for each quarter-symbol.

Figure 9:
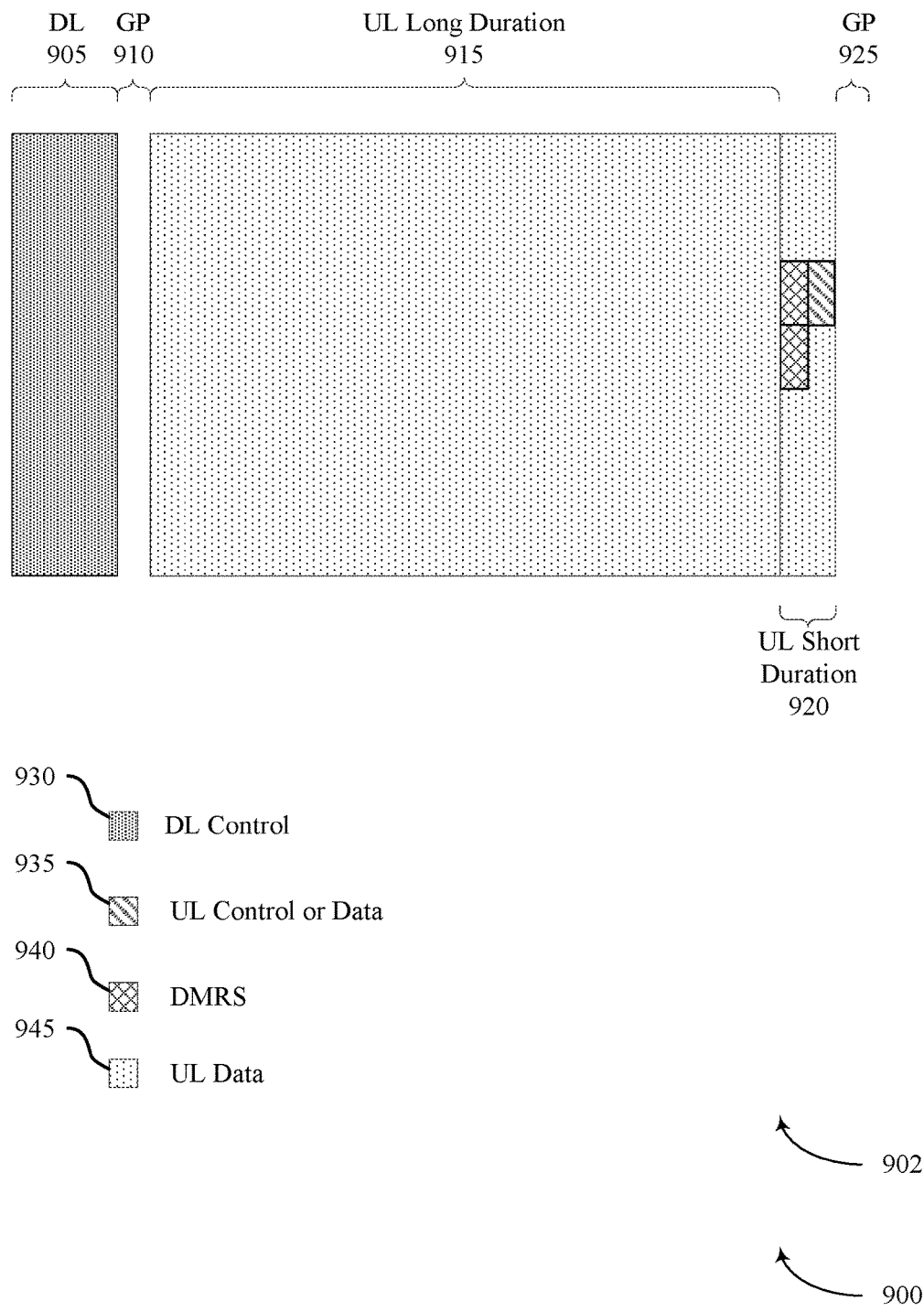
FIG. 9 illustrates an example of a self-contained transmission time interval (TTI) that supports multiplexing uplink transmissions with transmit diversity with a single carrier waveform in accordance with aspects of the present disclosure.

FIG. 9 illustrates an example of a self-contained TTI 900 for multiplexing uplink transmissions with transmit diversity with single carrier waveform. The self-contained TTI 900 may be used, for example, in communications between a UE and a base station such as discussed above with respect to FIGS. 1 and 2.

As mentioned above, in some examples a self-contained TDD subframe structure may be used for communications between a UE and a base station. In the example of FIG. 9, an UL-centric subframe 902, may include a downlink portion 905, located at the beginning of the UL-centric subframe 902, followed by GP 910, followed by uplink transmissions that may include an uplink long duration portion 915 and an uplink short duration 920 or uplink common burst. A second GP 925 may follow the uplink short duration 920. Within DL portion 905, DL control information 930 may occupy all or a portion of the entire transmission bandwidth, and may be multiplexed with other DL data resources in some cases, in order to use the entire transmission bandwidth.

Within the uplink long duration portion 915 and an uplink short duration 920 uplink data 945 may be transmitted. In one aspect, as discussed above, the uplink short duration 920 may include a single OFDM symbol, that may be physically split into two half symbols in which the OFDM symbol duration is reduced in half and tone spacing is doubled, that may generate a first half-symbol and a second half-symbol. Within the uplink short duration, uplink control or data 935 may be transmitted in the second half-symbol, and one or more UEs may transmit a DMRS 940 in the first half-symbol. In some cases, DMRS 940 and UL control or data 935 may span multiple resource blocks (RBs). In the example of FIG. 9, a multiple UEs may be multiplexed and may concurrently transmit in the uplink short duration 920, and DMRS 940 transmissions of the multiple UEs may be transmitted using different combs or interlaces, or using different CSs. In one aspect, the uplink control or data 935 (e.g., PUCCH or PUSCH) may be transmitted in the second half-symbol using STBC before DFT on the modulated symbol level, as discussed above, in which the half-symbol may be partitioned into two quarter-symbols and STBC performed at the modulation symbol level for each quarter-symbol.

Figure 10:
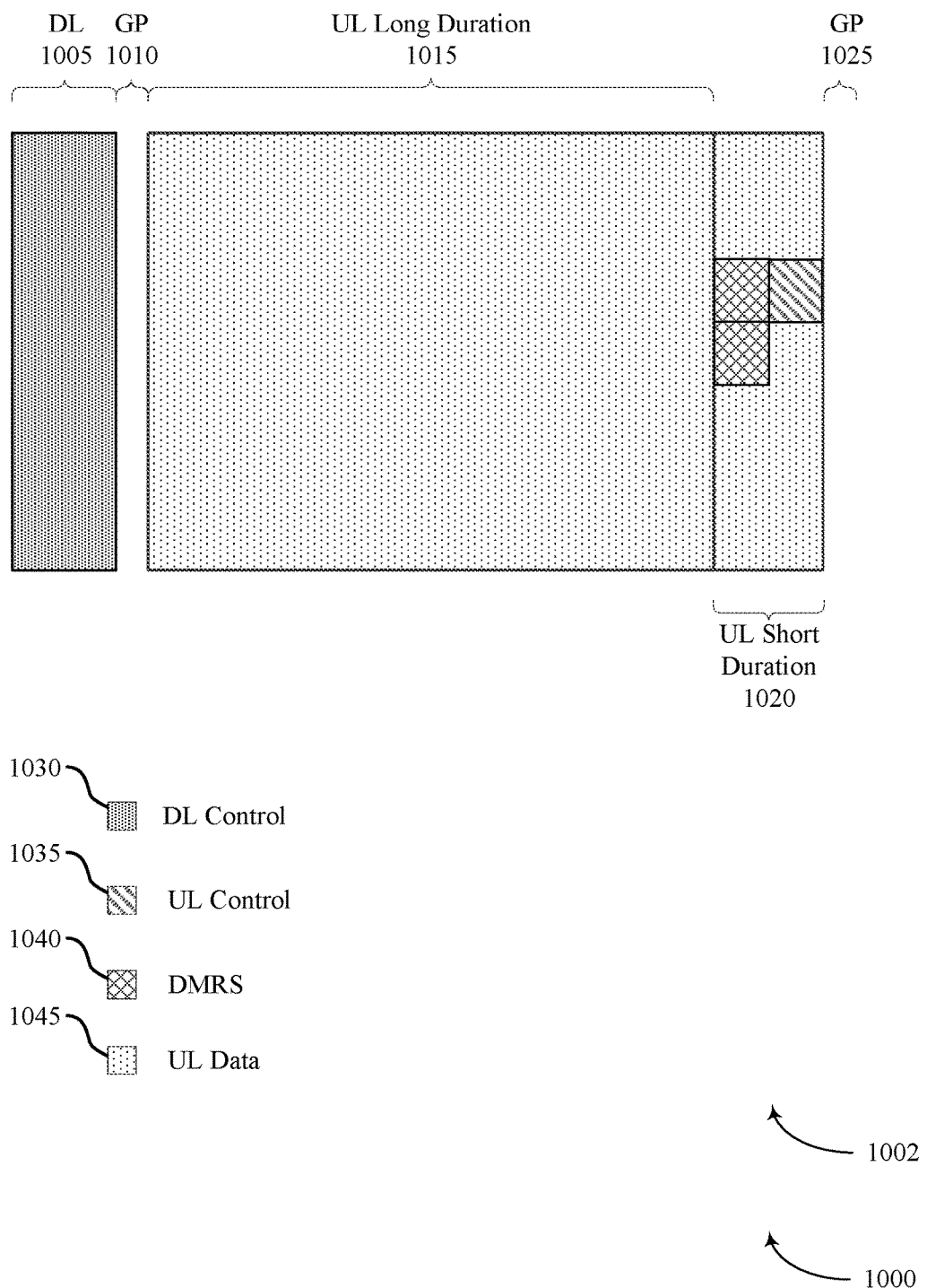
FIG. 10 illustrates an example of a self-contained transmission time interval (TTI) that supports multiplexing uplink transmissions with transmit diversity with a single carrier waveform in accordance with aspects of the present disclosure.

FIG. 10 illustrates an example of a self-contained TTI 1000 for multiplexing uplink transmissions with transmit diversity with a single carrier waveform. The self-contained TTI 1000 may be used, for example, in communications between a UE and a base station such as discussed above with respect to FIGS. 1 and 2.

As mentioned above, in some examples a self-contained TDD subframe structure may be used for communications between a UE and a base station. In the example of FIG. 10, an UL-centric subframe 1002, may include a downlink portion 1005, located at the beginning of the UL-centric subframe 1002, followed by GP 1010, followed by uplink transmissions that may include an uplink long duration portion 1015 and an uplink short duration 1020 or uplink common burst. A second GP 1025 may follow the uplink short duration 1020. Within DL portion 1005, DL control information 1030 may occupy all or a portion of the entire transmission bandwidth, and may be multiplexed with other DL data resources in some cases, in order to use the entire transmission bandwidth.

Within the uplink long duration portion 1015 and an uplink short duration 1020 uplink data 1045 may be transmitted. In one aspect, the uplink short duration 1020 may span two OFDM symbols, namely a first symbol and a second symbol within the uplink short duration 1020. Within the uplink short duration, uplink control or data 1035 may be transmitted in the second symbol, and one or more UEs may transmit a DMRS 1040 in the first symbol. In some cases, DMRS 1040 and UL control or data 1035 may span multiple resource blocks (RBs). In the example of FIG. 10, a multiple UEs may be multiplexed and may concurrently transmit in the uplink short duration 1020, and DMRS 1040 transmissions of the multiple UEs may be transmitted using different combs or interlaces, or using different CSs. In one aspect, the uplink control or data 1035 (e.g., PUCCH or PUSCH) may be transmitted in the second symbol using STBC before DFT on the modulated symbol level, as discussed above, in which the second symbol may be partitioned into two half symbols and STBC performed at the modulation symbol level for each half symbol.

Figure 11:
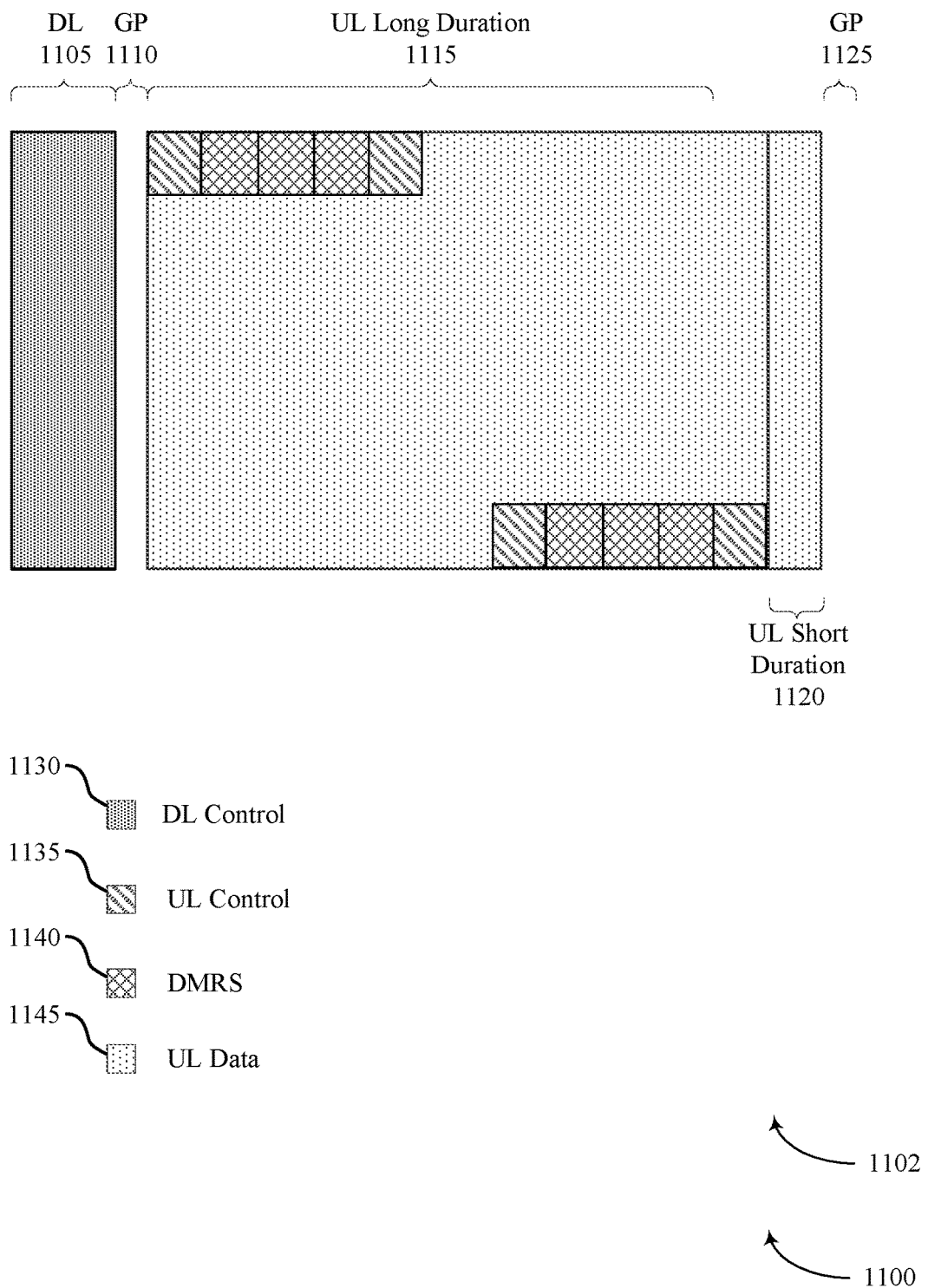
FIG. 11 illustrates an example of a self-contained transmission time interval (TTI) that supports multiplexing uplink transmissions with transmit diversity with a single carrier waveform in accordance with aspects of the present disclosure.

FIG. 11 illustrates an example of a self-contained TTI 1100 for multiplexing uplink transmissions with transmit diversity with a single carrier waveform. The self-contained TTI 1100 may be used, for example, in communications between a UE and a base station such as discussed above with respect to FIGS. 1 and 2.

As discussed above, in some examples a self-contained TDD subframe structure may be used for communications between a UE and a base station. In the example of FIG. 11, an UL-centric subframe 1102, may include a downlink portion 1105, located at the beginning of the UL-centric subframe 1102, followed by GP 1110, followed by uplink transmissions that may include an uplink long duration portion 1115 and an uplink short duration 1120 or uplink common burst. A second GP 1125 may follow the uplink short duration 1120. Within DL portion 1105, DL control information 1130 may occupy all or a portion of the entire transmission bandwidth, and may be multiplexed with other DL data resources in some cases, in order to use the entire transmission bandwidth.

Within the uplink long duration portion 1115 and an uplink short duration 1120 uplink data 1145 may be transmitted. In the example of FIG. 11, uplink control information 1135 may be transmitted in the uplink long duration

1115, and may span one RB. In one aspect, an amount of data to be transmitted in the uplink transmissions may be identified, and the STBC scheme selected based on an amount of data relative to one or more thresholds. In the example, of FIG. 11, the amount of uplink data to be transmitted in the uplink control information 1135 may be below a first threshold value, such as only one or two bits of payload. In such cases, the control information 1135 of each of two UEs may be transmitted using STBC before DFT to achieve transmit diversity. In some cases, the different UEs may be allocated different blocks of resources within the uplink long duration 1115. Different UEs may be multiplexed by applying an OCC to the STBC transmissions of control information 1135, and each UE may transmit DMRS 1140 transmissions concurrently using different combs or different CSs. In one aspect, an OCC length of 2 may be used for the control information 1135, across two OFDM symbols, that do not extend into the UL short duration 1120. In some examples, an OCC length of 3 may be used for control information 1135 for control information across one symbol or if a control symbol extends into the UL short duration 1120. In other examples, the control information may be multiplexed within OFDM symbols, rather than across OFDM symbols, as discussed above.

Figure 12:
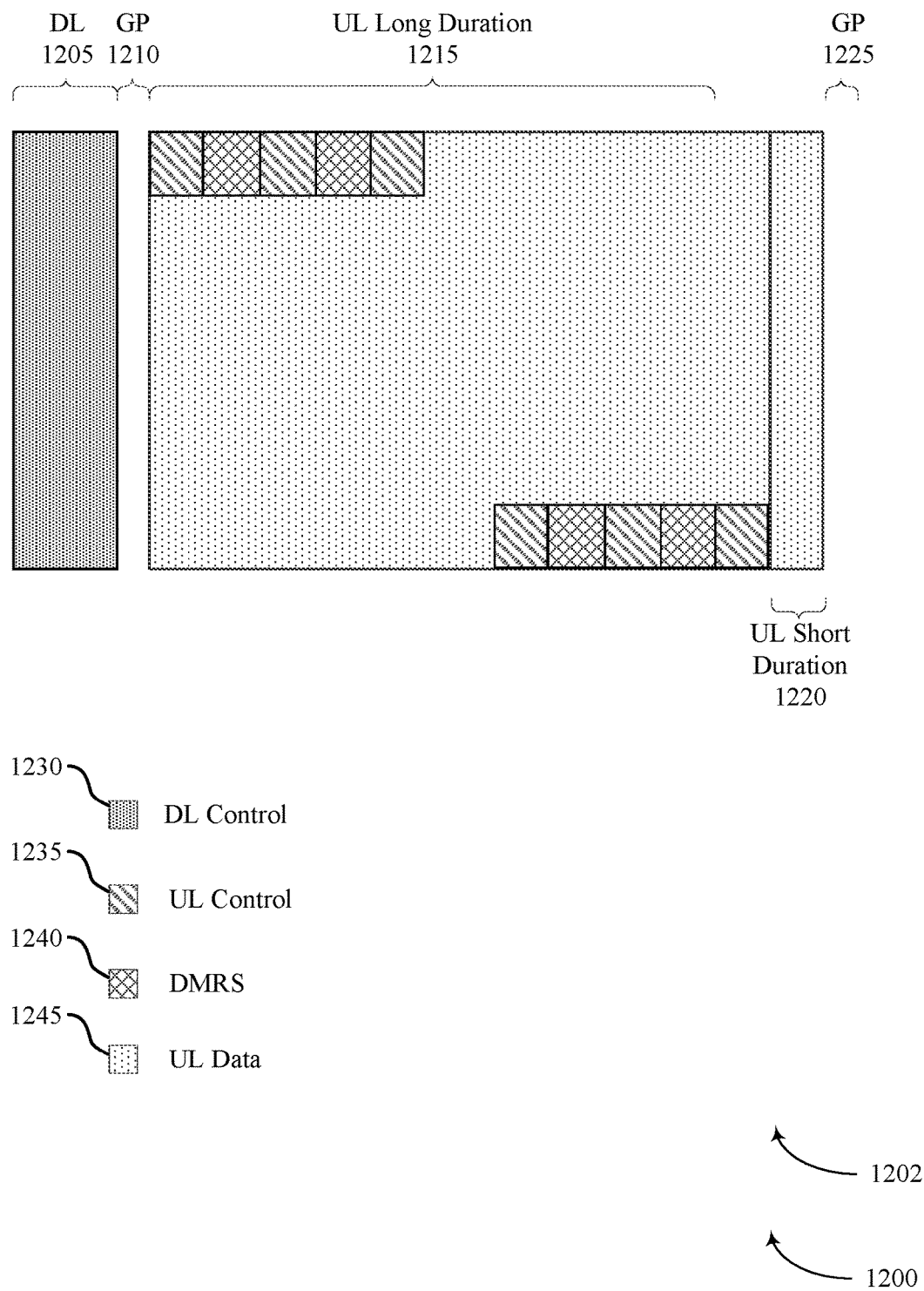
FIG. 12 illustrates an example of a self-contained transmission time interval (TTI) that supports multiplexing uplink transmissions with transmit diversity with a single carrier waveform in accordance with aspects of the present disclosure.

FIG. 12 illustrates an example of a self-contained TTI 1200 for multiplexing uplink transmissions with transmit diversity with a single carrier waveform. The self-contained TTI 1200 may be used, for example, in communications between a UE and a base station such as discussed above with respect to FIGS. 1 and 2.

As discussed above, in some examples a self-contained TDD subframe structure may be used for communications between a UE and a base station. In the example of FIG. 12, an UL-centric subframe 1202, may include a downlink portion 1205, located at the beginning of the UL-centric subframe 1202, followed by GP 1210, followed by uplink transmissions that may include an uplink long duration portion 1215 and an uplink short duration 1220 or uplink common burst. A second GP 1225 may follow the uplink short duration 1220. Within DL portion 1205, DL control information 1230 may occupy all or a portion of the entire transmission bandwidth, and may be multiplexed with other DL data resources in some cases, in order to use the entire transmission bandwidth.

Within the uplink long duration portion 1215 and an uplink short duration 1220 uplink data 1245 may be transmitted. In the example of FIG. 12, uplink control information 1235 may be transmitted in the uplink long duration 1215, and may span one RB or multiple RBs. In one aspect, an amount of data to be transmitted in the uplink transmissions may be identified, and the STBC scheme selected based on an amount of data relative to one or more thresholds. In one example of FIG. 12, the amount of uplink data to be transmitted in the uplink control information 1235 may be above a first threshold value and below a second threshold value, corresponding to a relatively small amount of payload such as about 10 bits. In such cases, the control information 1235 of each of two UEs may be transmitted using STBC before DFT to achieve transmit diversity. Different UEs may be code division multiplexed by applying an OCC to the STBC transmissions within OFDM symbols. In some cases, for example, 6, or 7, or 8 different QPSK modulation symbols may be transmitted providing a PUCCH payload size of, for example, 12, or 14, or 16 bits. OCC is applied on the modulated symbol level to the STBC for the uplink transmissions.

In another example of FIG. 12, the amount of uplink data to be transmitted in the uplink control information 1235 may be above the second threshold value and below a third threshold value, corresponding to a median amount of payload such as about 48 bits. In such cases, the control information 1235 of each of two UEs may be transmitted using STBC before DFT to achieve transmit diversity. Different UEs may be code division multiplexed by applying an OCC to the STBC transmissions across OFDM symbols. In one aspect, for example, an OCC length of 3 may be used with PDCCH spanning 2 symbols that do not extend into the UL short duration 1220. In some cases, an OCC length of 4 may be used with PDCCH spanning one symbol, or if a PUCCH extends into the UL short duration 1220. A PUCCH payload size may be, for example, 12*2*2, or 48 bits.

In another example of FIG. 12, the amount of uplink data to be transmitted in the uplink control information 1235 may be above the third threshold, corresponding to a relatively large amount of payload such as hundreds of bits. In such cases, the control information 1235 of each of two UEs may be transmitted using STBC before DFT to achieve transmit diversity. Different UEs may not be multiplexed in such cases. A PUCCH payload size may be, for non-multiplexing of UEs, for example, 12*2*(6 or 7 or 8)=144/168/192 bits per RB, depending upon the number of QPSK modulation symbols.

Figure 13:
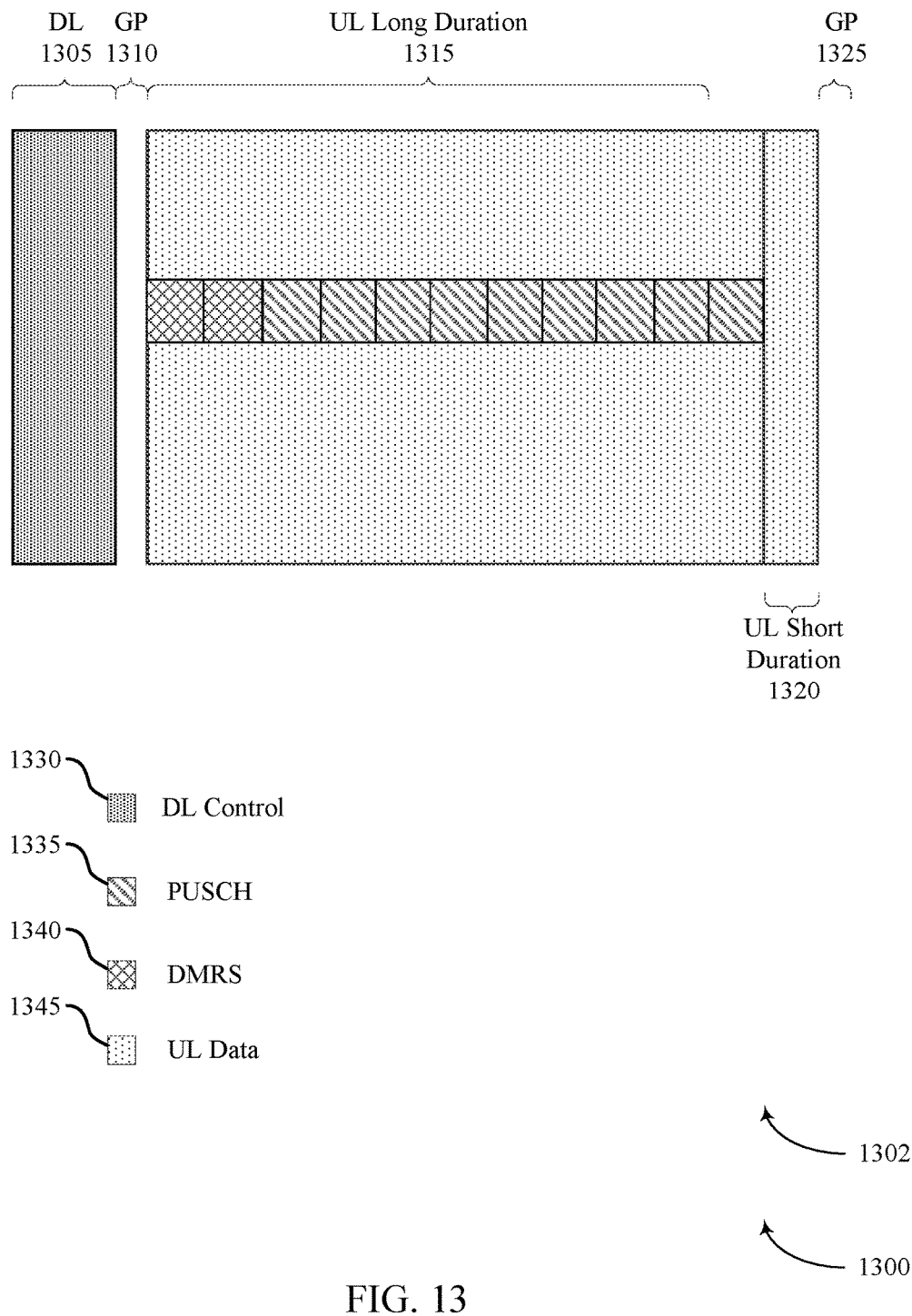
FIG. 13 illustrates an example of a self-contained transmission time interval (TTI) that supports multiplexing uplink transmissions with transmit diversity with a single carrier waveform in accordance with aspects of the present disclosure.

FIG. 13 illustrates an example of a self-contained TTI 1300 for multiplexing uplink transmissions with transmit diversity with single carrier waveform. The self-contained TTI 1300 may be used, for example, in communications between a UE and a base station such as discussed above with respect to FIGS. 1 and 2.

As discussed above, in some examples a self-contained TDD subframe structure may be used for communications between a UE and a base station. In the example of FIG. 13, an UL-centric subframe 1302, may include a downlink portion 1305, located at the beginning of the UL-centric subframe 1302, followed by GP 1310, followed by uplink transmissions that may include an uplink long duration portion 1315 and an uplink short duration 1320 or uplink common burst. A second GP 1325 may follow the uplink short duration 1320. Within DL portion 1305, DL control information 1330 may occupy all or a portion of the entire transmission bandwidth, and may be multiplexed with other DL data resources in some cases, in order to use the entire transmission bandwidth.

Within the uplink long duration portion 1315 and an uplink short duration 1320 uplink data 1345 may be transmitted. In the example of FIG. 13, uplink shared channel information (PUSCH) 1335 may be transmitted in the uplink long duration 1315, and may span multiple RBs. In this example, PUSCH 1335 may have a relatively large amount of data to be transmitted, and PUSCH 1335 transmissions of multiple UEs may not be multiplexed. In such cases, the PUSCH 1335 may be transmitted using STBC before DFT to achieve transmit diversity for PUSCH 1335 transmitted using multiple transmit antennas with a single carrier waveform. In other case, if the amount of PUSCH 1335 data is lower, UEs may be multiplexed using any of the techniques discussed above for multiplexing multiple UEs.

Figure 14:
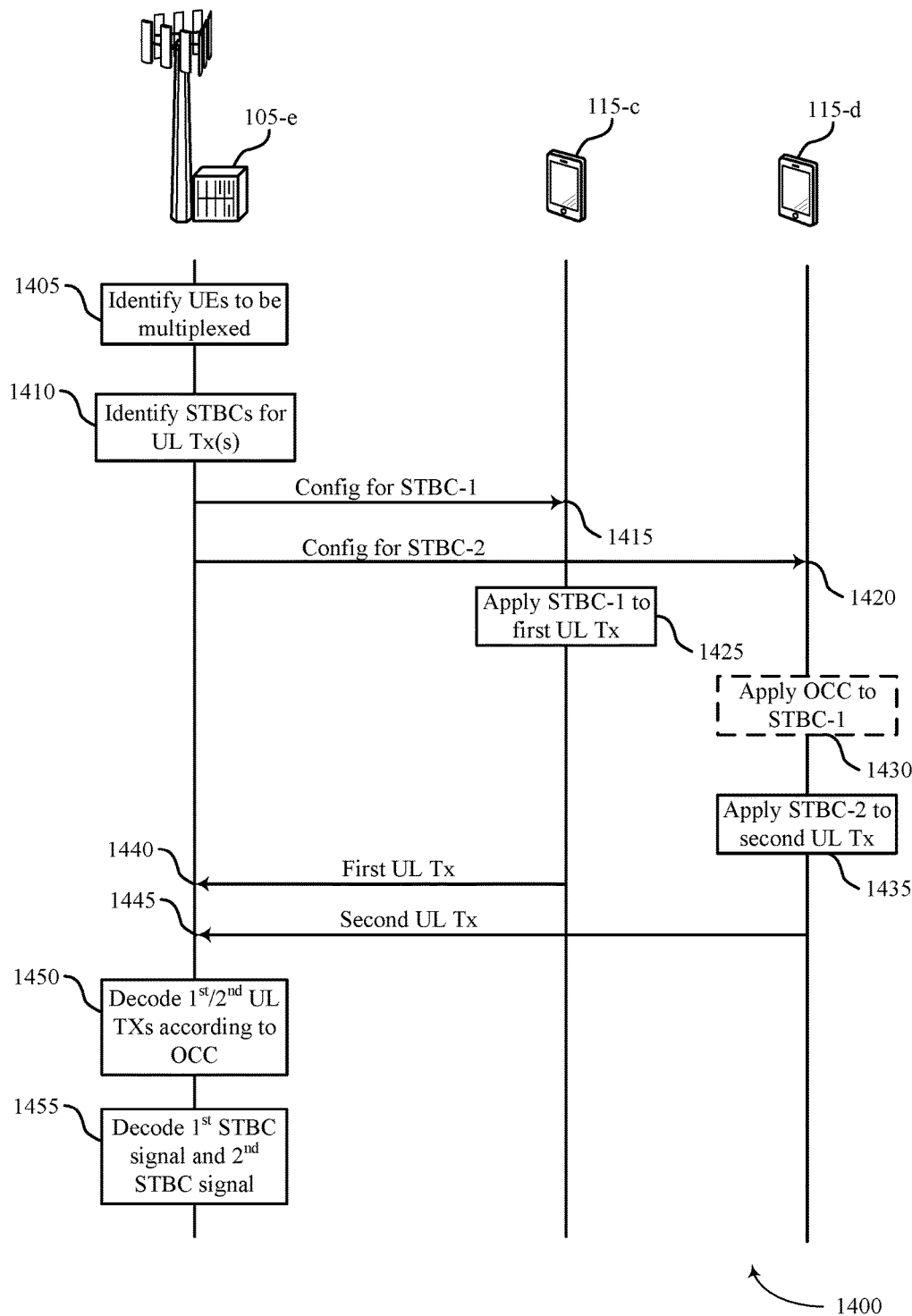
FIG. 14 illustrates an example of a process flow for multiplexing uplink transmissions with transmit diversity with a single carrier waveform in accordance with aspects of the present disclosure.

FIG. 14 illustrates an example of a process flow 1400 for multiplexing uplink transmissions with transmit diversity with a single carrier waveform. Process flow 1400 may include a base station 105-*b*, a first UE 115-*c*, and a second UE 115-*d*, that may be examples of the corresponding devices described with reference to FIGS. 1 and 2.

At block 1405, base station 105-*b* may identify UEs to be multiplexed in uplink transmissions. Such an identification may be made according to, for example, an amount of data that is to be transmitted by each UE 115, an amount of available uplink resources, or combinations thereof, for example. At block 1410, the base station 105-*b* may identify STBCs to be used for uplink transmissions from each UE 115. In one aspect, the STBCs may be generated by using OCCs on one STBC to generate a second STBC, such that transmissions from multiple UEs 115 transmitted according to the different STBCs have a single-carrier waveform property. The base station 105-*b* may transmit a configuration for a first STBC 1415 to the first UE 115-*c*, and may transmit a configuration for a second STBC 1420 to the second UE 115-*d*. In some cases, the configuration for different STBCs at different UEs 115 may be configured prior to a grant of uplink resources, and an uplink resource grant may include an indication that the uplink transmission is to be multiplexed. In other cases, an uplink grant may include the STBC configuration.

The first UE 115-*c*, at block 1425, may apply the first STBC to a first uplink transmission. The first STBC may be applied, for example, before a DFT of the first uplink transmission to provide transmit diversity in a single-carrier waveform for multiple transmit antennas. The second UE 115-*d*, may optionally apply an OCC to the first STBC, at optional block 1430, to generate a second STBC. In one aspect, the second UE 115-*d* may simply be configured with the second STBC, and may not need to apply an OCC. At block 1435, the second UE 115-*d* may apply the second STBC to a second uplink transmission. The second STBC may be applied, for example, before a DFT of the second uplink transmission to provide transmit diversity in a single-carrier waveform for multiple transmit antennas. The OCC applied to generate the second STBC may allow the first UE 115-*c* and the second UE 115-*d* to concurrently transmit the first UL transmission 1440 and the second UL transmission 1445.

At block 1450, the base station 105-*b* may decode the first and second uplink transmissions according to the OCC applied to generate the STBCs. Such decoding may be generate separate symbol streams for the first UL transmission and the second UL transmission. At block 1455, the base station 105-*b* may decode the first UL transmission stream according to the first STBC, and may decode the second UL transmission stream according to the second STBC. Receive processing may then be performed on the decoded transmission streams for multiple transmit antennas used for the uplink transmissions.

Figure 15:
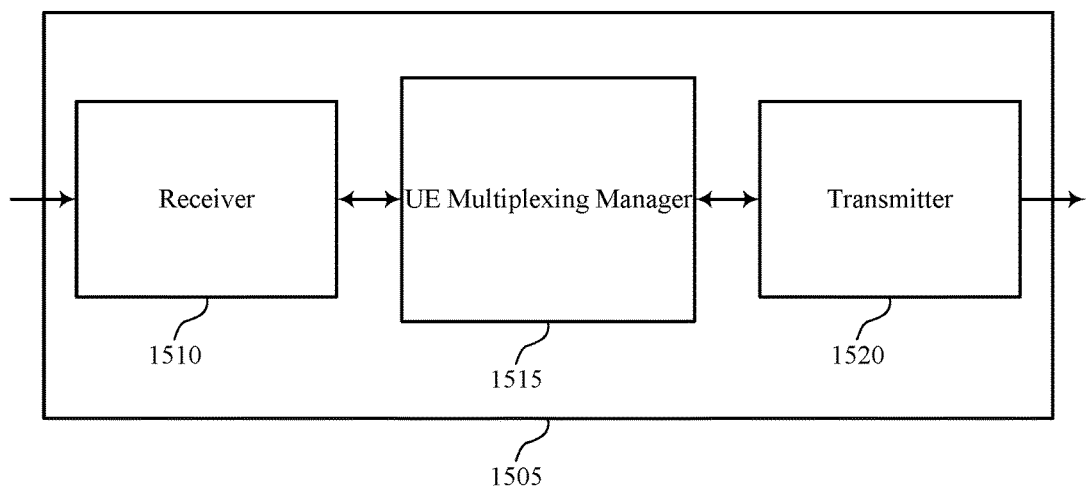
FIGS. 15 through 17 show block diagrams of a device that supports multiplexing uplink transmissions with transmit diversity with single carrier waveform in accordance with aspects of the present disclosure.

FIG. 15 shows a block diagram 1500 of a wireless device 1505 that supports multiplexing uplink transmissions with transmit diversity with single carrier waveform in accordance with various aspects of the present disclosure. Wireless device 1505 may be an example of aspects of a user equipment (UE) 115 as described with reference to FIG. 1. Wireless device 1505 may include receiver 1510, UE multiplexing manager 1515, and transmitter 1520. Wireless device 1505 may also include a processor. Each of these components may be in communication with one another (e.g., via one or more buses).

Receiver 1510 may receive information such as packets, user data, or control information associated with various information channels (e.g., control channels, data channels, and information related to multiplexing uplink transmissions with transmit diversity with single carrier waveform, etc.). Information may be passed on to other components of the device. The receiver 1510 may be an example of aspects of the transceiver 1835 described with reference to FIG. 18.

UE multiplexing manager 1515 may be an example of aspects of the UE multiplexing manager 1815 described with reference to FIG. 18.

UE multiplexing manager 1515 and/or at least some of its various sub-components may be implemented in hardware, software executed by a processor, firmware, or any combination thereof. If implemented in software executed by a processor, the functions of the UE multiplexing manager 1515 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The UE multiplexing manager 1515 and/or at least some of its various sub-components may be physically located at various positions, including being distributed such that portions of functions are implemented at different physical locations by one or more physical devices. In some examples, UE multiplexing manager 1515 and/or at least some of its various sub-components may be a separate and distinct component in accordance with various aspects of the present disclosure. In other examples, UE multiplexing manager 1515 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE multiplexing manager 1515 may identify a first STBC to be used for a first uplink transmission of a first UE, apply an OCC to the first STBC to generate a second STBC to be used for a second uplink transmission, apply the second STBC to at least a portion of an OFDM symbol to be transmitted in the second uplink transmission, and transmit the second uplink transmission concurrently with the first uplink transmission.

Transmitter 1520 may transmit signals generated by other components of the device. In one aspect, the transmitter 1520 may be collocated with a receiver 1510 in a transceiver module. For example, the transmitter 1520 may be an example of aspects of the transceiver 1835 described with reference to FIG. 18. The transmitter 1520 may include a single antenna, or it may include a set of antennas.

Figure 16:
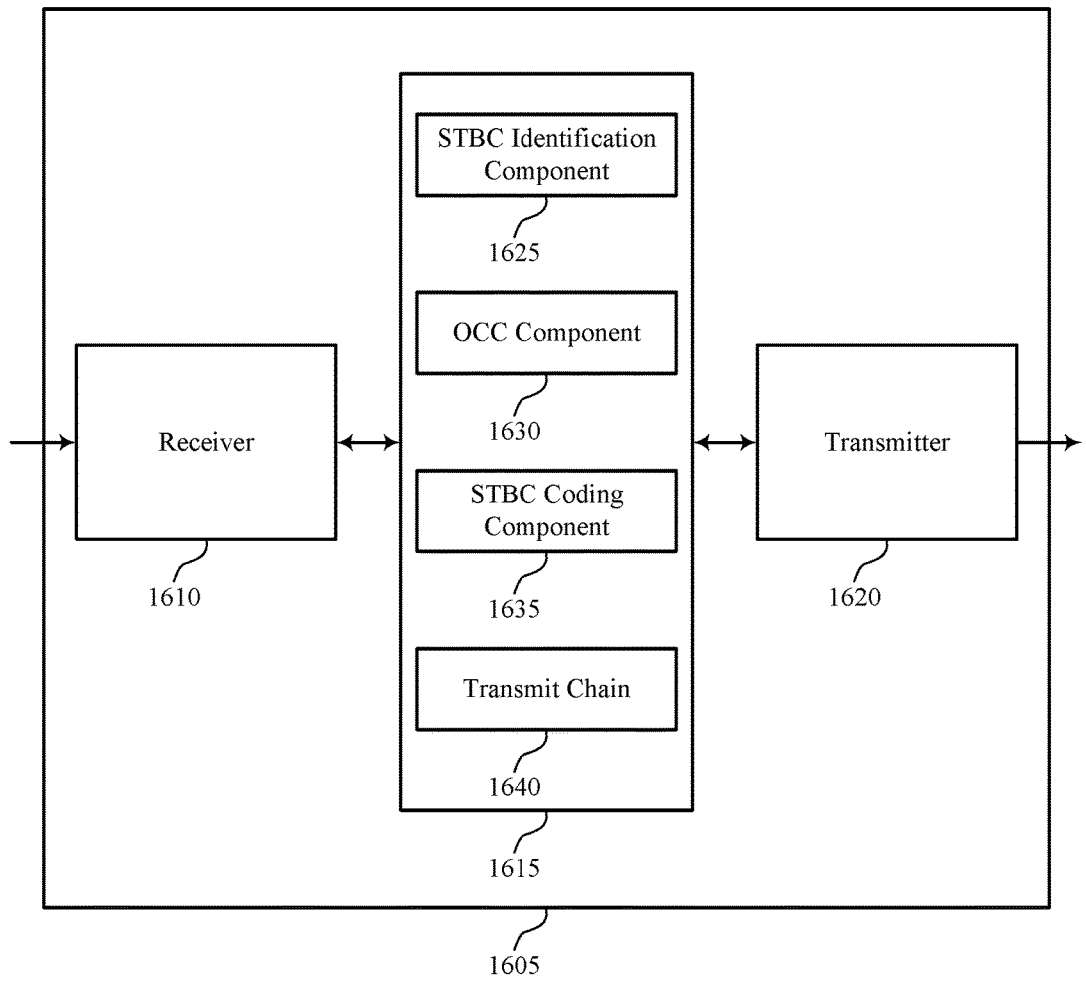

FIG. 16 shows a block diagram 1600 of a wireless device 1605 that supports multiplexing uplink transmissions with transmit diversity with single carrier waveform in accordance with various aspects of the present disclosure. Wireless device 1605 may be an example of aspects of a wireless device 1505 or a UE 115 as described with reference to FIGS. 1 and 15. Wireless device 1605 may include receiver 1610, UE multiplexing manager 1615, and transmitter 1620. Wireless device 1605 may also include a processor. Each of these components may be in communication with one another (e.g., via one or more buses).

Receiver 1610 may receive information such as packets, user data, or control information associated with various information channels (e.g., control channels, data channels, and information related to multiplexing uplink transmissions with transmit diversity with single carrier waveform, etc.). Information may be passed on to other components of the device. The receiver 1610 may be an example of aspects of the transceiver 1835 described with reference to FIG. 18.

UE multiplexing manager 1615 may be an example of aspects of the UE multiplexing manager 1815 described with reference to FIG. 18. UE multiplexing manager 1615 may also include STBC identification component 1625, OCC component 1630, STBC coding component 1635, and transmit chain 1640.

STBC identification component 1625 may identify a first STBC to be used for a first uplink transmission of a first UE. OCC component 1630 may apply an OCC to the first STBC to generate a second STBC to be used for a second uplink transmission of a second UE. In some cases, OCC component 1630 may apply the OCC to the first STBC across two or more OFDM symbols when the data spans two or more OFDM symbols, or, apply the OCC to the first STBC at the modulation symbol level within a single OFDM symbol when the data is to be transmitted in the single OFDM symbol.

STBC coding component 1635 may apply the second STBC to at least a portion of an OFDM symbol to be transmitted in the second uplink transmission. In one aspect, STBC coding component 1635 may identify a first portion of an uplink common burst portion for reference signal transmissions and a second portion of the uplink common burst portion for control channel or shared channel data transmissions, and where the first STBC is applied to the first uplink transmission of the first UE in the second portion of the uplink common burst portion and the second STBC is applied to the second uplink transmission of the second UE in the second portion of the uplink common burst portion.

In one aspect, STBC coding component 1635 may identify that the OCC is to be applied to the first STBC at a modulation symbol level within a single OFDM symbol or at an OFDM symbol level across multiple OFDM symbols, based on the amount of data to be transmitted in the second uplink transmission. In some cases, the first STBC is applied to a first OFDM symbol and a second OFDM symbol that are to be transmitted in the first uplink transmission, and where the applying the second STBC further includes applying the second STBC across a third OFDM symbol and a fourth OFDM symbol to be transmitted in the second uplink transmission. In one aspect, the first STBC is applied to a first portion of a first OFDM symbol and a second portion of the first OFDM symbol to be transmitted in the first uplink transmission, and where the applying the second STBC further includes applying the second STBC across a first portion of a second OFDM symbol and a second portion of the second OFDM symbol, the second OFDM symbol to be transmitted in the second uplink transmission concurrently with the first OFDM symbol.

In one aspect, the first portion of the uplink common burst portion occupies a first OFDM symbol of the uplink common burst portion and the second portion of the uplink common burst portion occupies a second OFDM symbol of the uplink common burst portion, where the first STBC is applied to a first half of the second OFDM symbol and a second half of the second OFDM symbol to be transmitted by the first UE, and where the applying the second STBC further includes applying the second STBC to a concurrent transmission of the second UE across the first half of the second OFDM symbol and the second half of the second OFDM symbol. In some cases, the first portion of the uplink common burst portion occupies a first shortened OFDM symbol of the uplink common burst portion and the second portion of the uplink common burst portion occupies a second shortened OFDM symbol of the uplink common burst portion, the second shortened OFDM symbol includes a set of modulation symbols, the first STBC is applied to a first subset of the set of modulation symbols to be transmitted by the first UE and a second subset of the set of modulation symbols to be transmitted by the first UE. In one aspect, the applying the OCC to the first STBC includes applying the OCC to the first STBC across the first subset of the set of modulation symbols and the second subset of the set of modulation symbols to obtain the second STBC. In some cases, the applying the second STBC includes applying the second STBC to a concurrent transmission of the second UE across the first subset of the set of modulation symbols and the second subset of the set of modulation symbols.

Transmit chain 1640 may transmit the second uplink transmission concurrently with the first uplink transmission in conjunction with transmitter 1620. In one aspect, the transmitter 1620 may be collocated with a receiver 1610 in a transceiver module. For example, the transmitter 1620 may be an example of aspects of the transceiver 1835 described with reference to FIG. 18. The transmitter 1620 may include a single antenna, or it may include a set of antennas.

Figure 17:
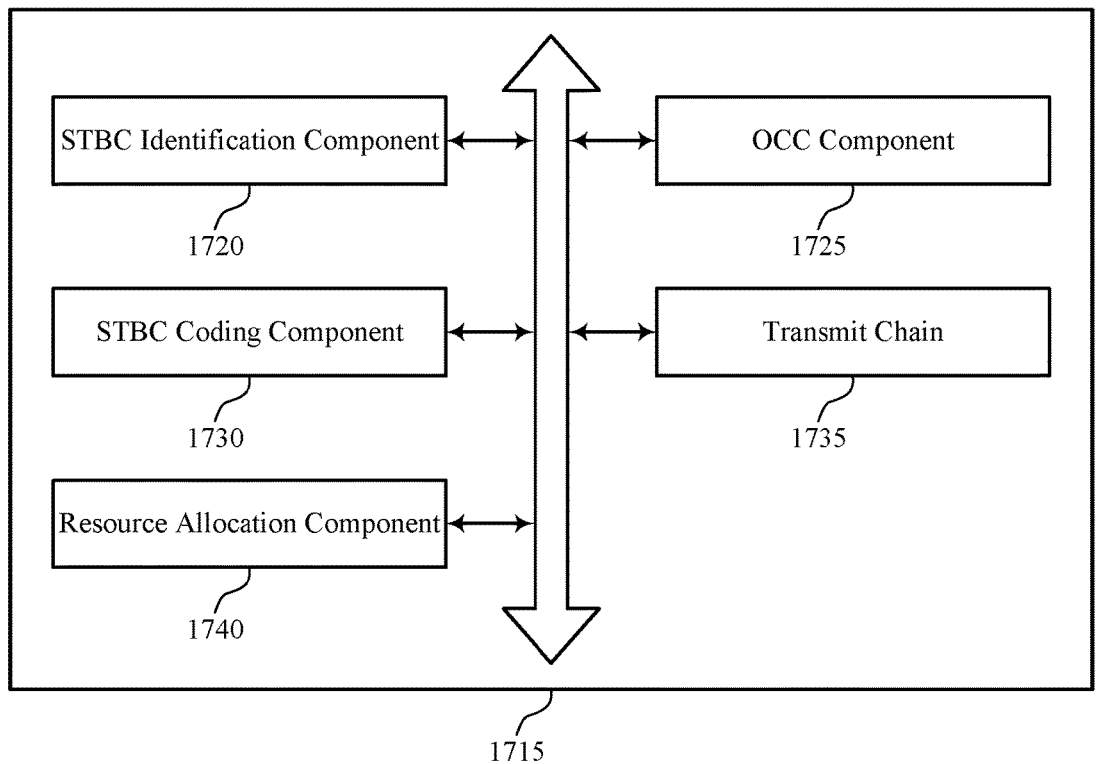

FIG. 17 shows a block diagram 1700 of a UE multiplexing manager 1715 that supports multiplexing uplink transmissions with transmit diversity with single carrier waveform in accordance with various aspects of the present disclosure. The UE multiplexing manager 1715 may be an example of aspects of a UE multiplexing manager 1515, a UE multiplexing manager 1615, or a UE multiplexing manager 1815 described with reference to FIGS. 15, 16, and 18. The UE multiplexing manager 1715 may include STBC identification component 1720, OCC component 1725, STBC coding component 1730, transmit chain 1735, and resource allocation component 1740. Each of these modules may communicate, directly or indirectly, with one another (e.g., via one or more buses).

STBC identification component 1720 may identify a first STBC to be used for a first uplink transmission of a first UE. OCC component 1725 may apply an OCC to the first STBC to generate a second STBC to be used for a second uplink transmission of a second UE. In some cases, OCC component 1725 may apply the OCC to the first STBC across two or more OFDM symbols when the data spans two or more OFDM symbols, or, apply the OCC to the first STBC at the modulation symbol level within a single OFDM symbol when the data is to be transmitted in the single OFDM symbol. In one aspect, OCC component 1725 may apply the OCC to the first STBC at the modulation symbol level within a single OFDM symbol, and apply the OCC to the first STBC at the OFDM symbol level across two or more OFDM symbols.

STBC coding component 1730 may apply the second STBC to at least a portion of an OFDM symbol to be transmitted in the second uplink transmission. In one aspect, STBC coding component 1730 may identify a first portion of the uplink common burst portion for reference signal transmissions and a second portion of the uplink common burst portion for control channel or shared channel data transmissions, and where the first STBC is applied to the first uplink transmission of the first UE in the second portion of the uplink common burst portion and the second STBC is applied to the second uplink transmission of the second UE in the second portion of the uplink common burst portion. In some cases, STBC coding component 1730 may identify that the OCC is to be applied to the first STBC at a modulation symbol level within a single OFDM symbol or at an OFDM symbol level across multiple OFDM symbols based on the amount of data to be transmitted in the second uplink transmission.

In one aspect, the first STBC is applied to a first OFDM symbol and a second OFDM symbol that are to be transmitted in the first uplink transmission, and where the applying the second STBC further includes applying the second STBC across a third OFDM symbol and a fourth OFDM symbol to be transmitted in the second uplink transmission. In some cases, the first STBC is applied to a first portion of a first OFDM symbol and a second portion of the first OFDM symbol to be transmitted in the first uplink transmission, and where the applying the second STBC further includes applying the second STBC across a first portion of a second OFDM symbol and a second portion of the second OFDM symbol, the second OFDM symbol to be transmitted in the second uplink transmission concurrently with the first OFDM symbol. In some cases, the first portion of the uplink common burst portion occupies a first OFDM symbol of the uplink common burst portion and the second portion of the uplink common burst portion occupies a second OFDM symbol of the uplink common burst portion, where the first STBC is applied to a first half of the second OFDM symbol and a second half of the second OFDM symbol to be transmitted by the first UE, and where the applying the second STBC further includes applying the second STBC to a concurrent transmission of the second UE across the first half of the second OFDM symbol and the second half of the second OFDM symbol. In some cases, the first portion of the uplink common burst portion occupies a first shortened OFDM symbol of the uplink common burst portion and the second portion of the uplink common burst portion occupies a second shortened OFDM symbol of the uplink common burst portion, the second shortened OFDM symbol includes a set of modulation symbols, the first STBC is applied to a first subset of the set of modulation symbols to be transmitted by the first UE and a second subset of the set of modulation symbols to be transmitted by the first UE. In one aspect, STBC coding component 1730 may apply the OCC to the first STBC by applying the OCC to the first STBC across the first subset of the set of modulation symbols and the second subset of the set of modulation symbols to obtain the second STBC. In some cases, the applying the second STBC includes applying the second STBC to a concurrent transmission of the second UE across the first subset of the set of modulation symbols and the second subset of the set of modulation symbols.

Transmit chain 1735 may transmit the second uplink transmission concurrently with the first uplink transmission. Resource allocation component 1740 may identify an uplink common burst portion of a self-contained transmission time interval (TTI), and identify an amount of data to be transmitted in the second uplink transmission. In one aspect, resource allocation component 1740 may identify that the amount of data to be transmitted is below a first threshold value, identify that the amount of data to be transmitted corresponds to a predetermined small payload value, identify that the amount of data to be transmitted corresponds to a predetermined medium payload value, identify that the amount of data to be transmitted corresponds to a predetermined large payload value, or determine that the second uplink transmission is to be transmitted non-concurrently with the first uplink transmission.

Figure 18:
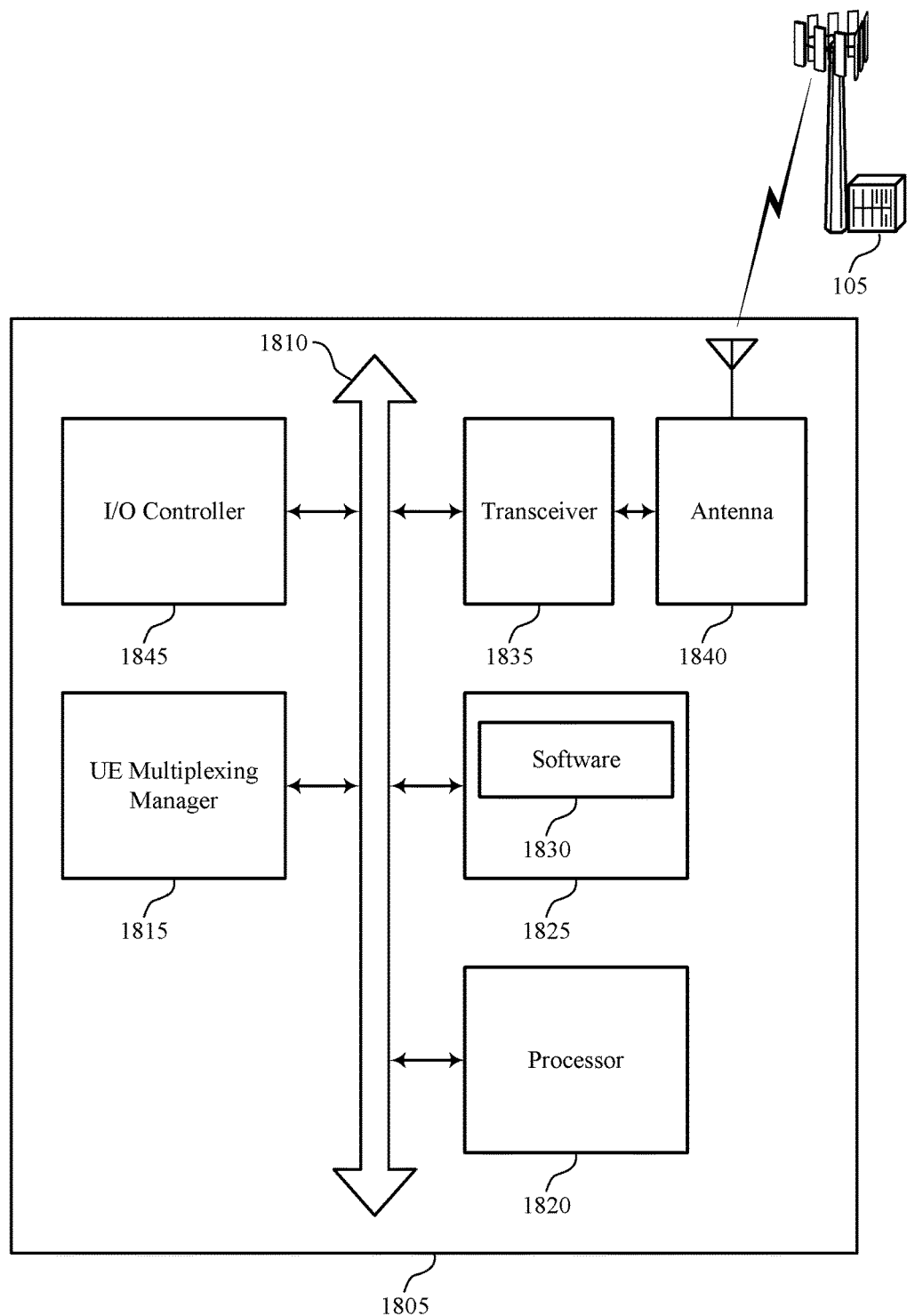
FIG. 18 illustrates a block diagram of a system including a UE that supports multiplexing uplink transmissions with transmit diversity with single carrier waveform in accordance with aspects of the present disclosure.

FIG. 18 shows a diagram of a system 1800 including a device 1805 that supports multiplexing uplink transmissions with transmit diversity with single carrier waveform in accordance with various aspects of the present disclosure. Device 1805 may be an example of or include the components of wireless device 1505, wireless device 1605, or a UE 115 as described above, e.g., with reference to FIGS. 1, 15 and 16. Device 1805 may include components for bi-directional voice and data communications including components for transmitting and receiving communications, including UE multiplexing manager 1815, processor 1820, memory 1825, software 1830, transceiver 1835, antenna 1840, and I/O controller 1845. These components may be in electronic communication via one or more busses (e.g., bus 1810). Device 1805 may communicate wirelessly with one or more base stations 105.

Processor 1820 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1820 may be configured to operate a memory array using a memory controller. In other cases, a memory controller may be integrated into processor 1820. Processor 1820 may be configured to execute computer-readable instructions stored in a memory to perform various functions (e.g., functions or tasks supporting multiplexing uplink transmissions with transmit diversity with single carrier waveform).

Memory 1825 may include random access memory (RAM) and read only memory (ROM). The memory 1825 may store computer-readable, computer-executable software 1830 including instructions that, when executed, cause the processor to perform various functions described herein. In one aspect, the memory 1825 may contain, among other things, a basic input/output system (BIOS) that may control basic hardware and/or software operation such as the interaction with peripheral components or devices.

Software 1830 may include code to implement aspects of the present disclosure, including code to support multiplexing uplink transmissions with transmit diversity with single carrier waveform. Software 1830 may be stored in a non-transitory computer-readable medium such as system memory or other memory. In some cases, the software 1830 may not be directly executable by the processor but may cause a computer (e.g., when compiled and executed) to perform functions described herein.

Transceiver 1835 may communicate bi-directionally, via one or more antennas, wired, or wireless links as described above. For example, the transceiver 1835 may represent a wireless transceiver and may communicate bi-directionally with another wireless transceiver. The transceiver 1835 may also include a modem to modulate the packets and provide the modulated packets to the antennas for transmission, and to demodulate packets received from the antennas.

In one aspect, the wireless device may include a single antenna 1840. However, in some cases the device may have more than one antenna 1840, that may be capable of concurrently transmitting or receiving multiple wireless transmissions.

I/O controller 1845 may manage input and output signals for device 1805. I/O controller 1845 may also manage peripherals not integrated into device 1805. In one aspect, I/O controller 1845 may represent a physical connection or port to an external peripheral. In some cases, I/O controller 1845 may utilize an operating system such as iOS®, ANDROID®, MS-DOS®, MS-WINDOWS®, OS/2®, UNIX®, LINUX®, or another known operating system. In other cases, I/O controller 1845 may represent or interact with a modem, a keyboard, a mouse, a touchscreen, or a similar device. In one aspect, I/O controller 1845 may be implemented as part of a processor. In some cases, a user may interact with device 1805 via I/O controller 1845 or via hardware components controlled by I/O controller 1845.

Figure 19:
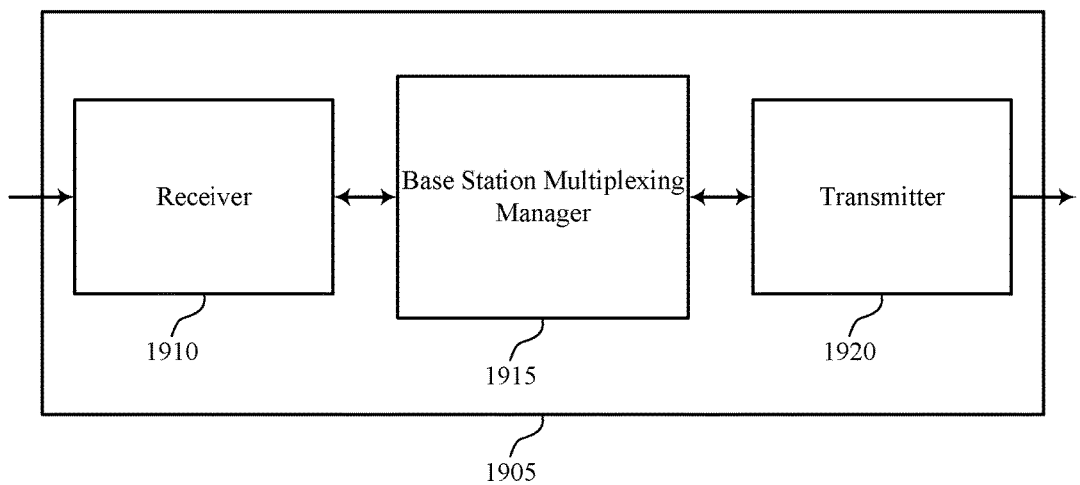
FIGS. 19 through 21 show block diagrams of a device that supports multiplexing uplink transmissions with transmit diversity with single carrier waveform in accordance with aspects of the present disclosure.

FIG. 19 shows a block diagram 1900 of a wireless device 1905 that supports multiplexing uplink transmissions with transmit diversity with single carrier waveform in accordance with various aspects of the present disclosure. Wireless device 1905 may be an example of aspects of a base station 105 as described with reference to FIG. 1. Wireless device 1905 may include receiver 1910, base station multiplexing manager 1915, and transmitter 1920. Wireless device 1905 may also include a processor. Each of these components may be in communication with one another (e.g., via one or more buses).

Receiver 1910 may receive information such as packets, user data, or control information associated with various information channels (e.g., control channels, data channels, and information related to multiplexing uplink transmissions with transmit diversity with single carrier waveform, etc.). Information may be passed on to other components of the device. The receiver 1910 may be an example of aspects of the transceiver 2235 described with reference to FIG. 22.

Base station multiplexing manager 1915 may be an example of aspects of the base station multiplexing manager 2215 described with reference to FIG. 22.

Base station multiplexing manager 1915 and/or at least some of its various sub-components may be implemented in hardware, software executed by a processor, firmware, or any combination thereof. If implemented in software executed by a processor, the functions of the base station multiplexing manager 1915 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The base station multiplexing manager 1915 and/or at least some of its various sub-components may be physically located at various positions, including being distributed such that portions of functions are implemented at different physical locations by one or more physical devices. In one aspect, base station multiplexing manager 1915 and/or at least some of its various sub-components may be a separate and distinct component in accordance with various aspects of the present disclosure. In other examples, base station multiplexing manager 1915 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station multiplexing manager 1915 may identify a first UE and a second UE that are to transmit concurrent uplink transmissions, configure the first UE to use a first STBC for a first uplink transmission, configure the second UE to use a second STBC for a second uplink transmission, the second STBC generated by applying an OCC to the first STBC, receive the first uplink transmission and the second uplink transmission, decode the received first uplink transmission and second uplink transmission according to the OCC to produce a first STBC coded portion of the first uplink transmission from the first UE and a second STBC coded portion of the second uplink transmission from the second UE, and space-time block decode the first STBC coded portion and the second STBC coded portion of the second uplink transmission.

Transmitter 1920 may transmit signals generated by other components of the device. In one aspect, the transmitter 1920 may be collocated with a receiver 1910 in a transceiver module. For example, the transmitter 1920 may be an example of aspects of the transceiver 2235 described with reference to FIG. 22. The transmitter 1920 may include a single antenna, or it may include a set of antennas.

Figure 20:
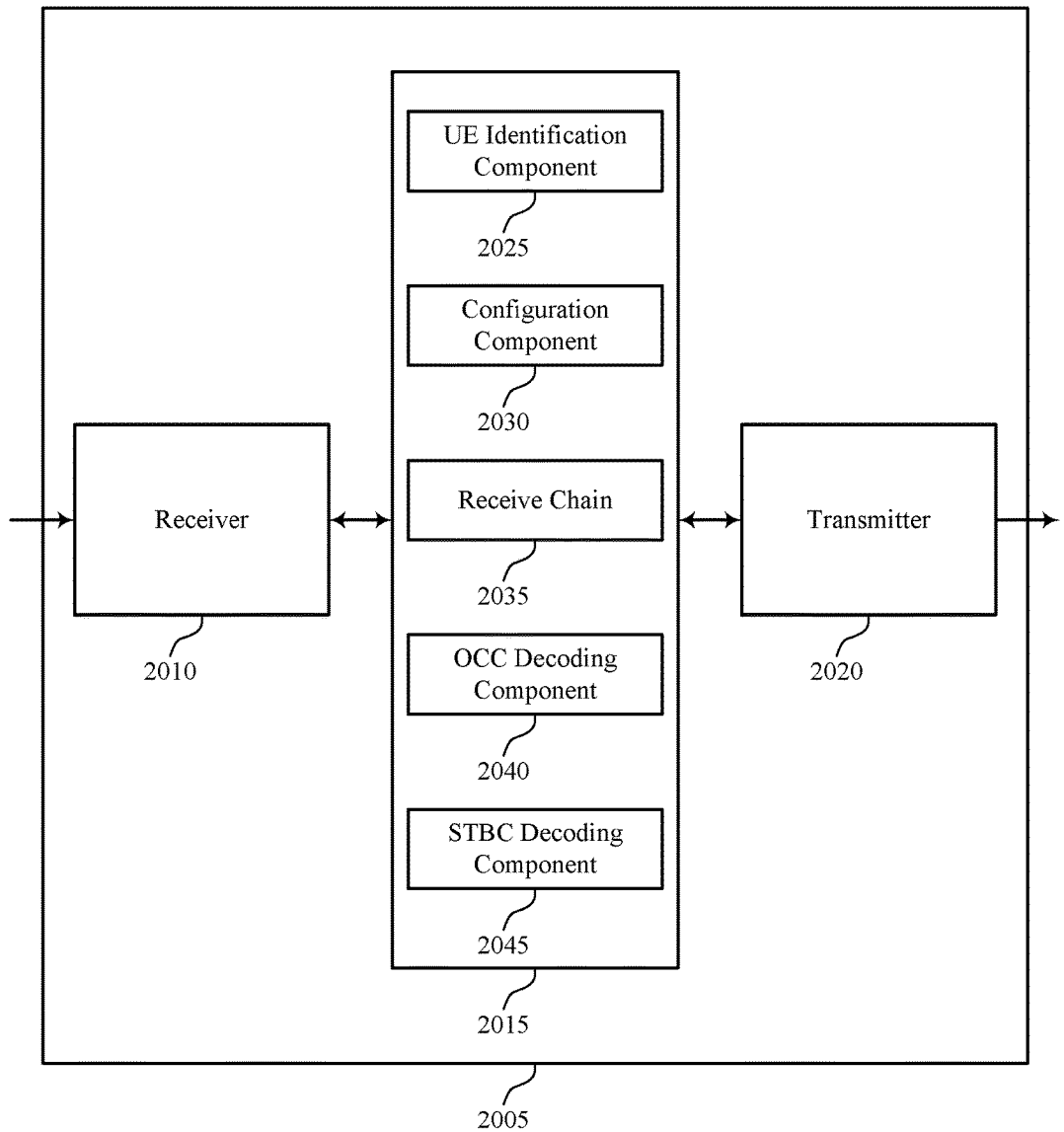

FIG. 20 shows a block diagram 2000 of a wireless device 2005 that supports multiplexing uplink transmissions with transmit diversity with single carrier waveform in accordance with various aspects of the present disclosure. Wireless device 2005 may be an example of aspects of a wireless device 1905 or a base station 105 as described with reference to FIGS. 1 and 19. Wireless device 2005 may include receiver 2010, base station multiplexing manager 2015, and transmitter 2020. Wireless device 2005 may also include a processor. Each of these components may be in communication with one another (e.g., via one or more buses).

Receiver 2010 may receive information such as packets, user data, or control information associated with various information channels (e.g., control channels, data channels, and information related to multiplexing uplink transmissions with transmit diversity with single carrier waveform, etc.). Information may be passed on to other components of the device. The receiver 2010 may be an example of aspects of the transceiver 2235 described with reference to FIG. 22.

Base station multiplexing manager 2015 may be an example of aspects of the base station multiplexing manager 2215 described with reference to FIG. 22. Base station multiplexing manager 2015 may also include UE identification component 2025, configuration component 2030, receive chain 2035, OCC decoding component 2040, and STBC decoding component 2045.

UE identification component 2025 may identify a first UE and a second UE that are to transmit concurrent uplink transmissions. Configuration component 2030 may configure the first UE to use a first STBC for a first uplink transmission, and configure the second UE to use a second STBC for a second uplink transmission, the second STBC generated by applying an OCC to the first STBC. In some cases, configuration component 2030 may configure an uplink common burst portion of a self-contained TTI, and configure a first portion of the uplink common burst portion for reference signal transmissions and a second portion of the uplink common burst portion for control channel or shared channel data transmissions, and where the first STBC is applied to the first uplink transmission of the first UE in the second portion of the uplink common burst portion and the second STBC is applied to the second uplink transmission of the second UE in the second portion of the uplink common burst portion.

In one aspect, the configuring the first UE further includes configuring the first UE to apply the first STBC across a first OFDM symbol and a second OFDM symbol to be transmitted in the first uplink transmission, and the configuring the second UE further includes configuring the second UE to apply the second STBC across a third OFDM symbol and a fourth OFDM symbol to be transmitted in the second uplink transmission concurrently with the first transmission. In some cases, the configuring the first UE further includes configuring the first UE to apply the first STBC to a first portion of a first OFDM symbol and a second portion of the first OFDM symbol to be transmitted in the first uplink transmission, and the configuring the second UE further includes configuring the second UE to apply the second STBC across a first portion of a second OFDM symbol and a second portion of the second OFDM symbol, the second OFDM symbol to be transmitted in the second uplink transmission concurrently with the first OFDM symbol.

In one aspect, the first portion of the uplink common burst portion occupies a first OFDM symbol of the uplink common burst portion and the second portion of the uplink common burst portion occupies a second OFDM symbol of the uplink common burst portion, the first STBC is applied to a first half of the second OFDM symbol and a second half of the second OFDM symbol to be transmitted by the first UE, and the configuring the second UE further includes configuring the second UE to apply the second STBC to a concurrent transmission of the second UE across the first half of the second OFDM symbol and the second half of the second OFDM symbol. In some cases, the first portion of the uplink common burst portion occupies a first shortened OFDM symbol of the uplink common burst portion and the second portion of the uplink common burst portion occupies a second shortened OFDM symbol of the uplink common burst portion, the second shortened OFDM symbol includes a set of modulation symbols, the first STBC is applied to a first subset of the set of modulation symbols to be transmitted by the first UE and a second subset of the set of modulation symbols to be transmitted by the first UE, and the second STBC is obtained by applying the OCC to the first STBC across the first subset of the set of modulation symbols and the second subset of the set of modulation symbols.

Receive chain 2035 may receive the first uplink transmission and the second uplink transmission. OCC decoding component 2040 may identify that the OCC is to be applied to the first STBC at a modulation symbol level within a single OFDM symbol or at an OFDM symbol level across multiple OFDM symbols based on the amount of data to be transmitted in the second uplink transmission, decode the received first uplink transmission and second uplink transmission according to the OCC to produce a first STBC coded portion of the first uplink transmission from the first UE and a second STBC coded portion of the second uplink transmission from the second UE. In one aspect, the OCC decoding component 2040 may apply the OCC to the first STBC across two or more OFDM symbols when the data spans two or more OFDM symbols, or apply the OCC to the first STBC at the modulation symbol level within a single OFDM symbol when the data is transmitted in the single OFDM symbol.

STBC decoding component 2045 may space-time block decode the first STBC coded portion and the second STBC coded portion of the second uplink transmission.

Transmitter 2020 may transmit signals generated by other components of the device. In some examples, the transmitter 2020 may be collocated with a receiver 2010 in a transceiver module. For example, the transmitter 2020 may be an example of aspects of the transceiver 2235 described with reference to FIG. 22. The transmitter 2020 may include a single antenna, or it may include a set of antennas.

Figure 21:
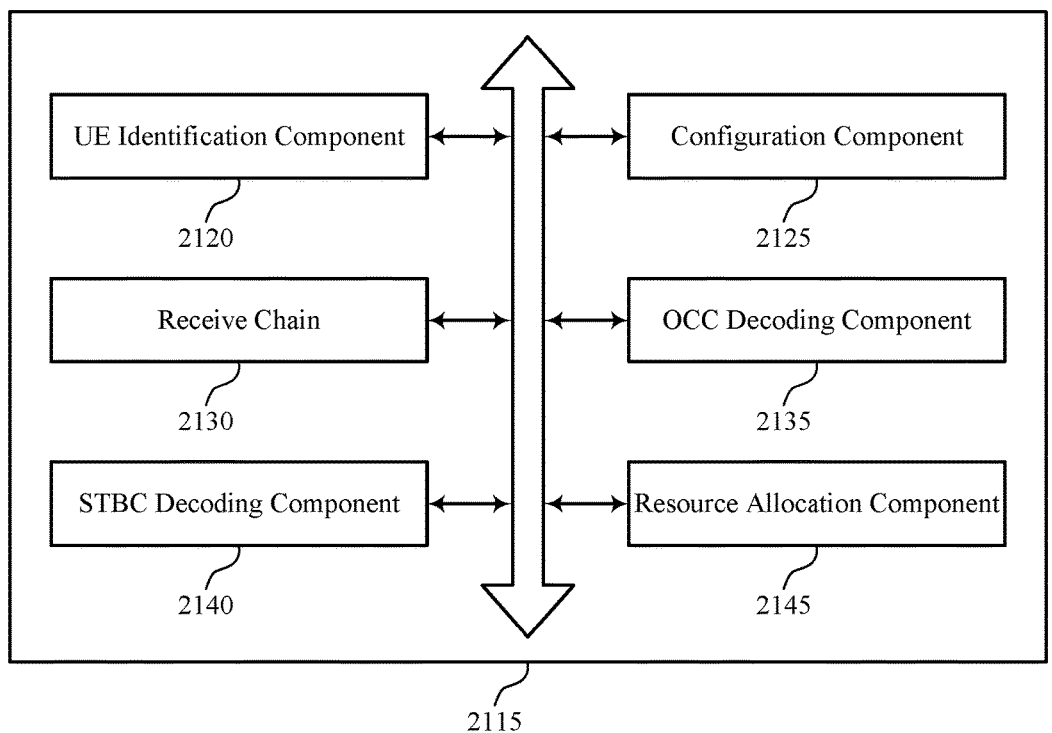

FIG. 21 shows a block diagram 2100 of a base station multiplexing manager 2115 that supports multiplexing uplink transmissions with transmit diversity with single carrier waveform in accordance with various aspects of the present disclosure. The base station multiplexing manager 2115 may be an example of aspects of a base station multiplexing manager 2215 described with reference to FIGS. 19, 20, and 22. The base station multiplexing manager 2115 may include UE identification component 2120, configuration component 2125, receive chain 2130, OCC decoding component 2135, STBC decoding component 2140, and resource allocation component 2145. Each of these modules may communicate, directly or indirectly, with one another (e.g., via one or more buses).

UE identification component 2120 may identify a first UE and a second UE that are to transmit concurrent uplink transmissions. Configuration component 2125 may configure the first UE to use a first STBC for a first uplink transmission, configure the second UE to use a second STBC for a second uplink transmission, the second STBC generated by applying an OCC to the first STBC. In some cases, configuration component 2125 may configure an uplink common burst portion of a self-contained TTI, and configure a first portion of the uplink common burst portion for reference signal transmissions and a second portion of the uplink common burst portion for control channel or shared channel data transmissions, and where the first STBC is applied to the first uplink transmission of the first UE in the second portion of the uplink common burst portion and the second STBC is applied to the second uplink transmission of the second UE in the second portion of the uplink common burst portion.

In one aspect, the configuring the first UE further includes configuring the first UE to apply the first STBC across a first OFDM symbol and a second OFDM symbol to be transmitted in the first uplink transmission, and the configuring the second UE further includes configuring the second UE to apply the second STBC across a third OFDM symbol and a fourth OFDM symbol to be transmitted in the second uplink transmission concurrently with the first transmission. In some cases, the configuring the first UE further includes configuring the first UE to apply the first STBC to a first portion of a first OFDM symbol and a second portion of the first OFDM symbol to be transmitted in the first uplink transmission, and the configuring the second UE further includes configuring the second UE to apply the second STBC across a first portion of a second OFDM symbol and a second portion of the second OFDM symbol, the second OFDM symbol to be transmitted in the second uplink transmission concurrently with the first OFDM symbol.

In one aspect, the first portion of the uplink common burst portion occupies a first OFDM symbol of the uplink common burst portion and the second portion of the uplink common burst portion occupies a second OFDM symbol of the uplink common burst portion, the first STBC is applied to a first half of the second OFDM symbol and a second half of the second OFDM symbol to be transmitted by the first UE, and the configuring the second UE further includes configuring the second UE to apply the second STBC to a concurrent transmission of the second UE across the first half of the second OFDM symbol and the second half of the second OFDM symbol. In some cases, the first portion of the uplink common burst portion occupies a first shortened OFDM symbol of the uplink common burst portion and the second portion of the uplink common burst portion occupies a second shortened OFDM symbol of the uplink common burst portion, the second shortened OFDM symbol includes a set of modulation symbols, the first STBC is applied to a first subset of the set of modulation symbols to be transmitted by the first UE and a second subset of the set of modulation symbols to be transmitted by the first UE, and the second STBC is obtained by applying the OCC to the first STBC across the first subset of the set of modulation symbols and the second subset of the set of modulation symbols.

Receive chain 2130 may receive the first uplink transmission and the second uplink transmission. OCC decoding component 2135 may identify that the OCC is to be applied to the first STBC at a modulation symbol level within a single OFDM symbol or at an OFDM symbol level across multiple OFDM symbols based on the amount of data to be transmitted in the second uplink transmission. In one aspect, OCC decoding component 2135 may decode the received first uplink transmission and second uplink transmission according to the OCC to produce a first STBC coded portion of the first uplink transmission from the first UE and a second STBC coded portion of the second uplink transmission from the second UE. In some cases, OCC decoding component 2135 may apply the OCC to the first STBC across two or more OFDM symbols when the data spans two or more OFDM symbols, or apply the OCC to the first STBC at the modulation symbol level within a single OFDM symbol when the data is transmitted in the single OFDM symbol. In one aspect, OCC decoding component 2135 may apply the OCC to the first STBC at the OFDM symbol level across two or more OFDM symbols.

STBC decoding component 2140 may space-time block decode the first STBC coded portion and the second STBC coded portion of the second uplink transmission.

Resource allocation component 2145 may identify an amount of data to be transmitted in the first uplink transmission and the second uplink transmission. In some cases, resource allocation component 2145 may identify that the amount of data to be transmitted in each of the first uplink transmission and the second uplink transmission is below a first threshold value, identify that the amount of data to be transmitted corresponds to a predetermined small payload value, identify that the amount of data to be transmitted corresponds to a predetermined medium payload value, or identify that the amount of data to be transmitted corresponds to a predetermined large payload value.

Figure 22:
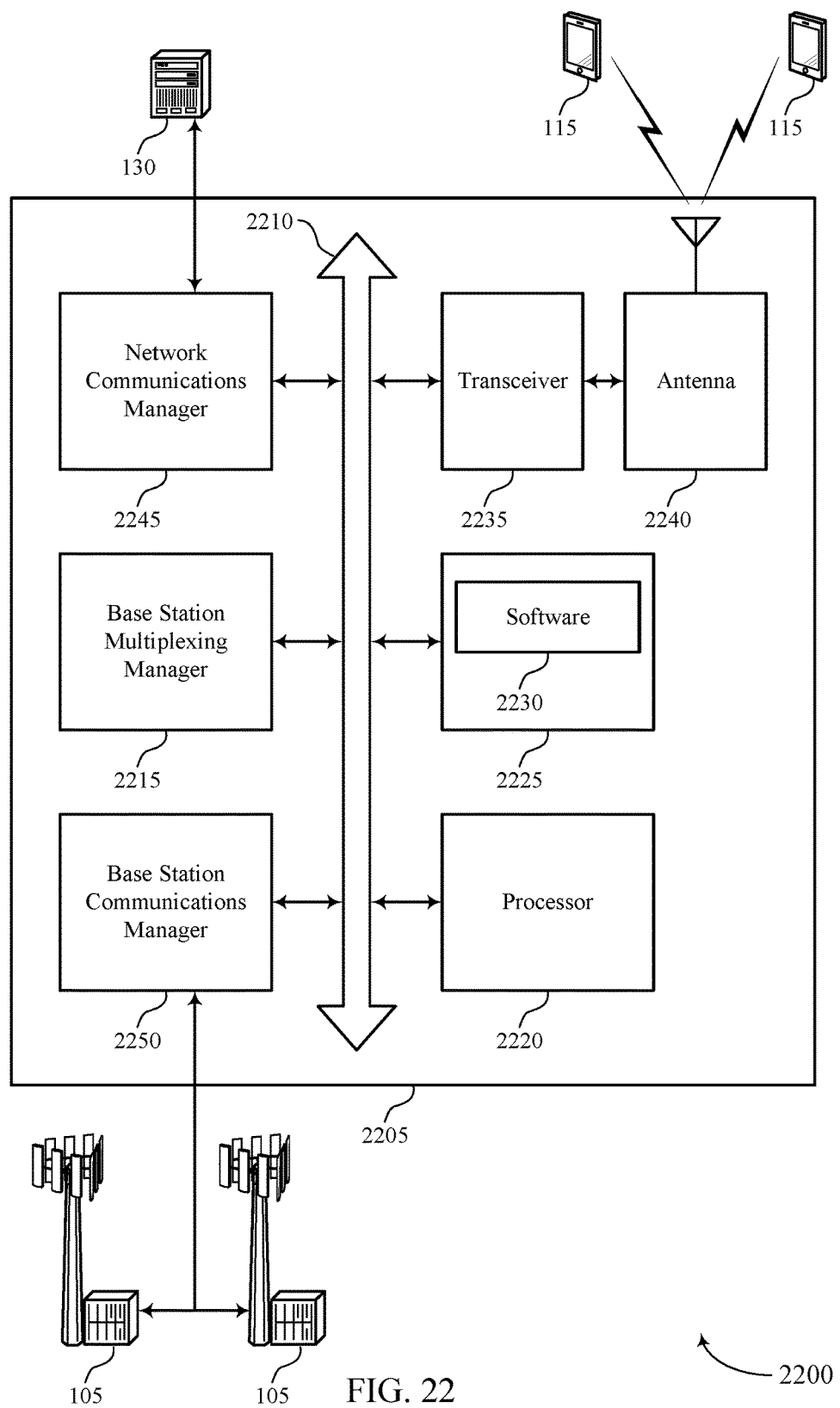
FIG. 22 illustrates a block diagram of a system including a base station that supports multiplexing uplink transmissions with transmit diversity with single carrier waveform in accordance with aspects of the present disclosure.

FIG. 22 shows a diagram of a system 2200 including a device 2205 that supports multiplexing uplink transmissions with transmit diversity with single carrier waveform in accordance with various aspects of the present disclosure. Device 2205 may be an example of or include the components of base station 105 as described above, e.g., with reference to FIG. 1. Device 2205 may include components for bi-directional voice and data communications including components for transmitting and receiving communications, including base station multiplexing manager 2215, processor 2220, memory 2225, software 2230, transceiver 2235, antenna 2240, network communications manager 2245, and base station communications manager 2250. These components may be in electronic communication via one or more busses (e.g., bus 2210). Device 2205 may communicate wirelessly with one or more UEs 115.

Processor 2220 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In one aspect, processor 2220 may be configured to operate a memory array using a memory controller. In other cases, a memory controller may be integrated into processor 2220. Processor 2220 may be configured to execute computer-readable instructions stored in a memory to perform various functions (e.g., functions or tasks supporting multiplexing uplink transmissions with transmit diversity with single carrier waveform).

Memory 2225 may include RAM and ROM. The memory 2225 may store computer-readable, computer-executable software 2230 including instructions that, when executed, cause the processor to perform various functions described herein. In some cases, the memory 2225 may contain, among other things, a BIOS that may control basic hardware and/or software operation such as the interaction with peripheral components or devices.

Software 2230 may include code to implement aspects of the present disclosure, including code to support multiplexing uplink transmissions with transmit diversity with single carrier waveform. Software 2230 may be stored in a non-transitory computer-readable medium such as system memory or other memory. In one aspect, the software 2230 may not be directly executable by the processor but may cause a computer (e.g., when compiled and executed) to perform functions described herein.

Transceiver 2235 may communicate bi-directionally, via one or more antennas, wired, or wireless links as described above. For example, the transceiver 2235 may represent a wireless transceiver and may communicate bi-directionally with another wireless transceiver. The transceiver 2235 may also include a modem to modulate the packets and provide the modulated packets to the antennas for transmission, and to demodulate packets received from the antennas.

In one aspect, the wireless device may include a single antenna 2240. However, in some cases the device may have more than one antenna 2240, that may be capable of concurrently transmitting or receiving multiple wireless transmissions.

Network communications manager 2245 may manage communications with the core network (e.g., via one or more wired backhaul links). For example, the network communications manager 2245 may manage the transfer of data communications for client devices, such as one or more UEs 115.

Base station communications manager 2250 may manage communications with other base station 105, and may include a controller or scheduler for controlling communications with UEs 115 in cooperation with other base stations 105. For example, the base station communications manager 2250 may coordinate scheduling for transmissions to UEs 115 for various interference mitigation techniques such as beamforming or joint transmission. In one aspect, base station communications manager 2250 may provide an X2 interface within an Long Term Evolution (LTE)/LTE-A wireless communication network technology to provide communication between base stations 105.

Figure 23:
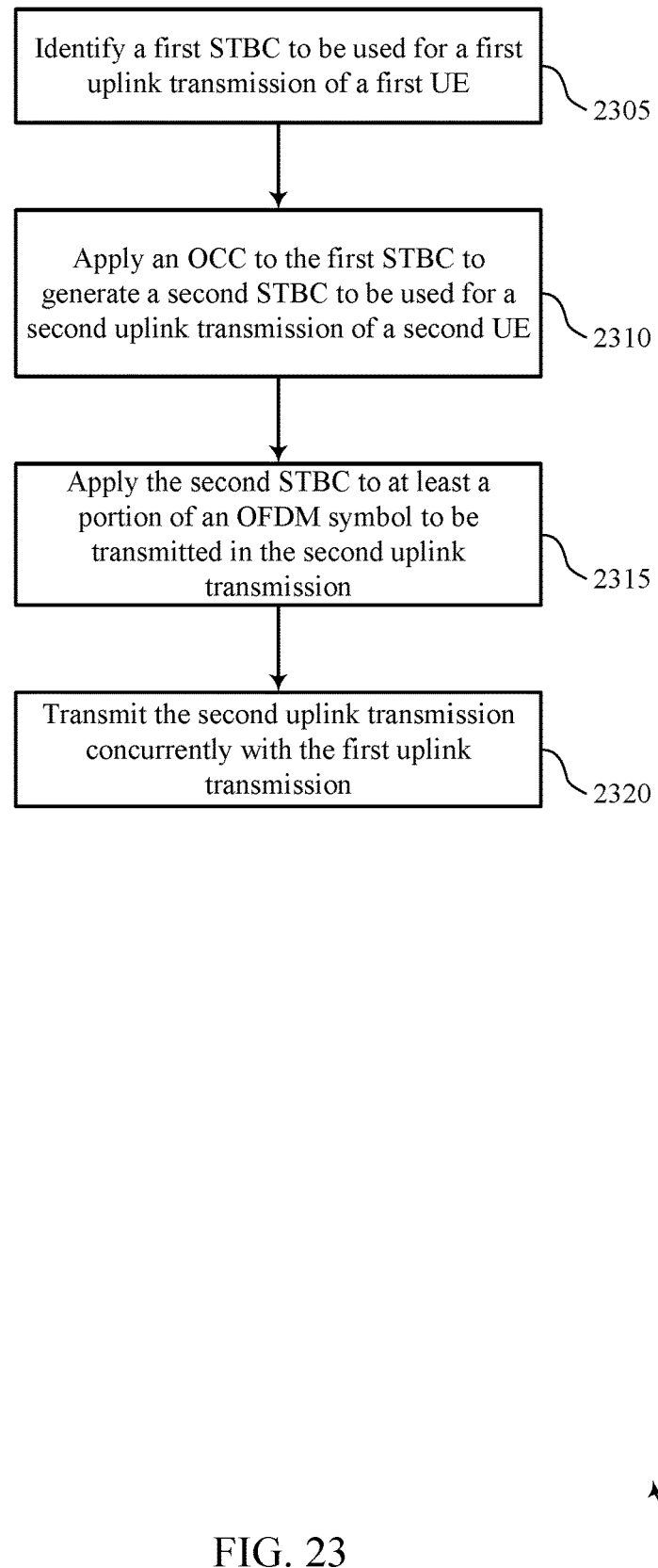
FIGS. 23 through 28 illustrate methods for multiplexing uplink transmissions with transmit diversity with single carrier waveform in accordance with aspects of the present disclosure.

FIG. 23 shows a flowchart illustrating a method 2300 for multiplexing uplink transmissions with transmit diversity with single carrier waveform in accordance with various aspects of the present disclosure. The operations of method 2300 may be implemented by a UE 115 or its components as described herein. For example, the operations of method 2300 may be performed by a UE multiplexing manager as described with reference to FIGS. 15 through 18. In some examples, a UE 115 may execute a set of codes to control the functional elements of the device to perform the functions described below. Additionally or alternatively, the UE 115 may perform aspects of the functions described below using special-purpose hardware.

At block 2305 the UE 115 may identify a first STBC to be used for a first uplink transmission of a first UE. The operations of block 2305 may be performed according to the methods described with reference to FIGS. 1 through 12. In certain examples, aspects of the operations of block 2305 may be performed by a STBC identification component as described with reference to FIGS. 15 through 18.

At block 2310 the UE 115 may apply an OCC to the first STBC to generate a second STBC to be used for a second uplink transmission of the second UE. The operations of block 2310 may be performed according to the methods described with reference to FIGS. 1 through 12. In certain examples, aspects of the operations of block 2310 may be performed by a OCC component as described with reference to FIGS. 15 through 18.

At block 2315 the UE 115 may apply the second STBC to at least a portion of an OFDM symbol to be transmitted in the second uplink transmission. The operations of block 2315 may be performed according to the methods described with reference to FIGS. 1 through 12. In certain examples, aspects of the operations of block 2315 may be performed by a STBC coding component as described with reference to FIGS. 15 through 18.

At block 2320 the UE 115 may transmit the second uplink transmission concurrently with the first uplink transmission. The operations of block 2320 may be performed according to the methods described with reference to FIGS. 1 through 12. In certain examples, aspects of the operations of block 2320 may be performed by a transmit chain as described with reference to FIGS. 15 through 18.

Figure 24:
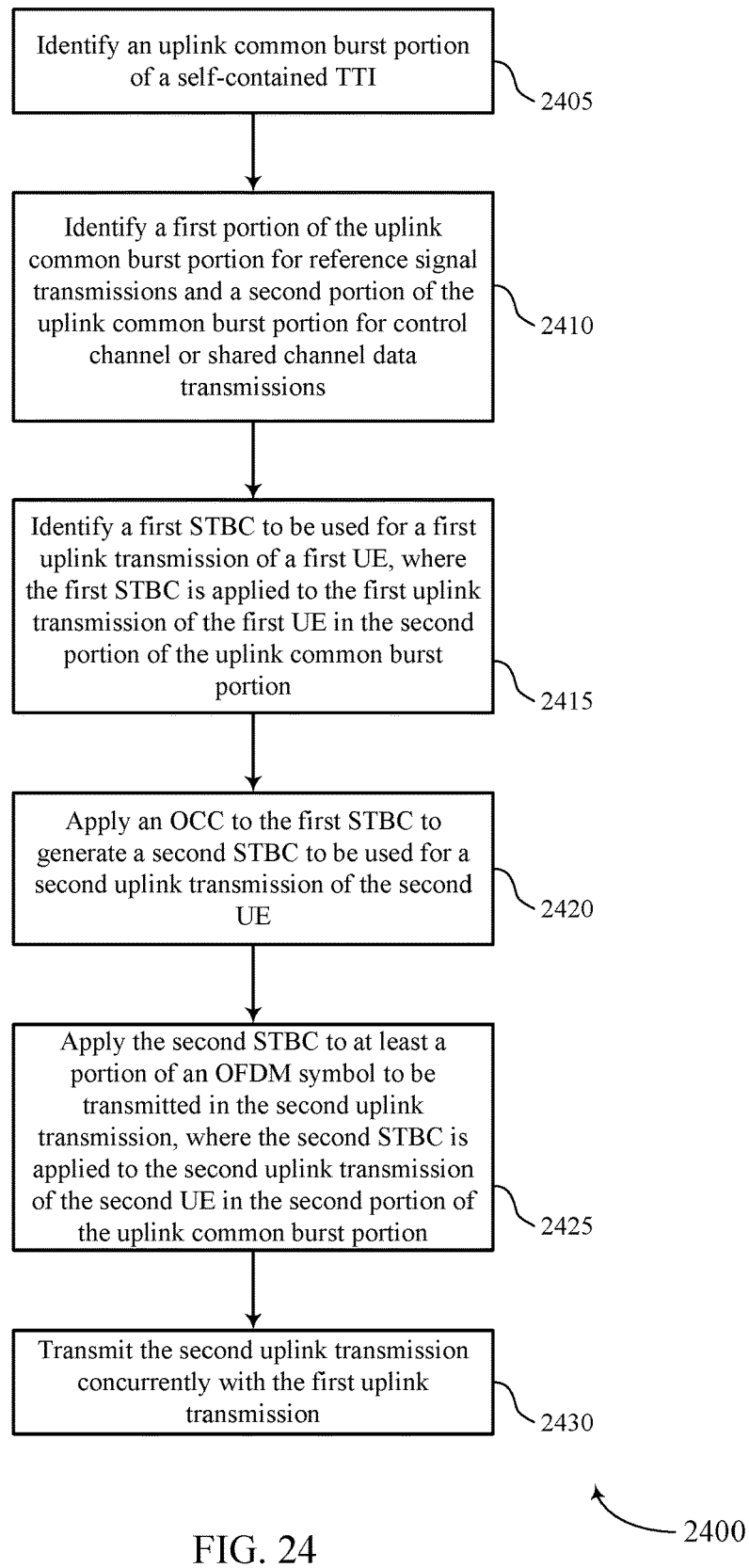

FIG. 24 shows a flowchart illustrating a method 2400 for multiplexing uplink transmissions with transmit diversity with single carrier waveform in accordance with various aspects of the present disclosure. The operations of method 2400 may be implemented by a UE 115 or its components as described herein. For example, the operations of method 2400 may be performed by a UE multiplexing manager as described with reference to FIGS. 15 through 18. In one aspect, a UE 115 may execute a set of codes to control the functional elements of the device to perform the functions described below. Additionally or alternatively, the UE 115 may perform aspects of the functions described below using special-purpose hardware.

At block 2405 the UE 115 may identify an uplink common burst portion of a self-contained TTI. The operations of block 2405 may be performed according to the methods described with reference to FIGS. 1 through 12. In certain examples, aspects of the operations of block 2405 may be performed by a resource allocation component as described with reference to FIGS. 15 through 18.

At block 2410 the UE 115 may identify a first portion of the uplink common burst portion for reference signal transmissions and a second portion of the uplink common burst portion for control channel or shared channel data transmissions. The operations of block 2410 may be performed according to the methods described with reference to FIGS. 1 through 12. In certain examples, aspects of the operations of block 2410 may be performed by a STBC coding component as described with reference to FIGS. 15 through 18.

At block 2415 the UE 115 identify a first STBC to be used for a first uplink transmission of a first UE, where the first STBC is applied to the first uplink transmission of the first UE in the second portion of the uplink common burst portion. The operations of block 2415 may be performed according to the methods described with reference to FIGS. 1 through 12. In certain examples, aspects of the operations of block 2415 may be performed by a STBC identification component as described with reference to FIGS. 15 through 18.

At block 2420 the UE 115 apply an OCC to the first STBC to generate a second STBC to be used for a second uplink transmission of the second UE. The operations of block 2420 may be performed according to the methods described with reference to FIGS. 1 through 12. In certain examples, aspects of the operations of block 2420 may be performed by a OCC component as described with reference to FIGS. 15 through 18.

At block 2425 the UE 115 may apply the second STBC to at least a portion of an OFDM symbol to be transmitted in the second uplink transmission, where the second STBC is applied to the second uplink transmission of the second UE in the second portion of the uplink common burst portion. The operations of block 2425 may be performed according to the methods described with reference to FIGS. 1 through 12. In certain examples, aspects of the operations of block 2425 may be performed by a STBC coding component as described with reference to FIGS. 15 through 18.

At block 2430 the UE 115 may transmit the second uplink transmission concurrently with the first uplink transmission. The operations of block 2430 may be performed according to the methods described with reference to FIGS. 1 through 12. In certain examples, aspects of the operations of block 2430 may be performed by a transmit chain as described with reference to FIGS. 15 through 18.

Figure 25:
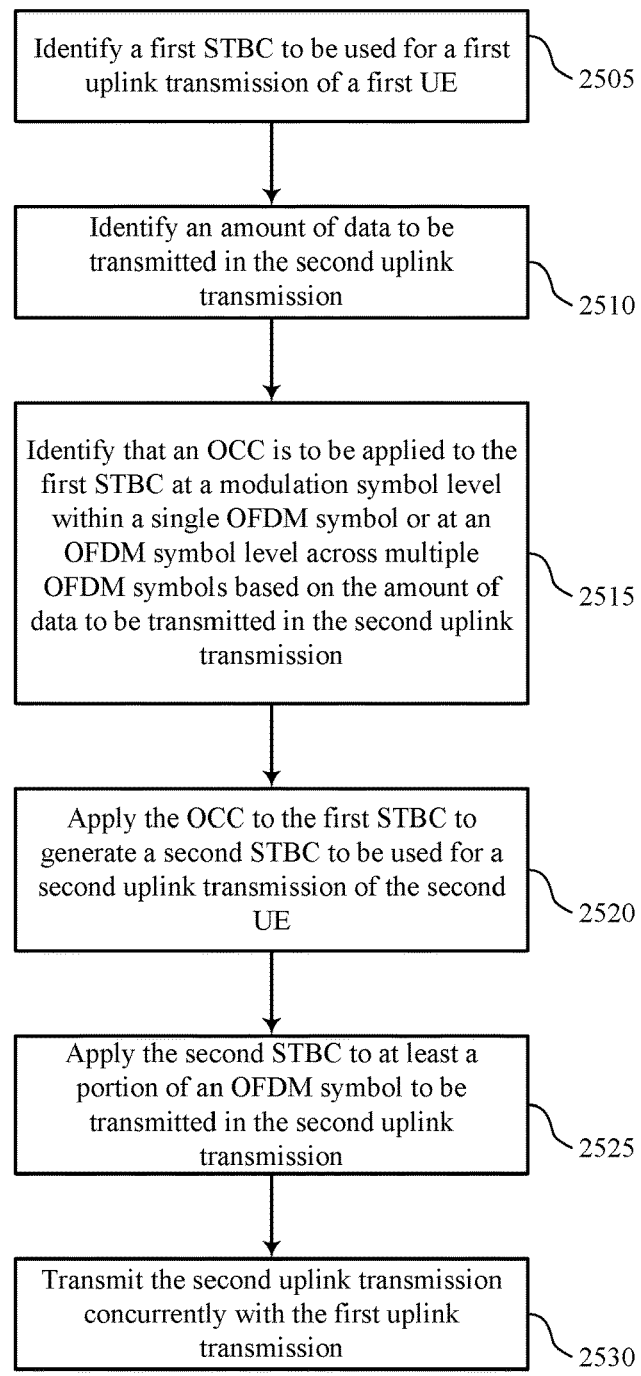

FIG. 25 shows a flowchart illustrating a method 2500 for multiplexing uplink transmissions with transmit diversity with single carrier waveform in accordance with various aspects of the present disclosure. The operations of method 2500 may be implemented by a UE 115 or its components as described herein. For example, the operations of method 2500 may be performed by a UE multiplexing manager as described with reference to FIGS. 15 through 18. In some examples, a UE 115 may execute a set of codes to control the functional elements of the device to perform the functions described below. Additionally or alternatively, the UE 115 may perform aspects of the functions described below using special-purpose hardware.

At block 2505 the UE 115 may identify a first STBC to be used for a first uplink transmission of a first UE. The operations of block 2505 may be performed according to the methods described with reference to FIGS. 1 through 12. In certain examples, aspects of the operations of block 2505 may be performed by a STBC identification component as described with reference to FIGS. 15 through 18.

At block 2510 the UE 115 may identify an amount of data to be transmitted in the second uplink transmission. The operations of block 2510 may be performed according to the methods described with reference to FIGS. 1 through 12. In certain examples, aspects of the operations of block 2510 may be performed by a resource allocation component as described with reference to FIGS. 15 through 18.

At block 2515 the UE 115 may identify that the OCC is to be applied to the first STBC at a modulation symbol level within a single OFDM symbol or at an OFDM symbol level across multiple OFDM symbols based at least in part on the amount of data to be transmitted in the second uplink transmission. The operations of block 2515 may be performed according to the methods described with reference to FIGS. 1 through 12. In certain examples, aspects of the operations of block 2515 may be performed by a STBC coding component as described with reference to FIGS. 15 through 18.

At block 2520 the UE 115 may apply an OCC to the first STBC to generate a second STBC to be used for a second uplink transmission of the second UE. The operations of block 2520 may be performed according to the methods described with reference to FIGS. 1 through 12. In certain examples, aspects of the operations of block 2520 may be performed by a OCC component as described with reference to FIGS. 15 through 18.

At block 2525 the UE 115 may apply the second STBC to at least a portion of an OFDM symbol to be transmitted in the second uplink transmission. The operations of block 2525 may be performed according to the methods described with reference to FIGS. 1 through 12. In certain examples, aspects of the operations of block 2525 may be performed by a STBC coding component as described with reference to FIGS. 15 through 18.

At block 2530 the UE 115 may transmit the second uplink transmission concurrently with the first uplink transmission. The operations of block 2530 may be performed according to the methods described with reference to FIGS. 1 through 12. In certain examples, aspects of the operations of block 2530 may be performed by a transmit chain as described with reference to FIGS. 15 through 18.

Figure 26:
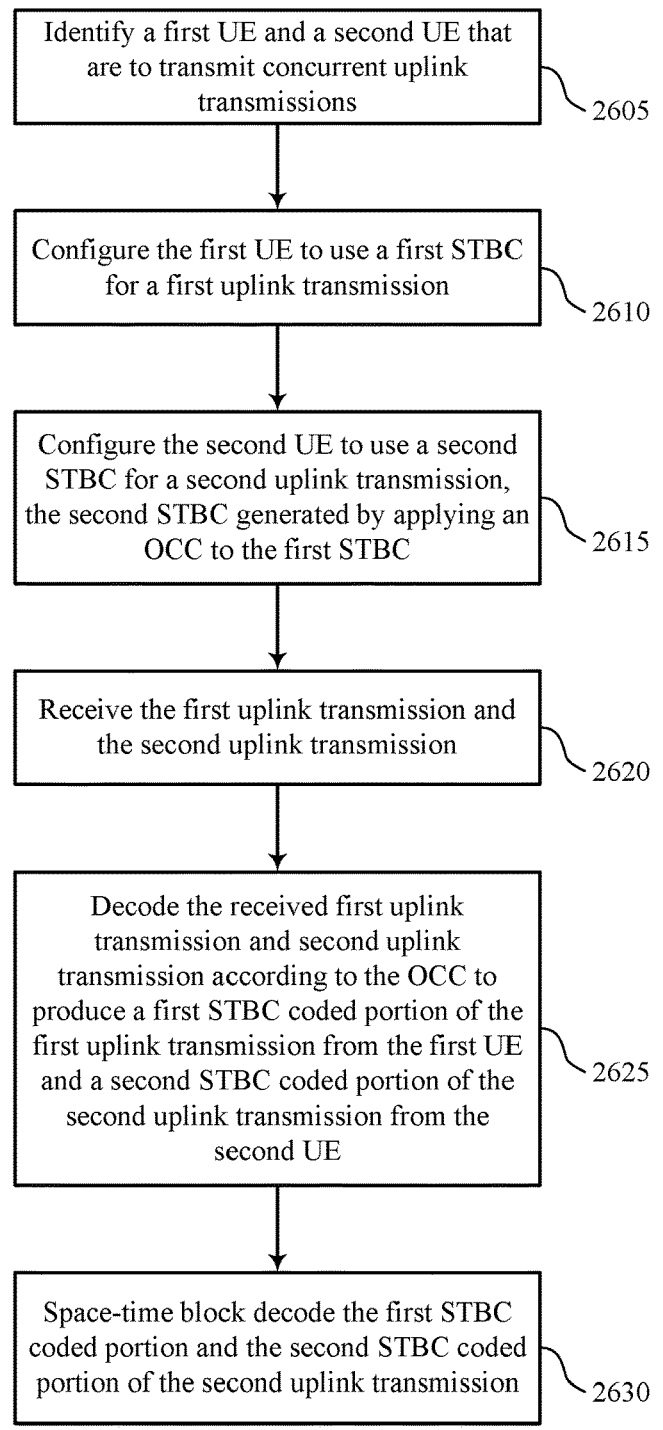

FIG. 26 shows a flowchart illustrating a method 2600 for multiplexing uplink transmissions with transmit diversity with single carrier waveform in accordance with various aspects of the present disclosure. The operations of method 2600 may be implemented by a base station 105 or its components as described herein. For example, the operations of method 2600 may be performed by a base station multiplexing manager as described with reference to FIGS. 19 through 22. In one aspect, a base station 105 may execute a set of codes to control the functional elements of the device to perform the functions described below. Additionally or alternatively, the base station 105 may perform aspects of the functions described below using special-purpose hardware.

At block 2605 the base station 105 may identify a first UE and a second UE that are to transmit concurrent uplink transmissions. The operations of block 2605 may be performed according to the methods described with reference to FIGS. 1 through 12. In certain examples, aspects of the operations of block 2605 may be performed by a UE identification component as described with reference to FIGS. 19 through 22.

At block 2610 the base station 105 may configure the first UE to use a first STBC for a first uplink transmission. The operations of block 2610 may be performed according to the methods described with reference to FIGS. 1 through 12. In certain examples, aspects of the operations of block 2610 may be performed by a configuration component as described with reference to FIGS. 19 through 22.

At block 2615 the base station 105 may configure the second UE to use a second STBC for a second uplink transmission, the second STBC generated by applying an OCC to the first STBC. The operations of block 2615 may be performed according to the methods described with reference to FIGS. 1 through 12. In certain examples, aspects of the operations of block 2615 may be performed by a configuration component as described with reference to FIGS. 19 through 22.

At block 2620 the base station 105 may receive the first uplink transmission and the second uplink transmission. The operations of block 2620 may be performed according to the methods described with reference to FIGS. 1 through 12. In certain examples, aspects of the operations of block 2620 may be performed by a receive chain as described with reference to FIGS. 19 through 22.

At block 2625 the base station 105 may decode the received first uplink transmission and second uplink transmission according to the OCC to produce a first STBC coded portion of the first uplink transmission from the first UE and a second STBC coded portion of the second uplink transmission from the second UE. The operations of block 2625 may be performed according to the methods described with reference to FIGS. 1 through 12. In certain examples, aspects of the operations of block 2625 may be performed by a OCC decoding component as described with reference to FIGS. 19 through 22.

At block 2630 the base station 105 may space-time block decode the first STBC coded portion and the second STBC coded portion of the second uplink transmission. The operations of block 2630 may be performed according to the methods described with reference to FIGS. 1 through 12. In certain examples, aspects of the operations of block 2630 may be performed by a STBC decoding component as described with reference to FIGS. 19 through 22.

Figure 27:
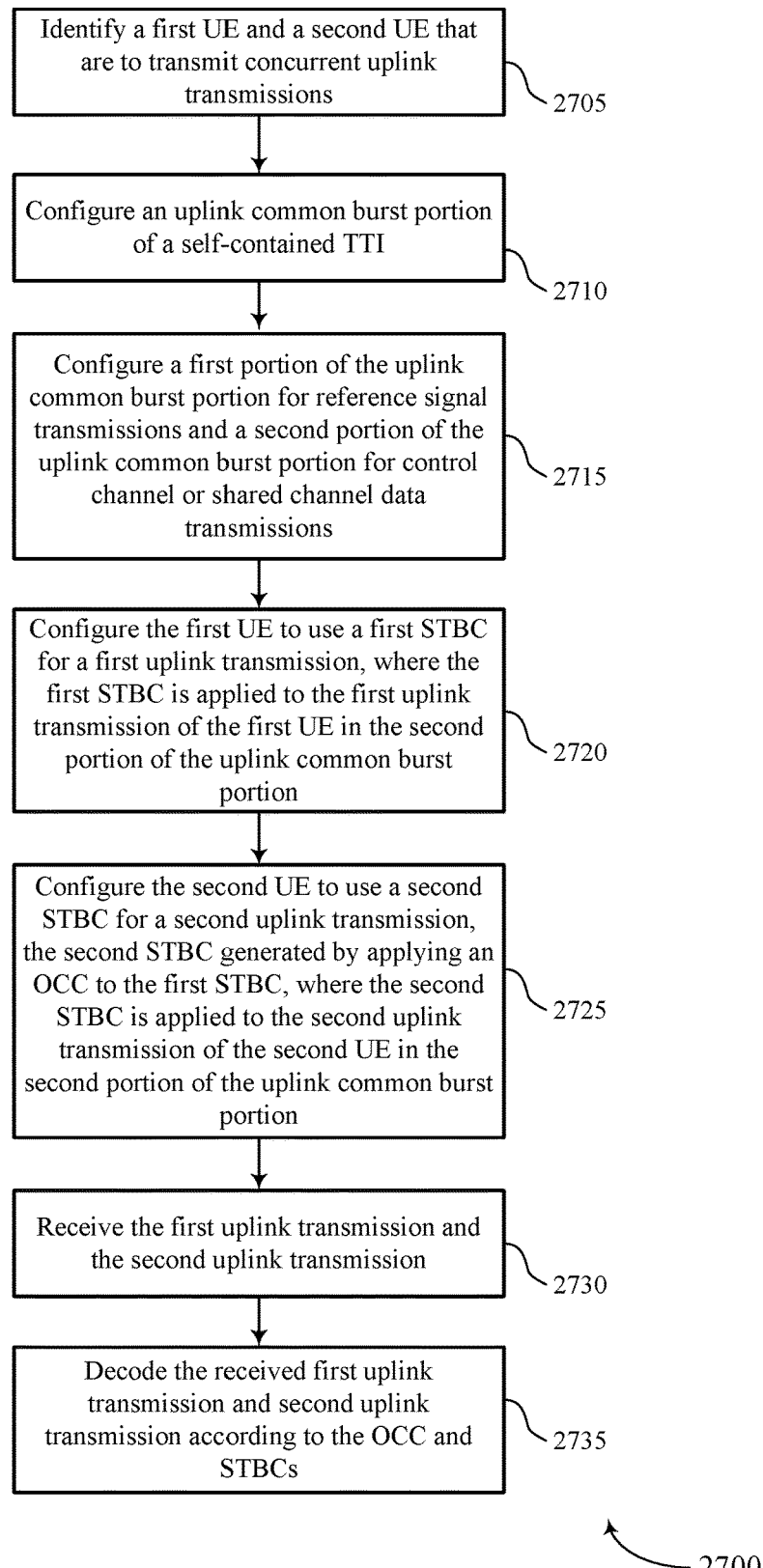

FIG. 27 shows a flowchart illustrating a method 2700 for multiplexing uplink transmissions with transmit diversity with single carrier waveform in accordance with various aspects of the present disclosure. The operations of method 2700 may be implemented by a base station 105 or its components as described herein. For example, the operations of method 2700 may be performed by a base station multiplexing manager as described with reference to FIGS. 19 through 22. In some examples, a base station 105 may execute a set of codes to control the functional elements of the device to perform the functions described below. Additionally or alternatively, the base station 105 may perform aspects of the functions described below using special-purpose hardware.

At block 2705 the base station 105 may identify a first UE and a second UE that are to transmit concurrent uplink transmissions. The operations of block 2705 may be performed according to the methods described with reference to FIGS. 1 through 12. In certain examples, aspects of the operations of block 2705 may be performed by a UE identification component as described with reference to FIGS. 19 through 22.

At block 2710 the base station 105 may configure an uplink common burst portion of a self-contained TTI. The operations of block 2710 may be performed according to the methods described with reference to FIGS. 1 through 12. In certain examples, aspects of the operations of block 2710 may be performed by a configuration component as described with reference to FIGS. 19 through 22.

At block 2715 the base station 105 may configure a first portion of the uplink common burst portion for reference signal transmissions and a second portion of the uplink common burst portion for control channel or shared channel data transmissions. The operations of block 2715 may be performed according to the methods described with reference to FIGS. 1 through 12. In certain examples, aspects of the operations of block 2715 may be performed by a configuration component as described with reference to FIGS. 19 through 22.

At block 2720 the base station 105 may configure the first UE to use a first STBC for a first uplink transmission, where the first STBC is applied to the first uplink transmission of the first UE in the second portion of the uplink common burst portion. The operations of block 2720 may be performed according to the methods described with reference to FIGS. 1 through 12. In certain examples, aspects of the operations of block 2720 may be performed by a configuration component as described with reference to FIGS. 19 through 22.

At block 2725 the base station 105 may configure the second UE to use a second STBC for a second uplink transmission, the second STBC generated by applying an OCC to the first STBC, where the second STBC is applied to the second uplink transmission of the second UE in the second portion of the uplink common burst portion. The operations of block 2725 may be performed according to the methods described with reference to FIGS. 1 through 12. In certain examples, aspects of the operations of block 2725 may be performed by a configuration component as described with reference to FIGS. 19 through 22.

At block 2730 the base station 105 may receive the first uplink transmission and the second uplink transmission. The operations of block 2730 may be performed according to the methods described with reference to FIGS. 1 through 12. In certain examples, aspects of the operations of block 2730 may be performed by a receive chain as described with reference to FIGS. 19 through 22.

At block 2735 the base station 105 may decode the received first uplink transmission and second uplink transmission according to the OCC and STBCs. The operations of block 2735 may be performed according to the methods described with reference to FIGS. 1 through 12. In certain examples, aspects of the operations of block 2735 may be performed by a OCC decoding and STBC decoding component as described with reference to FIGS. 19 through 22.

Figure 28:
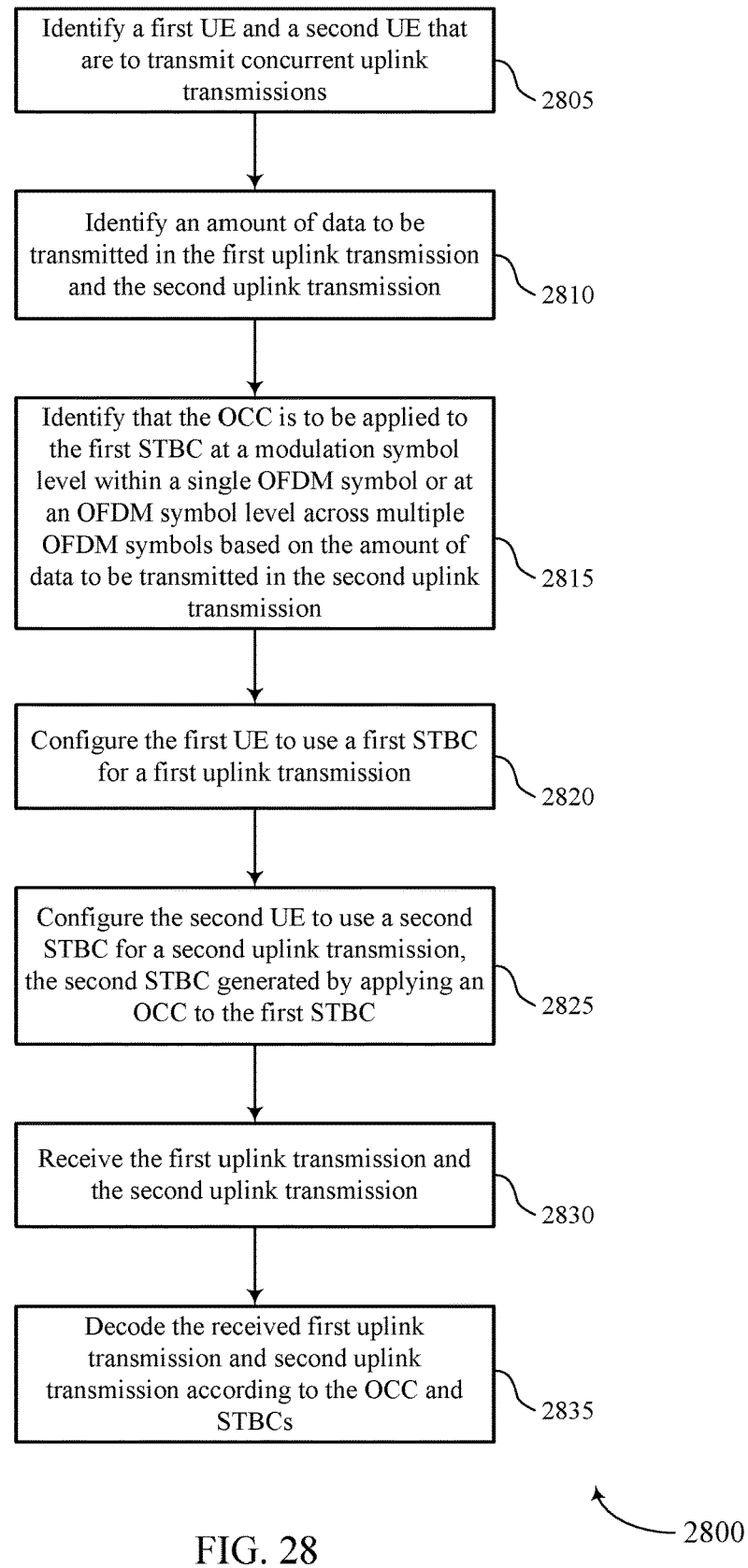

FIG. 28 shows a flowchart illustrating a method 2800 for multiplexing uplink transmissions with transmit diversity with single carrier waveform in accordance with various aspects of the present disclosure. The operations of method 2800 may be implemented by a base station 105 or its components as described herein. For example, the operations of method 2800 may be performed by a base station multiplexing manager as described with reference to FIGS. 19 through 22. In some examples, a base station 105 may execute a set of codes to control the functional elements of the device to perform the functions described below. Additionally or alternatively, the base station 105 may perform aspects of the functions described below using special-purpose hardware.

At block 2805 the base station 105 may identify a first UE and a second UE that are to transmit concurrent uplink transmissions. The operations of block 2805 may be performed according to the methods described with reference to FIGS. 1 through 12. In certain examples, aspects of the operations of block 2805 may be performed by a UE identification component as described with reference to FIGS. 19 through 22.

At block 2810 the base station 105 may identify an amount of data to be transmitted in the first uplink transmission and the second uplink transmission. The operations of block 2810 may be performed according to the methods described with reference to FIGS. 1 through 12. In certain examples, aspects of the operations of block 2810 may be performed by a resource allocation component as described with reference to FIGS. 19 through 22.

At block 2815 the base station 105 may identify that the OCC is to be applied to the first STBC at a modulation symbol level within a single OFDM symbol or at an OFDM symbol level across multiple OFDM symbols based at least in part on the amount of data to be transmitted in the second uplink transmission. The operations of block 2815 may be performed according to the methods described with reference to FIGS. 1 through 12. In certain examples, aspects of the operations of block 2815 may be performed by a OCC decoding component as described with reference to FIGS. 19 through 22.

At block 2820 the base station 105 may configure the first UE to use a first STBC for a first uplink transmission. The operations of block 2820 may be performed according to the methods described with reference to FIGS. 1 through 12. In certain examples, aspects of the operations of block 2820 may be performed by a configuration component as described with reference to FIGS. 19 through 22.

At block 2825 the base station 105 may configure the second UE to use a second STBC for a second uplink transmission, the second STBC generated by applying an OCC to the first STBC. The operations of block 2825 may be performed according to the methods described with reference to FIGS. 1 through 12. In certain examples, aspects of the operations of block 2825 may be performed by a configuration component as described with reference to FIGS. 19 through 22.

At block 2830 the base station 105 may receive the first uplink transmission and the second uplink transmission. The operations of block 2830 may be performed according to the methods described with reference to FIGS. 1 through 12. In certain examples, aspects of the operations of block 2830 may be performed by a receive chain as described with reference to FIGS. 19 through 22.

At block 2835 the base station 105 may decode the received first uplink transmission and second uplink transmission according to the OCC and STBCs. The operations of block 2835 may be performed according to the methods described with reference to FIGS. 1 through 12. In certain examples, aspects of the operations of block 2835 may be performed by a OCC decoding component and STBC decoding component as described with reference to FIGS. 19 through 22.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM).

An orthogonal frequency division multiple access (OFDMA) system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are releases of Universal Mobile Telecommunications System (UMTS) that use E-UTRA. UTRA, E-UTRA, UMTS, LTE, LTE-A, NR, and Global System for Mobile communications (GSM) are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of evolved node B (eNBs) provide coverage for various geographical regions. For example, each eNB, gNB or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), next generation NodeB (gNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
    identifying, at a second user equipment (UE), a first space time block code (STBC) to be used for a first uplink transmission of a first UE;
    applying, at the second UE, an orthogonal covering code (OCC) to the first STBC to generate a second STBC to be used for a second uplink transmission of the second UE;
    applying the second STBC to at least a portion of an orthogonal frequency division multiplexing (OFDM) symbol to be transmitted in the second uplink transmission; and
    transmitting the second uplink transmission concurrently with the first uplink transmission.

2. The method of claim 1, wherein the first STBC is applied to a first OFDM symbol and a second OFDM symbol that are to be transmitted in the first uplink transmission, and wherein the applying the second STBC further comprises:
    applying the second STBC across a third OFDM symbol and a fourth OFDM symbol to be transmitted in the second uplink transmission.

3. The method of claim 2, wherein the second STBC is applied to an input data stream before or after a discrete Fourier transform (DFT) is applied to the input data stream.

4. The method of claim 1, wherein the first STBC is applied to a first portion of the first OFDM symbol and a second portion of the first OFDM symbol to be transmitted in the first uplink transmission, and wherein the applying the second STBC further comprises:
    applying the second STBC across a first portion of a second OFDM symbol and a second portion of the second OFDM symbol, the second OFDM symbol to be transmitted in the second uplink transmission concurrently with the first OFDM symbol.

5. The method of claim 1, wherein the first STBC and the second STBC are applied across OFDM symbols, or to a first portion and a second portion within a single OFDM symbol, based at least in part on whether an even or an odd number of OFDM symbols are associated with the first uplink transmission and the second uplink transmission.

6. The method of claim 1, further comprising:
    identifying an uplink common burst portion of a self-contained transmission time interval (TTI);
    identifying a first portion of the uplink common burst portion for reference signal transmissions and a second portion of the uplink common burst portion for control channel or shared channel data transmissions, and wherein the first STBC is applied to the first uplink transmission of the first UE in the second portion of the uplink common burst portion and the second STBC is applied to the second uplink transmission of the second UE in the second portion of the uplink common burst portion.

7. The method of claim 6, wherein the first portion of the uplink common burst portion occupies a first OFDM symbol of the uplink common burst portion and the second portion of the uplink common burst portion occupies a second OFDM symbol of the uplink common burst portion, wherein the first STBC is applied to a first half of the second OFDM symbol and a second half of the second OFDM symbol to be transmitted by the first UE, and wherein the applying the second STBC further comprises:
    applying the second STBC to a concurrent transmission of the second UE across the first half of the second OFDM symbol and the second half of the second OFDM symbol.

8. The method of claim 6, wherein
    the first portion of the uplink common burst portion occupies a first shortened OFDM symbol of the uplink common burst portion and the second portion of the uplink common burst portion occupies a second shortened OFDM symbol of the uplink common burst portion,
    the second shortened OFDM symbol comprises a set of modulation symbols,
    the first STBC is applied to a first subset of the set of modulation symbols to be transmitted by the first UE and a second subset of the set of modulation symbols to be transmitted by the first UE,
    the applying the OCC to the first STBC comprises applying the OCC to the first STBC across the first subset of the set of modulation symbols and the second subset of the set of modulation symbols to obtain the second STBC; and the applying the second STBC comprises applying the second STBC to a concurrent transmission of the second UE across the first subset of the set of modulation symbols and the second subset of the set of modulation symbols.

9. The method of claim 1, further comprising:
identifying, at the second UE, an amount of data to be transmitted in the second uplink transmission; and
identifying that the OCC is to be applied to the first STBC at a modulation symbol level within a single OFDM symbol or at an OFDM symbol level across multiple OFDM symbols based at least in part on the amount of data to be transmitted in the second uplink transmission.

10. The method of claim 9, further comprising:
identifying that the amount of data to be transmitted is below a first threshold value; and
applying the OCC to the first STBC across two or more OFDM symbols when the data spans two or more OFDM symbols; or
applying the OCC to the first STBC at the modulation symbol level within the single OFDM symbol when the data is to be transmitted in the single OFDM symbol.

11. The method of claim 9, further comprising:
identifying that the amount of data to be transmitted corresponds to a predetermined small payload value; and
applying the OCC to the first STBC at the modulation symbol level within the single OFDM symbol.

12. The method of claim 9, further comprising:
identifying that the amount of data to be transmitted corresponds to a predetermined medium payload value; and
applying the OCC to the first STBC at the OFDM symbol level across two or more OFDM symbols.

13. The method of claim 9, further comprising:
identifying that the amount of data to be transmitted corresponds to a predetermined large payload value; and
determining that the second uplink transmission is to be transmitted non-concurrently with the first uplink transmission.

14. A method for wireless communication, comprising:
identifying a first user equipment (UE) and a second UE that are to transmit concurrent uplink transmissions;
configuring the first UE to use a first space time block coding (STBC) for a first uplink transmission;
configuring the second UE to use a second STBC for a second uplink transmission, the second STBC generated by applying an orthogonal covering code (OCC) to the first STBC;
receiving the first uplink transmission and the second uplink transmission; and
decoding the received first uplink transmission and second uplink transmission according to the OCC to produce a first STBC coded portion of the first uplink transmission from the first UE and a second STBC coded portion of the second uplink transmission from the second UE; and
space-time block decoding the first STBC coded portion and the second STBC coded portion of the second uplink transmission.

15. The method of claim 14, wherein
the configuring the first UE further comprises configuring the first UE to apply the first STBC across a first OFDM symbol and a second OFDM symbol to be transmitted in the first uplink transmission, and the configuring the second UE further comprises configuring the second UE to apply the second STBC across a third OFDM symbol and a fourth OFDM symbol to be transmitted in the second uplink transmission concurrently with the first uplink transmission.

16. The method of claim 14, wherein
the configuring the first UE further comprises configuring the first UE to apply the first STBC to a first portion of a first OFDM symbol and a second portion of the first OFDM symbol to be transmitted in the first uplink transmission, and
the configuring the second UE further comprises configuring the second UE to apply the second STBC across a first portion of a second OFDM symbol and a second portion of the second OFDM symbol, the second OFDM symbol to be transmitted in the second uplink transmission concurrently with the first OFDM symbol.

17. The method of claim 14, further comprising:
configuring an uplink common burst portion of a self-contained transmission time interval (TTI); and
configuring a first portion of the uplink common burst portion for reference signal transmissions and a second portion of the uplink common burst portion for control channel or shared channel data transmissions, and wherein the first STBC is applied to the first uplink transmission of the first UE in the second portion of the uplink common burst portion and the second STBC is applied to the second uplink transmission of the second UE in the second portion of the uplink common burst portion.

18. The method of claim 17, wherein
the first portion of the uplink common burst portion occupies a first OFDM symbol of the uplink common burst portion and the second portion of the uplink common burst portion occupies a second OFDM symbol of the uplink common burst portion,
the first STBC is applied to a first half of the second OFDM symbol and a second half of the second OFDM symbol to be transmitted by the first UE, and
the configuring the second UE further comprises configuring the second UE to apply the second STBC to a concurrent transmission of the second UE across the first half of the second OFDM symbol and the second half of the second OFDM symbol.

19. The method of claim 17, wherein
the first portion of the uplink common burst portion occupies a first shortened OFDM symbol of the uplink common burst portion and the second portion of the uplink common burst portion occupies a second shortened OFDM symbol of the uplink common burst portion,
the second shortened OFDM symbol comprises a set of modulation symbols,
the first STBC is applied to a first subset of the set of modulation symbols to be transmitted by the first UE and a second subset of the set of modulation symbols to be transmitted by the first UE, and
the second STBC is obtained by applying the OCC to the first STBC across the first subset of the set of modulation symbols and the second subset of the set of modulation symbols.

20. The method of claim 14, further comprising:
identifying an amount of data to be transmitted in the first uplink transmission and the second uplink transmission; and
identifying that the OCC is to be applied to the first STBC at a modulation symbol level within a single OFDM symbol or at an OFDM symbol level across multiple OFDM symbols based at least in part on the amount of data to be transmitted in the second uplink transmission.

21. The method of claim 20, further comprising:
identifying that the amount of data to be transmitted in each of the first uplink transmission and the second uplink transmission is below a first threshold value; and
applying the OCC to the first STBC across two or more OFDM symbols when the data spans two or more OFDM symbols; or
applying the OCC to the first STBC at the modulation symbol level within the single OFDM symbol when the data is transmitted in the single OFDM symbol.

22. The method of claim 20, further comprising:
identifying that the amount of data to be transmitted corresponds to a predetermined small payload value; and
applying the OCC to the first STBC at the modulation symbol level within the single OFDM symbol.

23. The method of claim 20, further comprising:
identifying that the amount of data to be transmitted corresponds to a predetermined medium payload value; and
applying the OCC to the first STBC at the OFDM symbol level across two or more OFDM symbols.

24. The method of claim 20, further comprising:
identifying that the amount of data to be transmitted corresponds to a predetermined large payload value; and
determining that the second uplink transmission is to be transmitted non-concurrently with the first uplink transmission.

25. An apparatus for wireless communication, in a system comprising:
a processor;
memory in electronic communication with the processor; and
instructions stored in the memory and operable, when executed by the processor, to cause the apparatus to:
identify, at a second UE, a first STBC to be used for a first uplink transmission of a first UE;
apply, at the second UE, an OCC to the first STBC to generate a second STBC to be used for a second uplink transmission of the second UE;
apply the second STBC to at least a portion of an OFDM symbol to be transmitted in the second uplink transmission; and
transmit the second uplink transmission concurrently with the first uplink transmission.

26. An apparatus for wireless communication, in a system comprising:
a processor;
memory in electronic communication with the processor; and
instructions stored in the memory and operable, when executed by the processor, to cause the apparatus to:
identify a first UE and a second UE that are to transmit concurrent uplink transmissions;
configure the first UE to use a first STBC for a first uplink transmission;
configure the second UE to use a second STBC for a second uplink transmission, the second STBC generated by applying an OCC to the first STBC;
receive the first uplink transmission and the second uplink transmission;
decode the received first uplink transmission and second uplink transmission according to the OCC to produce a first STBC coded portion of the first uplink transmission from the first UE and a second STBC coded portion of the second uplink transmission from the second UE; and
space-time block decode the first STBC coded portion and the second STBC coded portion of the second uplink transmission.

27. The apparatus of claim 25, wherein the first STBC is applied to a first OFDM symbol and a second OFDM symbol that are to be transmitted in the first uplink transmission, and wherein the instructions to apply the second STBC are operable, when executed by the processor, to cause the apparatus to:
apply the second STBC across a third OFDM symbol and a fourth OFDM symbol to be transmitted in the second uplink transmission.

28. The apparatus of claim 25, wherein the first STBC is applied to a first portion of the first OFDM symbol and a second portion of the first OFDM symbol to be transmitted in the first uplink transmission, and wherein the instructions to apply the second STBC are operable, when executed by the processor, to cause the apparatus to:
apply the second STBC across a first portion of a second OFDM symbol and a second portion of the second OFDM symbol, the second OFDM symbol to be transmitted in the second uplink transmission concurrently with the first OFDM symbol.

29. The apparatus of claim 26, wherein:
the instructions to configure the first UE are operable, when executed by the processor, to cause the apparatus to configure the first UE to apply the first STBC across a first OFDM symbol and a second OFDM symbol to be transmitted in the first uplink transmission, and
the instructions to configure the second UE are operable, when executed by the processor, to cause the apparatus to configure the second UE to apply the second STBC across a third OFDM symbol and a fourth OFDM symbol to be transmitted in the second uplink transmission concurrently with the first uplink transmission.

30. The apparatus of claim 26, wherein:
the instructions to configure the first UE are operable, when executed by the processor, to cause the apparatus to configure the first UE to apply the first STBC to a first portion of a first OFDM symbol and a second portion of the first OFDM symbol to be transmitted in the first uplink transmission, and
the instructions to configure the second UE are operable, when executed by the processor, to cause the apparatus to configure the second UE to apply the second STBC across a first portion of a second OFDM symbol and a second portion of the second OFDM symbol, the second OFDM symbol to be transmitted in the second uplink transmission concurrently with the first OFDM symbol.

* * * * *